US012315337B2

(12) United States Patent
Sanford et al.

(10) Patent No.: US 12,315,337 B2
(45) Date of Patent: May 27, 2025

(54) SYSTEMS FOR ENHANCING FUNDING OF GAMING

(71) Applicant: Everi Payments Inc., Austin, TX (US)

(72) Inventors: Kirk Edward Sanford, Henderson, NV (US); Thomas Michael Sears, Henderson, NV (US); Robert Vincent Connelly, Jr., Henderson, NV (US)

(73) Assignee: Everi Payments Inc., Las Vegas, NV (US)

( * ) Notice: Subject to any disclaimer, the term of this patent is extended or adjusted under 35 U.S.C. 154(b) by 377 days.

(21) Appl. No.: 18/097,229

(22) Filed: Jan. 14, 2023

(65) Prior Publication Data

US 2023/0177920 A1 Jun. 8, 2023

Related U.S. Application Data

(60) Continuation of application No. 17/153,748, filed on Jan. 20, 2021, now Pat. No. 11,557,173, which is a continuation of application No. 16/700,949, filed on Dec. 2, 2019, now Pat. No. 10,930,115, which is a continuation of application No. 15/977,301, filed on May 11, 2018, now Pat. No. 10,573,128, which is a continuation of application No. 14/673,335, filed on Mar. 30, 2015, now Pat. No. 9,972,168, which is a
(Continued)

(51) Int. Cl.
G07F 17/32 (2006.01)
G06Q 20/18 (2012.01)
G06Q 30/02 (2023.01)

(52) U.S. Cl.
CPC ......... G07F 17/3244 (2013.01); G06Q 20/18 (2013.01); G06Q 30/02 (2013.01); G07F 17/3262 (2013.01)

(58) Field of Classification Search
CPC . G07F 17/3244; G07F 17/3262; G06Q 20/18; G06Q 30/02
See application file for complete search history.

(56) References Cited

U.S. PATENT DOCUMENTS 5,038,022 A 8/1991 Lucero
5,429,361 A 7/1995 Raven et al.
(Continued)

FOREIGN PATENT DOCUMENTS

EP 1107196 6/2001
WO 97/13228 4/1997
(Continued)

OTHER PUBLICATIONS

Quickjack, Jackpot Dispensation System, Ad in Native American Casino, Feb. 2001.
(Continued)

Primary Examiner — Reginald A Renwick
(74) Attorney, Agent, or Firm — Snell & Wilmer LLP

(57) ABSTRACT

Apparatus and methods are provided for facilitating the funding of gaming. Relative to a gaming table, a player may provide a commercial bank card to access funds via a table client. A request for funds from an account associated with the bank card is transmitted to a banking network. Upon approval, a monetary value voucher is generated, such as by a casino voucher system, and is printed and provided to the player at the gaming table. The player may redeem the voucher for funds, such as monetary value gaming chips for wagering at the gaming table.

20 Claims, 46 Drawing Sheets

Related U.S. Application Data division of application No. 11/991,814, filed on Mar. 10, 2008, now Pat. No. 8,992,305, which is a continuation-in-part of application No. 10/953,032, filed as application No. PCT/US2006/035250 on Sep. 11, 2006, now abandoned.

(60) Provisional application No. 60/716,808, filed on Sep. 14, 2005, provisional application No. 60/716,233, filed on Sep. 12, 2005.

(56) References Cited

U.S. PATENT DOCUMENTS

| | | |
|---|---|---|
| 5,457,306 A | 10/1995 | Lucero |
| D367,472 S | 2/1996 | Clark et al. |
| 5,517,569 A | 5/1996 | Clark |
| 5,809,143 A | 9/1998 | Hughes |
| 5,811,772 A | 9/1998 | Lucero |
| 5,815,577 A | 9/1998 | Clark |
| 5,940,811 A | 8/1999 | Norris |
| 5,952,640 A | 9/1999 | Lucero |
| 5,959,277 A | 9/1999 | Lucero |
| 6,019,283 A | 2/2000 | Lucero |
| 6,081,792 A | 6/2000 | Cucinotta et al. |
| 6,098,053 A | 8/2000 | Slater |
| 6,190,256 B1 | 2/2001 | Walker et al. |
| 6,247,643 B1 | 6/2001 | Lucero |
| 6,347,738 B1 | 2/2002 | Crevelt et al. |
| 6,394,907 B1 | 5/2002 | Rowe |
| 6,575,832 B1 | 6/2003 | Manfredi |
| 6,579,179 B2 | 9/2003 | Poole et al. |
| 6,620,046 B2 | 9/2003 | Rowe |
| 6,679,775 B1 | 1/2004 | Luciano et al. |
| 6,712,697 B2 | 3/2004 | Acres |
| 6,739,972 B2 | 5/2004 | Flanagan-Parks et al. |
| 6,746,330 B2 | 6/2004 | Cannon |
| 6,775,770 B1 | 8/2004 | Davis et al. |
| 6,835,134 B2 | 12/2004 | Poole et al. |
| 6,843,412 B1 | 1/2005 | Sanford |
| 6,852,031 B1 | 2/2005 | Rowe |
| 6,890,258 B2 | 5/2005 | Weiss |
| 6,892,182 B1 | 5/2005 | Rowe et al. |
| 6,896,618 B2 | 5/2005 | Benoy et al. |
| 6,905,411 B2 | 6/2005 | Nguyen et al. |
| 6,908,384 B1 | 6/2005 | Luciano, Jr. |
| 6,951,302 B2 | 10/2005 | Potts |
| 6,997,807 B2 | 2/2006 | Weiss |
| 7,063,617 B2 | 6/2006 | Brosnan et al. |
| 7,077,747 B1 | 7/2006 | Luciano, Jr. |
| 7,094,149 B2 | 8/2006 | Walker et al. |
| 7,461,780 B2 | 12/2008 | Potts et al. |
| 7,771,277 B2 | 8/2010 | Chamberlain et al. |
| 7,819,742 B2 | 10/2010 | Chamberlain et al. |
| 7,828,646 B2 | 11/2010 | Franks, Jr. |
| 7,922,581 B2 | 4/2011 | Potts |
| 8,025,216 B2 | 9/2011 | Potts et al. |
| 8,096,872 B2 | 1/2012 | Walker et al. |
| 8,140,434 B2 | 3/2012 | DeCristoforo |
| 2002/0002075 A1 | 1/2002 | Rowe |
| 2002/0039921 A1 | 4/2002 | Rowe et al. |
| 2002/0068624 A1 | 6/2002 | Ellis |
| 2002/0183110 A1 | 12/2002 | Flanagan-Parks |
| 2003/0054878 A1 | 3/2003 | Benoy et al. |
| 2003/0078094 A1 | 4/2003 | Gatto et al. |
| 2003/0119585 A1 | 6/2003 | Walker et al. |
| 2003/0211883 A1 | 11/2003 | Potts |
| 2004/0147309 A1 | 7/2004 | Chamberlain et al. |
| 2004/0162135 A1 | 8/2004 | Flanagan-Parks et al. |
| 2004/0173673 A1 | 9/2004 | Potts |
| 2005/0020354 A1 | 1/2005 | Nguyen et al. |
| 2005/0082750 A1 | 4/2005 | Grauzer |
| 2005/0107155 A1 | 5/2005 | Potts et al. |
| 2005/0107156 A1 | 5/2005 | Potts |
| 2005/0277462 A1 | 12/2005 | Ellis |
| 2005/0289056 A1 | 12/2005 | Guinn |
| 2006/0052153 A1 | 3/2006 | Vlazny et al. |
| 2006/0105836 A1 | 5/2006 | Walker |
| 2006/0118615 A1 | 6/2006 | Dorminelli |
| 2006/0131395 A1 | 6/2006 | Potts et al. |
| 2006/0160610 A1 | 7/2006 | Potts |
| 2006/0205481 A1 | 9/2006 | Dominelli |
| 2007/0060309 A1 | 3/2007 | Yankton et al. |
| 2008/0139303 A1 | 6/2008 | Patterson |
| 2009/0029763 A1 | 1/2009 | Schwartz |
| 2010/0016070 A1 | 1/2010 | Walker et al. |
| 2010/0222132 A1 | 9/2010 | Sanford et al. |
| 2011/0065497 A1 | 3/2011 | Patterson, Jr. |
| 2011/0166919 A1 | 7/2011 | Walker et al. |

FOREIGN PATENT DOCUMENTS

| | | |
|---|---|---|
| WO | 2005032676 | 4/2005 |
| WO | 2007033055 | 3/2007 |

OTHER PUBLICATIONS

NRT Presentation, Multi-functional Patron Kiosk System, Feb. 22, 2002.

NRT Presentation, including QuickJack and QuickJack Plus, No date.

Website printout from www.innovonics.com, The PC Pay System, dated Jan. 9, 2004, 13 pages.

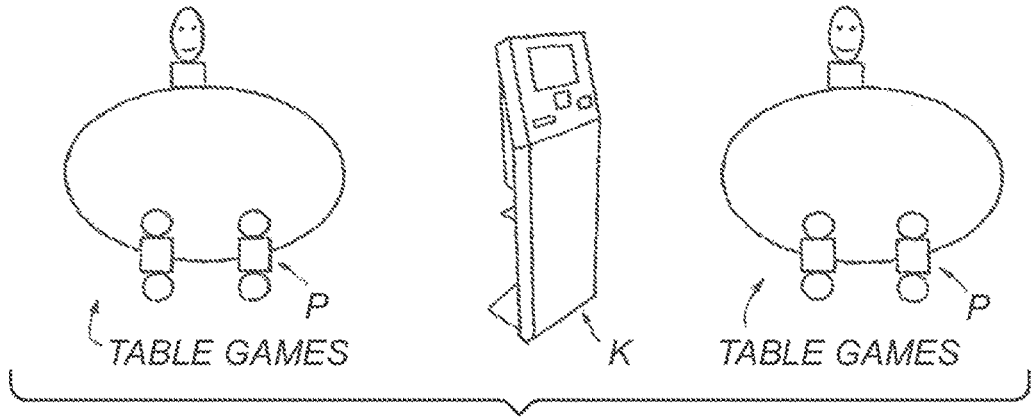

FIG. 24

"AUTO ROLL TO ESTABLISH A CREDIT LINE AFTER RECEIVING A DECLINE FROM A CARD ISSUING BANK"

(1) PATRON MAKES REQUEST FOR CASH ADVANCE OR QUASI-CASH TRANSACTION USING BANK CARD.
(2) BANK CARD ISSUER DECLINES TRANSACTION.
(3) "AUTO-ROLL OVER" TO GIVE CUSTOMER AN OPTION TO ESTABLISH A CREDIT LINE. (CREDIT LINE MIGHT BE TIED TO A CARD ISSUED BY GCA)
(4) CUSTOMER CHOOSES TO APPLY FOR CREDIT LIMIT. USER INTERFACE PROMPTS CUSTOMER TO ENTER SSN AND OTHER INFORMATION LIKE DOB AND ADDRESS.
(5) BASED ON THIS INFORMATION GCA ESTABLISHES A CREDIT LINE.
(6) CUSTOMER CAN NOW DRAW DOWN ON THE LINE TO GET MONEY.

FIG. 25

SYSTEMS FOR ENHANCING FUNDING OF GAMING

RELATED APPLICATION DATA

This application is a continuation of U.S. application Ser. No. 17/153,748, filed Jan. 20, 2021, which is a continuation of U.S. application Ser. No. 16/700,949, filed Dec. 2, 2019, now U.S. Pat. No. 11,557,173, which is a continuation of U.S. patent application Ser. No. 15/977,301, filed May 11, 2018, now U.S. Pat. No. 10,537,128, which is a continuation of U.S. patent application Ser. No. 14/673,335, filed Mar. 30, 2015, now U.S. Pat. No. 9,972,168, which is a divisional of U.S. patent application Ser. No. 11/991,814, filed Mar. 10, 2008, now U.S. Pat. No. 8,992,305, which is a continuation-in-part of U.S. patent application Ser. No. 10/953,032, filed Sep. 29, 2004, now abandoned, and is a National Stage Entry of PCT/US06/35250, filed Sep. 11, 2006, which claims priority to U.S. Provisional Patent Application Ser. No. 60/716,233, filed Sep. 12, 2005 and U.S. Provisional Patent Application Ser. No. 60/716,808, filed Sep. 14, 2005. Each of these prior applications is incorporated by reference as if set forth fully herein.

FIELD OF THE INVENTION

The invention relates to improved method and apparatus for cashless gaming and more particularly to improved methods and apparatus for funding and facilitating gaming, including using stand-alone kiosks and at gaming tables. Preferably the kiosks issue vouchers, slot vouchers, or a like indicia of gaming credit where "slot vouchers (which term can broadly cover vouchers or tickets or other types of receipts for funds or gaming credit indicators) in their basic use are insertable into (or readable by or scannable by) a slot machine or gaming machine to fund gaming activity. The vouchers may be redeemable for cash, gaming credit and/or chips at gaming machines, at tables, at cages and at automated voucher redemption terminals. The instant invention relates in part to automated systems (or at least partially automated systems) for voucher purchase with a card, new or old, commercial or casino, at a stand-alone kiosk, or with funds or a card at a gaming table, as well as for the redemption of vouchers at gaming tables. The invention also relates to use of casino credit and/or new credit accounts at kiosks, auto prompts to open a new credit account at kiosks and a facilitation of debit/credit card cash advance transactions at kiosks. A kiosk is preferably located proximate to but separate from particular gaming machines, with the preferred kiosk location being at the end of a bank of gaming machines. A preferred density for kiosks on a gaming floor would range from 1 kiosk for 20 to 100 gaming machines. A card is typically a commercial banking debit and/or credit card utilizing commercial electronic funds transfer (EFT) systems. However, receipts, temporary cards or other indicators of information regarding casino accounts or new credit accounts and/or new card accounts might be used. Preferably this latter information can be, at least in part, read or scanned at the kiosk. Preferably also the invention provides for bar coded or similarly audit controlled vouchers to be printed. The invention also relates to gaming oriented lines of credit including a preferred gaming oriented credit card and account, and an "auto-roll" system to establish a new gaming oriented line of credit, preferably associated with a refusal of an EFT transaction request, likely a refusal of a request for a "credit card cash advance," and the invention includes gaming patron rewarding based on EFT gaming oriented transactions and a patron selection coded card.

BACKGROUND OF THE INVENTION

The gaming industry is rife with regulation and scrutiny: state, federal, and tribal. Fiscal security concerns are extraordinarily high due to the levels of money changing hands. Moral concerns are intense. Community groups monitor regulators with an intent to enforce a sense of social responsibility. Gaining is a political issue. Commercial efficiency jockeys with social responsibility for priority. Reluctance to change paralyzes decision making.

In such a context, casino operators nonetheless have migrated toward what is being called "cashless gaming," including automated "cashless gaming," in whole or in part. Handling cash is inefficient, time consuming and costly for a casino. Requiring cash is inefficient, unsanitary and to a certain extent unsafe for players, cash being the ultimate bearer instrument.

An early "cashless gaming" system for slot machines taught providing equipment, integrated into each slot machine, for inserting a commercial bank card (credit or debit) in order to directly receive playing credit at the machine. Use of the card at the machine was to be a convenience for the player, keeping the player from having to give up his/her seat in order to secure more funds for play. This system initially anticipated that a player would cash out winnings and/or remaining playing credit for cash at the machine. Subsequent proposals included the ability to "cash out" at a machine for in-house credit and/or for commercial card account credit.

A second "cashless gaming" system proposed that a commercial bank (credit/debit) card be inserted into equipment associated with a particular slot machine and that a "slot voucher" be printed at that machine in return. The voucher could then be read into that or any other slot machine, as by via its bill reader, to receive playing credit. The second system presumed the existence of machines that read vouchers (as with bill readers) and that provided playing credit in return. The second system anticipated cashing out at the machines in terms of vouchers. In fact, newer slot machines can accept and/or print vouchers in lieu of, or in addition to, accepting and/or dispensing cash. Thus, a voucher may be read to yield playing credit as well as printed to redeem winnings and/or remaining credits at a slot machine. This second system allowed patrons to directly access commercial bank account funds at a slot machine via a POS/debit type of transaction.

Both the first and second systems entailed the existence of accounting, communication and security hardware and software integrated into the machine.

The second system also envisioned being useable for a variety of entertainment tickets and that remote standalone kiosks might be utilized to issue vouchers or tickets.

In many jurisdictions, however, there is no regulatory approval for using a card at a slot machine. Regulatory approval has been withheld because it was feared that permitting players to obtain playing credit directly at a gaming machine by EFT would unnecessarily encourage compulsive gamblers, (even though there has been no documentation of this.)

A more common and basic form of "cashless gaming" has also existed. This system provides for securing cash at ATM devices located from place to place around a casino floor. The securing of cash may be followed by a subsequent purchase of a voucher for cash at a separate kiosk. Unfortunately, ATM machines are expensive to own and maintain. Dealing in cash as they do, they entail high security and handling costs. Only a relatively few ATM machines are justified for a casino floor. ATM machines cost in the order of $15,000 to $17,000 each, involving all of the expense and security and servicing concerns associated with handling cash. A 1,000 slot machine casino, for example, would typically only find it cost effective to maintain 3 to 4 ATMs on the gaming floor. And the latter system still involves handling cash, with its inconvenience and security concerns.

All of the above "cashless gaming" systems have problems. The first two systems entail what turns out to be the excessive cost of installing POS/EFT hardware and software on each and every gaming machine. This hardware and software must satisfy stringent security standards associated with any equipment that directly interfaces with slot machines, thereby further increasing the cost of the hardware software, and regulatory approval. And the equipment ends up being under-utilized. Most of the time it sits inactive while a player plays the game. Furthermore, promoting obtaining gaming funds from commercial card accounts directly at a gaming machine is viewed by some as exhibiting an insensitivity to a casino's social responsibility. Although it is not documented, it is perceived to be beneficial to interpose some interruption in play, such as requiring a player to at least physically leave a machine to access funds by EFT, in order to inhibit compulsive gambling.

In regard to the latter system discussed above, however, it is perceived as irritatingly inconvenient and inefficient, from the player's standpoint, to require a player to visit a few remote ATM machines, possibly standing in line. And cash must still be handled by the player in this system, even if the player subsequently exchanges the cash for a voucher.

Further, regard to gaming tables there has been little effort to automate or implement or streamline cashless gaming.

SUMMARY OF THE INVENTION

The instant invention teaches improved systems for "cashless gaming," improved from the above systems in terms of efficiency, cost and social responsibility. The equipment of the instant invention is more cost effective because (1) it minimizes dealing with cash; (2) by being separate from any particular gaming machine, it avoids having to meet the high security standards set for hardware and software directly associated with a gaming machine; (3) by being associated with a plurality of gaming machines, it is not under-utilized; (4) by making automated use of casino credit accounts and/or new card accounts, it enhances versatility in funding gaming; (5) by prompting a patron to open a new credit account, especially upon receipt of a fund request refusal, it enhances funding efficiency; (6) by automating, at least in part, the issuance and redemption of vouchers at gaming tables, it enhances the efficiency of cashless gaming overall and of gaming tables, and (7) by facilitating debit/credit card cash advance transactions, it saves time for the patron and the casino. The instant invention can be perceived as socially responsible in that players are not permitted to use a card directly at a gaming machine or slot machine for securing playing credit. Rather, securing additional playing credit requires some interruption of machine game play. The equipment of the instant invention is efficient. Being sufficiently small and inexpensive, and by not dealing in cash itself, the apparatus can be cost effectively located in a plurality of locations, including proximate to banks of gaming machines and/or at gaming tables. The instant invention particularly fits a need where social responsibility is still a high priority, where regulatory changes take a long amount of time and yet where cost efficiency is a significant high concern.

While existing software products perform ATM/POS/debit and credit card authorizations on cash dispensing devices such as ATMs, one aspect of the instant invention includes the development of POS/debit and credit card software that may be integrated into voucher dispensing kiosks and gaming table environments which, while subject to a reliability and accountability standard of a casino in general, are not subject to the very high scrutiny imposed upon software directly associated with a slot machine. One achievement of the instant invention is the cost effective development of POS/debit and credit and casino credit and new card credit account hardware and software systems that meet the appropriate high accountability standards of the gaming regulatory business and that can be implemented in standalone kiosks and gaming table environments.

While the ultimate in funds dispensing convenience for slot players might be an ATM/POS debit terminal that interfaces directly with a particular gaming machine, deployment of such a product has been a slow process, inhibited by its inherent disadvantages, discussed above. Political and regulatory challenges have accompanied proposed "one-on-one" relationships with a gaming machine, as well as cost effective concerns. In the instant invention, a cost effective "proximity" is disclosed as more than balancing the convenience of a direct one-on-one relationship. The instant end of bank (EOB) kiosk requires a player to physically step away from a gaming machine to obtain additional funds electronically. This is a concept advocated by problem gambling support groups. However, the distance away is not inconveniently far, and an EOB kiosk can service a greater percent of players than can slot machine integrated systems since it need not stand inactive while a game is being played. Flexibility is enhanced by accommodating casino credit and new card credit accounts as well as by a 30 auto-roll system to prompt the opening of such accounts which are essentially immediately useable, and further by a system to facilitate debit/credit card cash advance transactions. Uniformity is further enhanced by providing commensurate equipment and methodology at gaming tables.

By accommodating casino credit and new card accounts, the instant invention expands to incorporate reasonable and responsible gaming fund sources. By accommodating gaming tables with at least in part automated voucher purchase and redemption possibilities, the invention further expands the advantages of cashless gaming. By at least initiating cash advance transactions, the invention furthers efficiency.

Based on the results of a pilot program, with a voucher issuer associated with and integrated into particular slot machines, it appeared clear that people would take advantage of the convenience of purchasing slot vouchers (or "debit tickets") from a device in proximity to gaming machines. The pilot results further showed that "end-cap" locations, especially those in high traffic areas, processed the highest transaction volumes. The implication is that slot players, thus, were using such end-cap slot machines with voucher purchase capability as de facto "ATM's" during low game-occupancy periods.

The pilot results further showed that during high game-occupancy periods the voucher terminals were essentially "out-of-service" while games were being played. This indicates that such one-on-one equipment is not being cost effectively utilized when attached to individual machines.

A "debit ticket" or voucher kiosk is viewed, thus, as one optimum solution. Providing this service in proximity to slot machines addresses the following challenges and concerns:
a) Casino operator concern about public perception (appearing predatory);
b) Casino operator concern about regulatory scrutiny (state level, NIGA);
c) Opposition from problem gambling support groups;
d) Regulator apprehension and concern about public perception;
e) Regulatory scrutiny because of interface to gaming machine;
f) Dependence on game hardware and firmware, adding time and cost to installation;
g) Capital costs too high to install on 100% of games on most casino floors.

EOB kiosks make further financial sense because it is not likely cost effective to install EFT equipment in particular on low denomination games (or low occupancy multi-denomination games) given the current cost of game-level hardware. Further, installation of EFT equipment on particular slots requires access to the gaming machines to install a radio and antenna. Such installation requires access to the drop compartment in the slot base to install the POS terminal mount and route cables to the radio. Access to these areas requires properly licensed personnel and the presence of a slot technician and/or security guard. This creates scheduling challenges and adds time to the installation process. These issues go away with the EOB Kiosk.

A gaming table oriented voucher printing and redemption system is further disclosed herein that can expand use of cashless gaming type vouchers from kiosks and gaming machines to gaming tables, to facilitate implementing a cashless gaming system for table games. The instant system allows table gaming patrons the ability to transfer value (such as from cash, chips, coupons, lines of credit, etc.) to a preferably coded voucher, such as a bar coded voucher, that can be redeemed for value at any slot machine, table game, cage, voucher redemption kiosk, etc., which is equipped with the necessary components of the system.

System components for gaming tables would preferably include:
Preferably a POS Terminal—the POS terminal may be a traditional POS device or a PC that controls attached peripherals as well as acts as a communication device between an operator and voucher host; A (Preferably Bar) Coded Voucher Reader—Reads a (preferably bar) code on a voucher and POS terminal;
(Preferably Bar) Coded Receipt Printer—Prints voucher with (preferably bar) code and associated information in the amount of the value to be loaded to the voucher and preferably also a receipt for a redeemed voucher; and
Voucher Host—Validates, issues and accounts for all issued, and redeemed vouchers, and sends transactional data to casino management software. (Note: a voucher receipt might comprise a cancelled voucher.)

A voucher redemption system for table games would preferably include the steps of:
1. patron presents system vouchers at gaming table;
2. a voucher is scanned with a scanner attached to a POS terminal at the gaming table or residing within the pit by either the dealer or the pit personnel;
3. scanned voucher information is communicated to a voucher host for validation of voucher and voucher amount;
4. voucher host validates incoming voucher information and amount and returns information for redemption and redemption amount back to the originating POS terminal;
5. POS terminal displays and instructs an operator with the amounts to redeem; and
6. dealer gives the patron who presented the voucher a validated or authorized amount in chips along with (optionally) a printed receipt.

A voucher purchase system for gaming tables would preferably include the steps of:
1. a patron playing at a game table who wishes to place value onto a voucher via cash, chips, card account, line of credit, etc. presents the dealer with cash or chips or card or readable scannable ticket/receipt or account information for loading of value to a voucher;
2. dealer accepts the combination of cash and/or chips and/or EFT funds or credit for loading of value to a voucher;
3. dealer enters the total amount to be loaded to the voucher on the POS terminal;
4. POS terminal communicates the amount requested to a voucher host and retrieves information/barcode to be printed on the voucher;
5. printer prints the voucher; and
6. dealer hands the voucher to the patron.

To understand a need for a gaining oriented line of credit, including in particular a gaming oriented credit card and account, the following discussion of shortfalls of existing EFT cards with respect to the gaming industry should be appreciated.

Patrons can secure "cash advances" and/or implement "quasi cash transactions" in casinos using credit cards. (A "POS debit" card transaction, to be distinguished from an ATM transaction, comprises an analogous procedure. Both POS debit card transactions and credit card cash advance transactions may be referred to herein as credit/debit card cash advance transactions, for convenience.)

Typically, a debit/credit card cash advance transaction utilizes an automated kiosk and a "cage". A cage is a⁻ station on a casino floor providing customer service, in particular in regard to cashing in or out. At an automated kiosk a patron can request a credit/debit card cash advance. The request is either approved or disapproved. The request process usually includes running a credit or debit card (an EFT card) through what is referred to herein as an EFT (electronic funds transfer) card reader.

If approved, a patron is typically instructed to proceed to a cage. Information in regard to the credit/debit card cash advance transaction is electronically retrieved at the cage. The patron typically again presents further identifying information along with the card swiped at the machine. According to a mechanism typically utilized, a negotiable instrument is printed which the patron signs over to the casino or to the casino's agent and for which the patron receives cash (or cash value) in return. (There is also a process called a PIN based credit/debit card cash advance which dispenses money at an automated kiosk.)

However, "cash advance" transactions based on credit/debit cards are not favored and are significantly limited. They are possible only up to typically low card-issuer-set limits. Since credit card accounts, in particular, were not created with cash transactions in mind as primary transactions, the cash transactions, in fact, and/or as a result, typically have very low cash advance limits, usually low both in terms of an amount ceiling as well as a "velocity." ("Velocity" limits the number of times a card owner can request a cash advance within a given time period, such as 24 hours.) Debit card accounts also typically have relatively low cash advance limits, in particular when considered with regard to the size and frequency of an average gaming transaction and the high convenience value to be placed on efficiently converting line-of-credit funds into cash in a casino.

The cash advance limit on a credit or debit card account is typically significantly lower than the line of credit, such as 10% to 25% of the line of credit. Credit card owners, in particular, rarely have a need to utilize the ability to secure "cash advances" based on their accounts outside of casinos Thus, the low ceiling amount and/or low velocity limit frequently is not learned until, so to speak, it is too late. Discovering a "low" cash advance limit, significantly below one's credit limit, for the first time in a casino when one wants to utilize the line of credit for the relevant "goods" of "cash" is disheartening. The card owner indignantly, and probably correctly, believes that his/her credit history justifies a higher cash advance limit under the circumstances, and that a significant convenience has been inappropriately denied him/her. In a casino scenario cash is a necessary intermediate to securing the relevant goods, or services.

A study of available facts indicates, in fact, that when the relevant information is reviewed, in a significant number of cases a higher cash advance limit and/or a higher velocity limit on a credit/debit card account would be well within acceptable levels of risk. The higher limit would be not only reasonable but also responsible for securing gaming entertainment for that person (as for instance compared to the cost of competitive forms of entertainment or competitive uses for dispersible income.)

The instant invention, addresses a need for "gaming oriented" lines of credit, and in particular a preferred gaming oriented credit card and account. The invention includes an efficient method for prompting the opening or a new gaming oriented line of credit and for providing for essentially immediate use of the line of credit in proper circumstances. The prompt preferably occurs upon the discovery of a need, and the system preferably includes taking into account EFT gaming oriented transaction history. More preferably the system takes into account a specific patron's own EFT gaming oriented transaction history, if available. In such a manner an acceptable, responsible and efficient funding of gaming oriented transactions, including cash advances from lines of credit, can be established. Such a system benefits both casinos and patrons.

A capacity to "essentially immediately" effect gaming oriented EFT transactions, including drawing reasonable and responsible cash advances, upon the opening of a new gaming oriented line of credit, given proper circumstances, remedies deficiencies with existing credit/debit card accounts and especially accommodates the gaming environment.

A preferred gaming oriented credit card and account is particularly tailored to fit the gaming environment, taking into account the needs of casinos, gaining merchants and patrons. (As discussed above such is not the case with existing credit/debit card accounts.) A gaming oriented line of credit should have cash advance limits "commensurate with" credit limits, at least for gaming oriented transactions. ("Commensurate with" will be taken to be herein "at least 50% of.") Preferably a cash advance limit is 100% of the available credit line, at least for gaming transactions. Preferably a gaming oriented cash advance limit and credit limit would be at least in part determined by taking into account EFT gaming oriented transactions history, quite possibly a patron's own history of gaming oriented EFT transactions, to the extent available. An account issuer would preferably take into account not only EFT gaming oriented transactions history but also an evaluation of other criteria that are typically used in determining credit worthiness, such as credit bureau reports and FICO. The account issuer would do or complete a credit check as well as possible, and could issue a credit card even if there is no previous EFT gaming oriented transactions history available on the patron. (Arguably, statistical patterns of EFT gaming oriented transactions could be relied upon. Statistical patterns of CCCA/POS debit transactions and casino credit transactions may be available.)

The invention is founded upon the discovery that there are significant numbers of patrons who are unnecessarily and unreasonably restricted in casinos by existing historic cash advance limits and/or velocity limits on their traditional credit/debit card accounts. Were potentially available facts taken into account, the limits could reasonably and responsibly and safely be set higher. The invention proposes a variety of means, including particularly preferred means, for accomplishing this objective.

A gaming oriented cash advance or other transaction from a new gaming oriented line of credit should be made available, under appropriate circumstances, within at least an hour of completing a line of credit opening transaction, and preferably within ten minutes or less. A permanent gaming oriented credit card, when issued, should be processable through EFT financial transaction terminals and EFT financial transaction networks.

The invention discloses methodology for efficiently opening new gaming oriented lines of credit including a credit card account, and for deriving essentially immediate cash advances or other value therefrom in appropriate circumstances. In particular, being refused a desired cash advance or other EFT transaction based upon an existing card account in a casino is a preferred triggering event for a prompt to open such a new gaming oriented line of credit.

The methodology of the instant invention makes use of diverse pre-existing capabilities, such as a capacity for using an automated station on a casino floor for initiating a request for a cash advance based on an existing credit/debit card account, for automatedly prompting a patron to open a new line of credit and for using that same automated station for initiating an application for a new line of credit and/or credit card account. The same automated station can be a basis and for using, essentially immediately, a new line of credit and/or credit card account for reasonable cash advances, in appropriate circumstances. An appropriate circumstance is, in particular, when an account issuer or co-issuer is a Merchant or master merchant of the new transaction.

Alternate embodiments for utilizing a new gaming oriented line of credit could include a more complex procedure of funding a "prepaid card" account with a new line of credit by the new account issuer, and/or a procedure of indemnifying or guaranteeing a transaction on an existing card account by a new account issuer from a newly established line of credit. Such systems could provide for the essentially immediate use of the prepaid card or newly indemnified card for gaming oriented transactions, including securing cash, under appropriate conditions. (A prepaid card or an existing card, secured directly or indirectly by a new line of credit, should be understood to be included in the term "credit" card herein.)

The invention further addresses uses for a card that is patron selection coded, in addition, for rewarding purposes. Given information in regard to a card owner's preferences, defined by a card owner's selection of a type of card, including color, etc., a more targeted rewarding program could be affected. Casinos frequently attempt to reward credit cards users with benefits, such as golf time or spa time. Casinos give loyalty points usually on co-branded credit cards, and track the points given/redeemed via some type of player tracking system. Essentially the casinos give points to reward loyalty and to build loyalty. Existing co-branded cards do not build a great deal of loyalty, however, at least to date. The instant invention teaches redeeming loyalty points for cash in a casino and more specifically at an automated device, as well as for traditional casino good and services. A further improvement teaches a patron selection of a coded card, improving the effectiveness of the rewarding system. The patron selection coded card, such as a selection of color, design, or other optional features, should better target rewarding, matching rewards to likely preferences.

The instant invention discloses an automated kiosk, preferably for issuing gaming vouchers, and the like upon an authorization of funding, including funding by a casino credit or new EFT card credit account. A standalone kiosk is disclosed structured and sized to be located proximate to a plurality of gaming machines but independent of any particular machine. A density of 1 kiosk to 20 to 100 gaming machines is preferred. An automated patron interactive stand-alone kiosk would preferably include, to maximize versatility, a POS terminal with a card swipe reader, a screen, a key pad, a voucher printer or issuer and a ticket/receipt/temporary card/permanent card reader/scanner for transmitting information associated with a casino credit account and/or a new card account. The stand-alone kiosk may or may not include wireless technology. Means to communicate both with commercial EFT card networks and with an in-house or quasi in-house gaming accounting system is provided, including as well with a casino credit accounting system and/or a new card account accounting system.

In operation, patrons would preferably swipe a card or have a receipt/ticket/temporary card/permanent card read, and/or enter account identifying information, likely enter a Personal Identification Number, request an amount, agree to any additional fees that may be charged and optionally request or decline a receipt for the transaction. The request preferably would be forwarded to a financial transaction merchant and/or processor (which could be one or more entities) (which could sometimes be referred to as a server) who would submit the transaction packet to be forwarded to commercial banking and card association networks (who may submit the request to an issuing bank or their agent for approval) or to a casino credit accounting system or to a new card accounting system, for approval and accounting.

If a transaction is denied, preferably a patron would be prompted or queried about opening a new credit account, which could be a casino credit account and/or a new credit card account. Preferably either account would be essentially immediately useable.

If approved, the authorized transaction would be preferably also submitted to a merchant connected to a casino's voucher management system and/or database. The voucher management system and/or database would (preferably) interpret the approval message, validate the transaction in-house and create a voucher record with a unique identification that includes the amount. The voucher system and/or database then would message a merchant that the voucher record has been created, whereby the merchant would send a message of approval to the stand-alone kiosk and cause a voucher printing device to print a voucher, and a receipt if requested. Both the processor system and the Voucher management system would preferably retain audit trails and reporting features to reconcile and balance activity.

As discussed above, the system may automatically query a patron whether the patron would like to open a new account, such as a new casino credit account and/or a new credit card account, whether not a transaction is denied. The system might query a patron whether they would like to open such a new account at the beginning of a transaction.

Preferred embodiments of the improved kiosk of the instant invention include structure for issuing slot vouchers in return for casino credit or credit from a newly opened credit card account. Preferred embodiments also include structure in an automated kiosk located on a gaming floor, proximate to but separate from gaming machines, for prompting a patron as to whether they would like to open a new gaming oriented account. Preferably the patron query in regard to a new account occurs subsequent to a failure to receive approval for a request based on an existing commercial EFT account.

When it is stated that an automated kiosk is located on a gaming floor proximate to but separate from gaming machines, it is intended to indicate that the kiosk is not physically or electronically integrated into any one gaming machine. That is, use of the kiosk does not tie up use of a gaming machine and play on the gaming machine does not tie up the automated kiosk. Also, since the automated kiosk is electronically separate from the gaming machines, it is not subject to the stringent regulatory and security requirements associated with electronics integrated into gaming machines.

A financial transaction processor is preferably a third party processor (which could include a group of processors) that processes EFT transactions for a variety of casinos, including a variety of separately owned casinos, separate from the commercial EFT network. A financial transaction processor is not one of the commercial EFT networks dedicated to a particular card system. The financial transaction processor is also preferably physically separate from the gaming machine or casino voucher accounting system. Again, such separation avoids having to meet all of the stringent security regulations and requirements associated with setting up, approving, monitoring and repairing electronic systems integrated into gaming machines and/or their accounting systems.

A financial transaction merchant is a third party that stands in the shoes of a merchant or functions as a merchant for EFT gaming transactions, likely for a variety of separately owned casinos. The financial transaction merchant may maintain, underwrite and/or support a casino credit account and system and/or a new commercial credit card account and system. The financial transaction merchant could also be the, or a, financial transaction processor, or a brother/sister or related entity to the, or a, financial transaction processor. A financial transaction merchant might co-brand a credit card account. A financial transaction merchant may be the provider of the kiosk and the merchant used in the system. The financial transaction merchant may control a cashless gateway.

Common examples of user communication equipment comprise keypads and display panels. A card reader and ticket/receipt/temporary card reader/scanner could be considered user communication equipment.

A casino credit accounting system would be a system that keeps track of casino patron credit accounts. It would include a system of billing and collection for the accounts, which might, of course, be out-sourced. The risk of maintaining the accounts might be mediated through means of insurance and/or indemnification. A new card accounting system would include a system to permit essentially immediate use of a new credit card account. The new and/or essentially immediate use might be restricted to appropriate circumstances wherein involving the financial transaction merchant and/or the casino fulfilled certain functions. The use might be limited to certain facilities. Presumably when an official card issues for a co-branded merchant/EFT provider account, the accounting system would shift to the standard EFT commercial credit card accounting system.

A casino credit accounting system could be maintained by a financial transaction merchant or be separate therefrom. Likely a third party financial transaction merchant would offer to maintain such a casino credit accounting system. However, various casinos for a variety of reasons might prefer to maintain their own systems.

A new card accounting system would likely be maintained by a financial transaction merchant, who likely has agreed to bear at least a portion of the risk of such new account. A financial transaction merchant might be a primary party that makes available, together with a commercial EFT system, a new gaming oriented credit card and account. Further, a financial transaction merchant might well make immediately available to a patron, at least within the system served by the financial transaction merchant, essentially immediate use a new card account, prior to receiving the traditional plastic card in the mail which takes a week to ten days after opening an account. Such immediate use under appropriate conditions would be analogous to the use made available by merchants who co-sponsor new credit card accounts opened in their store. Such merchants are known to allow a patron to open a new co-sponsored merchant and commercial EFT account and to use that account immediately within the merchant's system, prior to receiving a plastic card in the mail.

Preferably an automated kiosk of the improved system would come equipped with a reader for a ticket and/or receipt and/or temporary card and/or permanent card that might be associated with a casino credit account and/or a new card account. Alternately, of course, the owner of a casino credit account or a new credit account could enter all of the necessary information for using the account into user communication equipment provided by an automated kiosk or POS terminal.

Preferably an automated kiosk on a gaming floor located proximate to but separate from gaming machines would be located at the end of a bank of gaming machines and would have a density with respect to gaining machines of about one kiosk to 20 to 100 gaming machines. Sometimes a casino credit account is represented by card. At other times a casino credit account may be represented, at least in part, by information that the user can submit. Thirdly, a casino credit account might be represented by a ticket or a receipt or a temporary card that is machine readable or scannable.

Likewise, a new card account, most typically a credit card account, might be associated with a machine readable ticket or receipt or temporary card. However, as with the casino credit account, a new card account might be associated with information that would have to be supplied by a user to identify the account.

A new card account is most likely a credit card account. However, it could be that a new line of credit actually funds a new debit account and card. Such card would appear to be a debit card, or possibly a pro-paid card, although if the transaction were collapsed, in reality the card and account should be deemed a credit card and account. As has been discussed, since debit accounts can carry a line of credit, the distinctions between debit accounts and credit accounts are blurred.

The invention includes a redemption system and a voucher printing system oriented for table games. In one preferred embodiment of a redemption system, a voucher scanner/reader (there is no intent to make any particular distinction between scanning and/or reading an item such as a voucher) and a voucher receipt printer (which could be a voucher canceling system) are associated with a POS terminal at a gaming table. The POS terminal is in communication with a voucher host which is structured to validate a voucher and a voucher amount. (The intent of validation is to protect and check against fraud via counterfeit vouchers or forged amounts.) The POS terminal is structured to display a redemption amount received from the voucher host. The POS terminal, structured together with a voucher receipt printer, can optionally print a voucher receipt. A table issues the redemption amount, in cash or chips or gaming credit.

A voucher issuing system oriented for gaming tables comprises, in a preferred embodiment, a POS terminal having user communication equipment and a voucher printer. The POS terminal is structured to receive amount information and to communicate the received amount information to a voucher host. The POS terminal is further structured to receive voucher issuing information from the voucher host and as structured together with a voucher printer, to print a voucher related to the received information.

A cashless gaming system for table games also preferably includes a fund entry device, a voucher printer, a voucher reader scanner and a voucher receipt printer, all located at a gaming table and in communication, directly or indirectly, with a voucher host. The host accounts for issued and redeemed vouchers. A preferred embodiment of the invention comprises entering an amount into a fund entry device at a table, communicating the amount to a voucher host, receiving information to be printed on a voucher at the table and printing a voucher with the information at the table. A preferred method for providing voucher redemption at table games includes scanning a voucher at a table, communicating voucher information to a voucher host for validation, receiving redemption information relating to the voucher at the table, instructing the issuing of funds corresponding to the voucher amount at the table and optionally issuing a receipt for the voucher at the table. Again, a receipt could be any of various items, including a cancelled voucher.

The invention also includes facilitating a cash advance approval at the kiosk.

The invention includes a preferred gaming oriented credit card account. The account is associated with a credit card processable through EFT financial transaction terminals and EFT financial transaction networks at a variety of merchants. The phrase "EFT financial transaction terminals" is intended to indicate commercially available terminals for processing commercial EFT (electronic funds transfer) transactions, such as credit cards and/or debit cards from a variety of issuers. The phrase "EFT financial transaction networks" is intended to cover credit card and/or debit card commercial financial transaction processing networks. (The phrase could include electronic check clearing networks and stored value card networks and even special purpose prepaid card networks.)

It should be noted, as discussed above, that distinctions between credit cards and debit cards are becoming blurred, with credit accounts affording "cash advances" and debit accounts being secured by "lines of credit." A debit card funded by a line of credit should be considered a credit card herein.

The credit card associated with the credit account of a preferred embodiment of the instant invention is intended to be useable as a general purpose credit card at a variety of merchants, like a Visa Card and/or Master Card and/or Discover Card and the like. The card will most likely be co-sponsored by one of the commercial card service providers and have, for instance, a Master Card bug on it. In such circumstances it would only be accepted at merchant locations that accept Master Card. The class of merchants that subscribe to the use of the card is envisioned to include more than just casinos and/or more than just one merchant, such as, for instance any merchant who accepts Master Card. However, this card is a gaming oriented card and account and may have different lines of credit and/or cash advance limits for non-gaming oriented transactions than it has for gaming oriented transactions.

It is specifically envisioned in a preferred embodiment that the account issuer or co-issuer may be identified as the merchant in EFT transactions in a casino. While a casino might be regarded as the technical merchant, an agent EFT merchant for a variety of casinos is well positioned to acquire EFT gaming oriented transaction history.

A preferred gaming oriented credit card account should have a cash advance limit "commensurate with" its credit limit, at least for gaming oriented transactions. The phrase "commensurate with" should be understood to mean herein "at least 50% of." In preferred embodiments it is envisioned that the cash advance limit would essentially be the same as the credit limit, at least for gaming oriented transactions. However, one should not be allowed to escape the scope of the invention by setting a false or sham or arbitrary or non-traditional "credit limit" above the cash advance limit. For this reason "commensurate with" is defined as "at least 50% of." Furthermore, the "credit limit" referred to is intended to indicate a realistic, meaningful, standard, responsible credit limit, not some credit limit set up arbitrarily to avoid the scope of a patent.

A further feature of a preferred gaming oriented credit card account is that the credit card account should make available transactions, preferably cash transactions, in appropriate circumstances within at least an hour of completing an account opening transaction. Preferably appropriate circumstances are when the account issuer (term includes co-issuer) is also identified as a "merchant" of the transaction. There is an analogy here with other co-sponsored credit cards. Credit cards cosponsored between a merchant and a card system provider such as Master Card or Visa are known wherein immediately after completing an account opening transaction the new account owner is allowed to make charges on the account in the establishment of the merchant that co-sponsors the card.

In the instant case where the term account issuer is used, the term is intended to be understood to include a casino as well as an agent of the casino, who may be a merchant for EFT transactions in the casino (as well as other casinos, most likely.) The casino could be its own account issuer. The casino could also be a co-issuer, together with an agent EFT merchant and/or a card service provider.

In preferred embodiments a cash advance limit and/or credit limit, at least for gaming oriented transactions, would be based at least in part on 'a history of EFT gaming transactions. Statistical histories of EFT gaming transactions could be utilized. Preferably a history of EFT gaming relating transactions of the patron account owner would also be utilized, at least in part, to the extent available. Again, a merchant for EFT transactions for a multitude of casinos is in position to collect and access such a history of gaming, both personal and statistical. Such merchants may have access to patron CCCA, POS Debit, ATM, Check Cashing, and Casino Credit Line history. A risk scoring model might evaluate all these factors, among others.

It is most preferable that an account transaction including a cash advance transaction, is available within at least ten minutes of completing a gaming oriented account or line of credit opening transaction.

Preferably an account card, after it arrives in the mail, would carry an indicia of patron selection. Preferably the indicia of patron selection would be machine readable as well as visible. Preferably rewards awarded to an account owner, typically based upon use of the card at a casino or in gaming, would be based at least in part on the patron selection, to better target the rewarding.

It is envisioned that a gaining oriented account would also be associated with a PIN (Personal Identification Number).

The invention also includes a preferred method for enhanced patron funding comprising opening a credit card account and associating with the account a credit card processable through EFT financial transaction terminals and EFT financial transaction networks for a variety of merchants, as discussed above. The method would include associating a cash advance limit with the account commensurate with an account credit limit, at least for gaming oriented transactions. The invention would further include making available an account transaction, including a cash advance transaction, to a patron within at least an hour of completing an account opening transaction under appropriate circumstances. The circumstances could include the account issuer (or co-issuer) being a merchant with respect to the transaction. (It may be that the new card can be used for CCCA transactions only on account issuer machines.) The system or method also preferably includes setting a cash advance limit based at least in part on a history of EFT gaming transactions. Most preferably the system or method includes making available a transaction, including a cash advance transaction, within at least ten minutes of completing an account opening transaction. Further preferably the account is associated with a PIN, the card includes an indicia of patron selection and rewards are awarded to an account owner based in at least in part on card use and the indicia of patron selection. Use of the card can accrue "points" and point redemption for cash at a cage or at any account issuer operated cash dispensing machine could be provided.

The instant invention also includes a preferred method for enhanced patron funding in a casino comprising receiving a denial of a request for an EFT card transaction by a patron at a casino, preferably at an automated station, and providing a (preferably automated) prompt (preferably at the station) as to whether a patron would like to apply for a new line of credit, useable within at least one hour of completing the application. An automated station could be an automated kiosk or an ATM. Preferably, but not necessarily, the prompt would be provided subsequent to receiving the denial. The instant method for enhanced patron funding would preferably include securing credit related information from the patron at an automated station and utilizing patron EFT gaming transaction history for approving the new line of credit. The approval process would likely be completed at a cage. A preferred method would further include approving an application for a new line of credit and providing a cash advance from the new line of credit within at least an hour of the approval, preferably within at least ten minutes from the approval. The line of credit could be a casino line of credit. Preferably the line of credit would be represented by a credit card account. (Preferably the account would be a new account, but it is conceivable that an existing account could be indemnified or guaranteed, which would be a form of a new line of credit. It is also conceivable that a new line of credit could fund a prepaid card account.)

A further aspect of the instant invention includes a system for enhanced patron funding in a casino comprising providing a casino patron an opportunity to initiate an application for a new line of credit at an automated station in a casino, including an opportunity to submit patron information and, within at least an hour of approval of a new line of credit for the patron, providing the patron funds (cash or cash equivalent) in the casino based on the new line of credit. Likely the approved process would be completed at a cage. Preferably this preferred embodiment includes an account issuer who is identified as a merchant associated with the transaction for the funds. Again, preferably the approved new line of credit would include a cash advance limit based on EFT gaming transaction history.

Finally, the instant invention optionally includes an EFT card processable through EFT financial transaction terminals including an indicia of owner selection, coded in machine readable form and/or visibly coded. The patron selection and/or coding can be indicia of gender.

Notes: A debit card, an ATM card, a credit card, even a check card and/or a prepaid card, may be referred to herein as an "EFT card." A transaction using such card, for either goods/services and/or cash, could be referred to as an EFT transaction. Using such card usually implicates an EFT card reader and an EFT financial transaction network and involves a merchant. Frequently, using such card also implicates a PIN.

In the electronic funds transfer or EFT world, as the term is broadly used herein, historic distinctions are becoming blurred. These distinctions are mentioned here but no particular weight should be placed upon them, per se, anticipating that the distinctions are becoming increasingly blurred with time. Several historically different types of EFT card transactions could be identified: an ATM transaction; a POS debit transaction; a POS credit transaction; a credit card cash advance (CCCA) transaction; a paperless check transaction; a prepaid card transaction; a stored value card transaction. Of these transactions, historically, the POS credit and credit card cash advance transactions are regarded as credit transactions. However, bank accounts can be associated with lines of credit and credit cards can produce a "cash advance," so what appears to be a "debit" transaction may actually be a "credit" transaction, and vice versa. The distinctions are becoming unimportant. Further, of the distinctions mentioned above, the pure ATM transaction at an automated teller, historically a specific transaction for cash, is becoming less significant. And further, while a debit, credit, stored value, pre-paid and check card have historically been used in transactions for goods and services, use of all cards for cash transactions is rising in importance.

An automated EFT station should have at least user communication equipment, card reader equipment and dispenser equipment for at least cash or cash equivalents, such as vouchers. An automated EFT station would be in communication, directly or indirectly, with commercial EFT networks.

An "account issuer" for a line of credit would at least be a co-sponsor of an account.

An agent EFT merchant assumes the role of "merchant," usually for a variety of merchants, for EFT transactions.

One aspect of the instant invention involves prompting a patron to establish a gaming oriented line of credit, the prompting preferably taking place at an automated EFT station on a gaming floor. The process of opening a gaming oriented line of credit may be able to be initiated at the automated station. Preferably the process could proceed at the automated EFT station up to a pre-approval stage. The process would then preferably be completed at a cage. Preferably also an automated EFT station would prompt a user as to whether they might wish to open a gaming oriented line of credit, based upon the denial of approval of an EFT transaction, especially a credit/debit card cash advance transaction.

A preferred embodiment of a gaming oriented line of credit is represented by a gaming oriented credit card and account. The gaming oriented credit card and account would have a card processable by commercial EFT card readers and over commercial EFT networks. The cash advance limit of a gaming oriented credit card and account should be commensurate with the line of credit, at least for gaming oriented transactions. At least limited use in appropriate circumstances should be provided immediately (within 60 minutes or less) upon the completion of the opening and approval process for a gaming oriented credit card and account. The at least limited immediate use should preferably include use for gaming where the account issuer or co-issuer is the merchant or master merchant of the use transaction.

A conceivable means to implement a gaming oriented line of credit would be to insure, guarantee, indemnify or stand behind a transaction either after the transaction had been refused by the card issuer and/or networks or even before a request had been approved or disapproved. Such a process would likely require agreement and consent between three parties, the gaming patron, the account issuer of the new line of credit providing the indemnity and the existing card issuer. In EFT card processing systems the account issuer typically bears the risk of the loss in a "card presented" transaction. The risk of loss from a "card not presented" transaction typically shifts from the account issuer to the merchant. In the gaming scenario a request for cash beyond an existing account cash limit could be treated like a "card not presented" transaction in that the risk of loss could shift to a merchant. The merchant and new account sponsor presumably would have access to data that could define and estimate the risks involved in each transaction with precision, accuracy and detail in order to support an indemnity system.

A further conceivable embodiment of a gaming oriented line of credit could utilize strategies and methodologies associated with "pre-paid cards." It is known to be able to "load" a prepaid card account and essentially immediately use the card, at least for special purposes. I.e., it is known that an owner of a prepaid cell phone card can deposit money, through unrelated participating merchants, and have the funds essentially immediately credited to his/her prepaid phone card account, and the owner can then essentially immediately use the cell phone based upon the deposit just made. Although the pre-paid account owner likely has a "card," typically neither use of the cell phone nor actually making the deposit is dependent upon possession of the card. The cell phone provider maintains the pre-paid account electronically. The cell phone provider can recognize that the account has been loaded by a variety of electronic means and accords the owner essentially immediate use of the phone based upon the recognition of the deposit. A gaming patron that opens a new gaming oriented line of credit could essentially be deemed to have opened a pre-paid card account "funded" by the line of credit.

Upon opening of a new line of credit a patron could be given a paper voucher/receipt/ticket/temporary card with identifying numbers. Perhaps a bar coded ticket that is scannable would be produced. The patron could take the information to a reader/scanner, or a cage, and receive cash (or cash equivalent, which could be slot vouchers, cashless gaming vouchers, playing credit, chips or the like.) The account would be maintained by the account issuers, which could be any combination of the casino, casino's agent, and/or a financial transaction processor. As a mechanism, an account issuer could electronically deposit funds from a line of credit into a prepaid card account.

DESCRIPTION OF THE DRAWINGS

A better understanding of the present invention can be obtained when the following detailed description of the preferred embodiments are considered in conjunction with the following drawings, in which:

FIG. 24 illustrate apparatus and steps for the instant invention at table games.

FIG. 25 illustrates steps of an embodiment for an auto-roll to establish a new credit line, including a new gaming oriented credit card and a casino line of credit.

The drawings are primarily illustrative. It would be understood that structure may have been simplified and details omitted in order to convey certain aspects of the invention. Scale may be sacrificed to clarity.

A better understanding of the present invention can be obtained when the following detailed description of the preferred embodiments are considered in conjunction with the following drawings, in which:

DESCRIPTION OF THE PREFERRED EMBODIMENTS

The term voucher or "slot voucher" should be understood to comprehend and include tickets, scripts, coupons, receipts, drafts or other printed medium usable to secure cash or credit or goods or services in a casino. In general, embodiments of the instant invention permit the purchase of a gaming machine voucher (typically called a "slot voucher") using equipment proximate to but not integrated into a particular gaming device. The voucher is purchased through funding via a banking card association network and/or stored value account and/or casino credit account or new card account. Authorization for the funding causes a bar coded or similar audit controlled voucher to be printed or issued. The voucher can be inserted into a slot bill validator, for instance, or a similar device for reading vouchers, to fund gaming activity. The voucher can also be exchanged for cash at a self-serve redemption kiosk or at a cashier window. The system can include vouchers that may be used to fund activity for table games as well.

The instant invention discloses a process to enable the printing of gaming device vouchers (bar-coded tickets) at stand-alone kiosks and gaming tables based upon electronic funds transfer (EFT) or similar fund approval from casino or new accounts. Transaction options include the use of debit cards, ATM cards, a credit cards, stored value cards and cards or receipts or information relating to casinos or new accounts. Compact kiosks for any purpose are preferably locatable at the end of banks (EOB) of slot machines, such as at the end of a bank of 40 machines, to maximize convenience to casino patrons. Kiosk to gaming machine density is preferably 1 kiosk to 20 to 100 gaming machines.

An automated interactive kiosk preferably includes a PIN pad (for Personal Identification Number entry), a card reader that supports magnetic stripe cards and smart cards, a ticket/receipt/temporary card/permanent card reader/scanner and a display, as well as a voucher printer and a receipt printer. Communication means are required for the EFT networks, for the casino voucher accounting system, and for a casino account accounting system and/or new card accounting system.

Figure 1A:
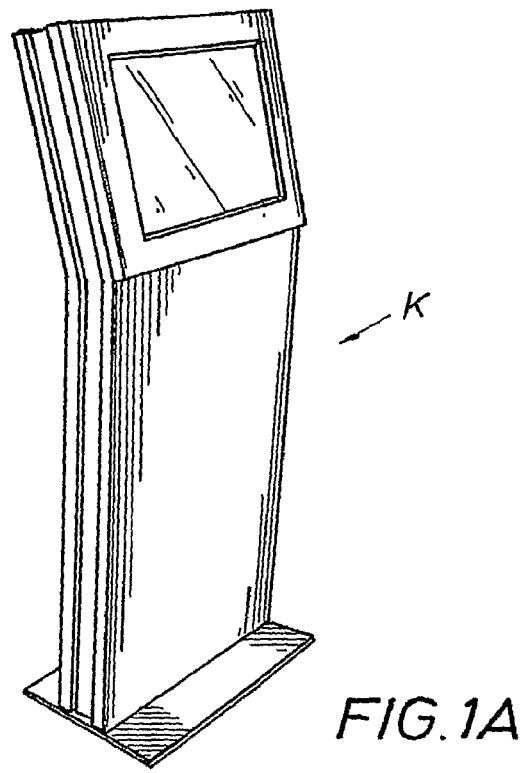
FIGS. 1A-C, 2, and 3A-C illustrate embodiments of a stand-alone automated interactive kiosk according to preferred embodiments of the instant invention, situated or structured and designed to be located end of bank (EOB).
Figure 1B:
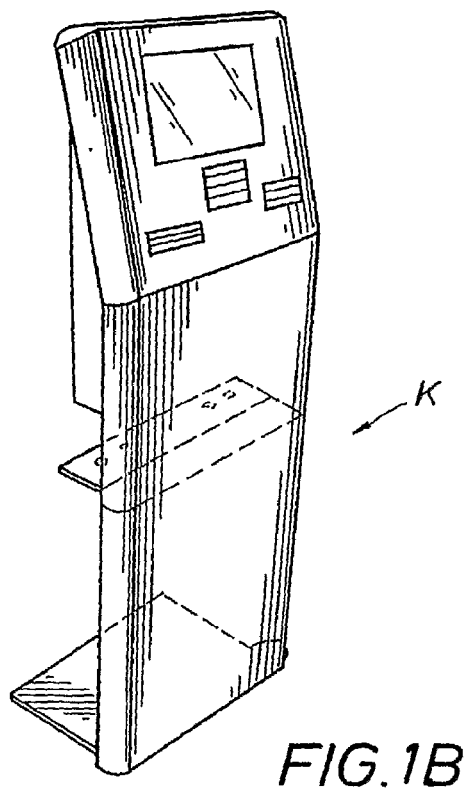
Figure 1C:
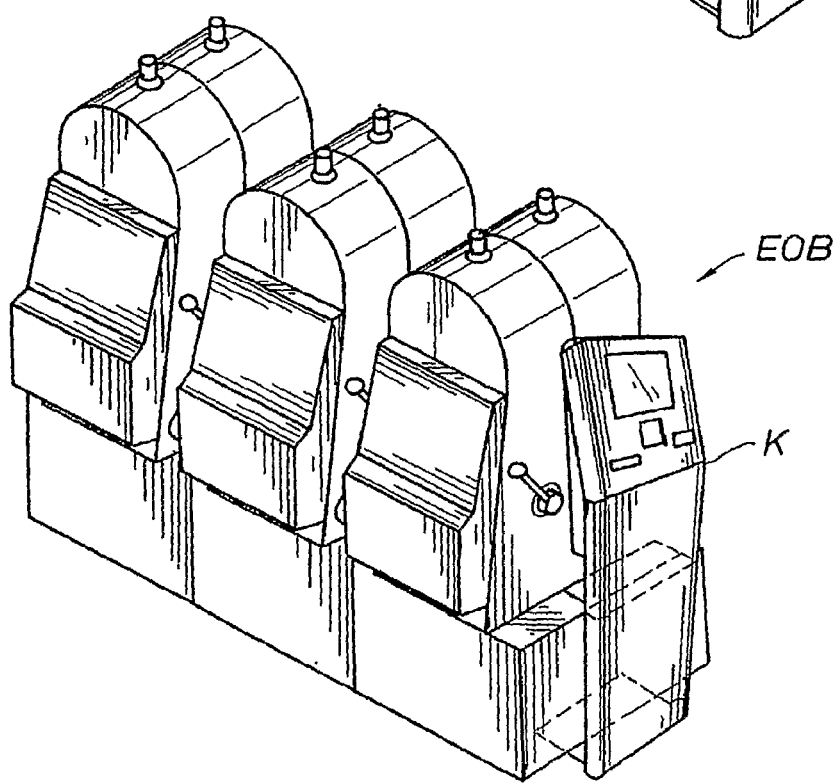
Figure 2:
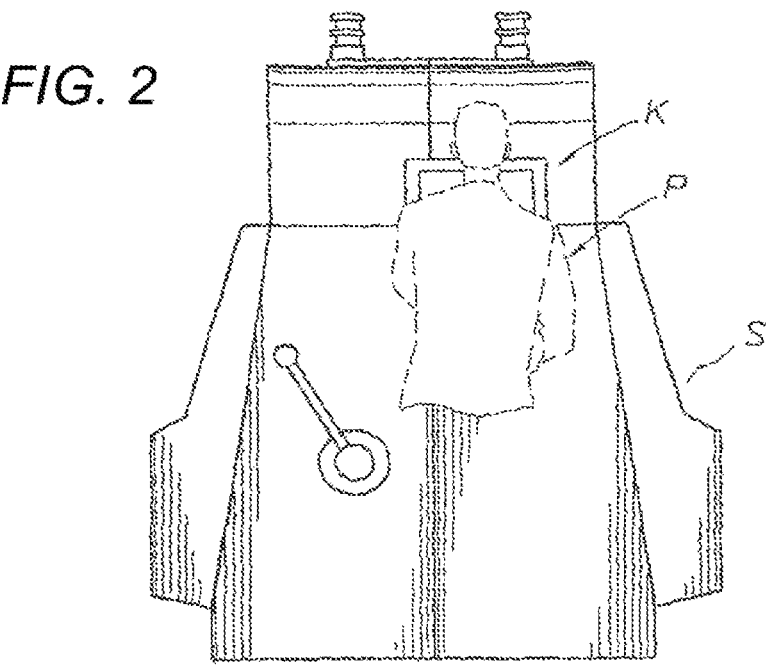
Figure 3A:
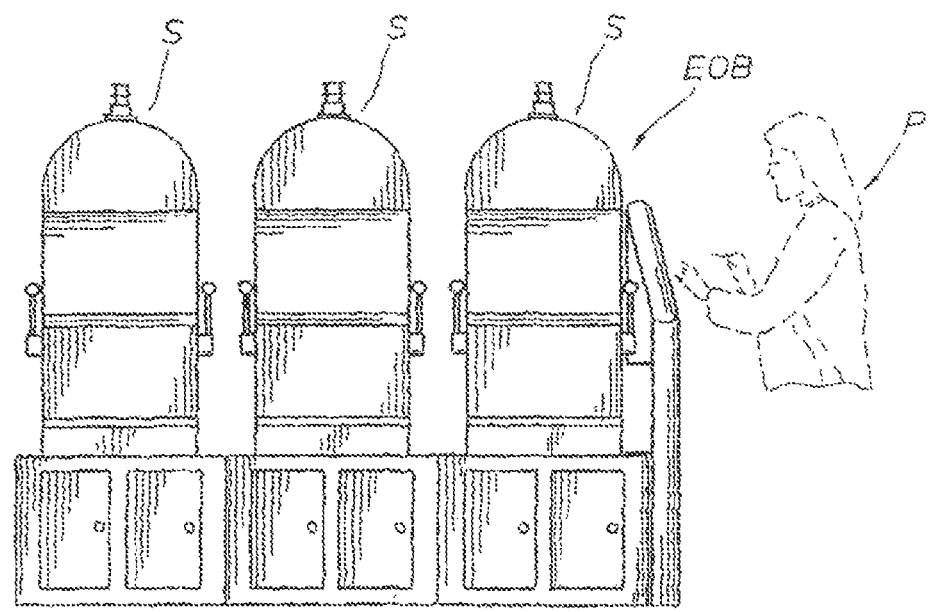
Figure 3B:
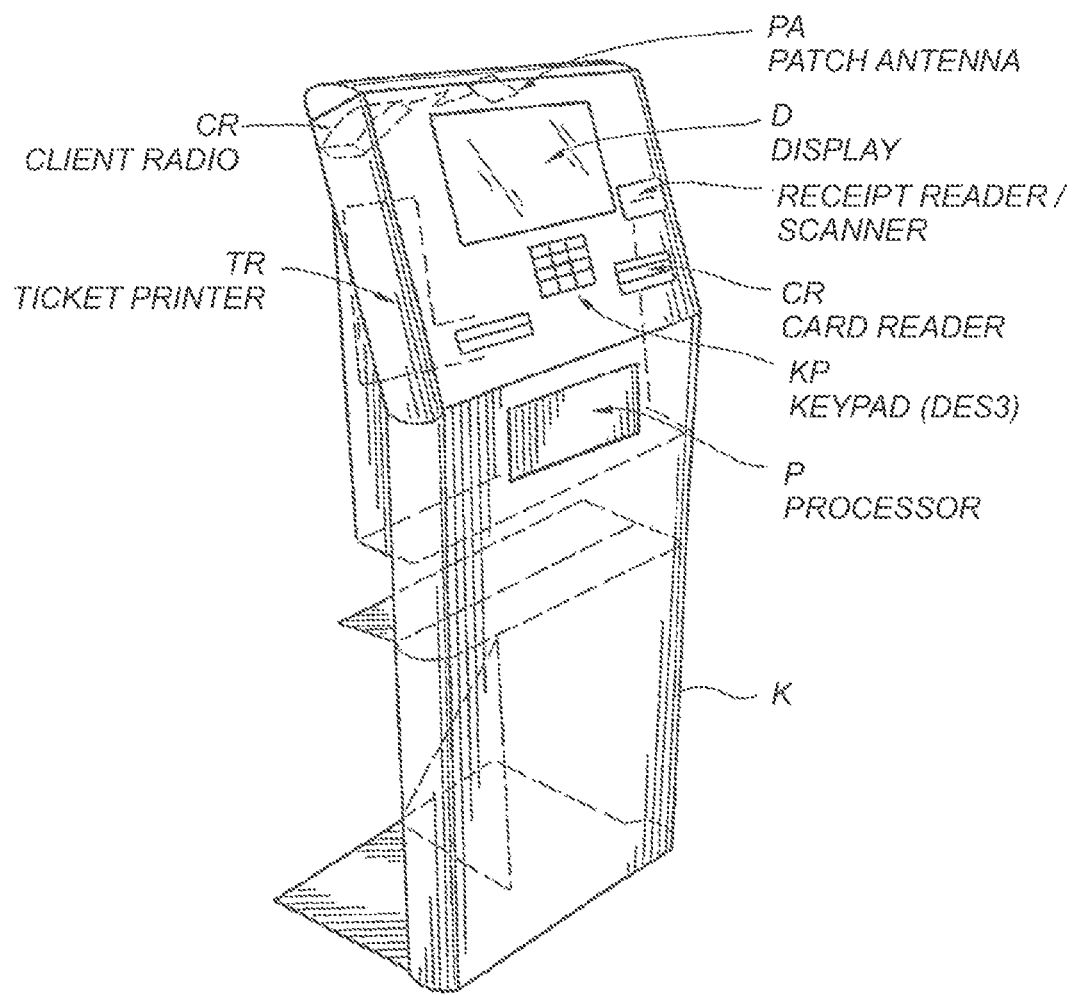
Figure 3C:
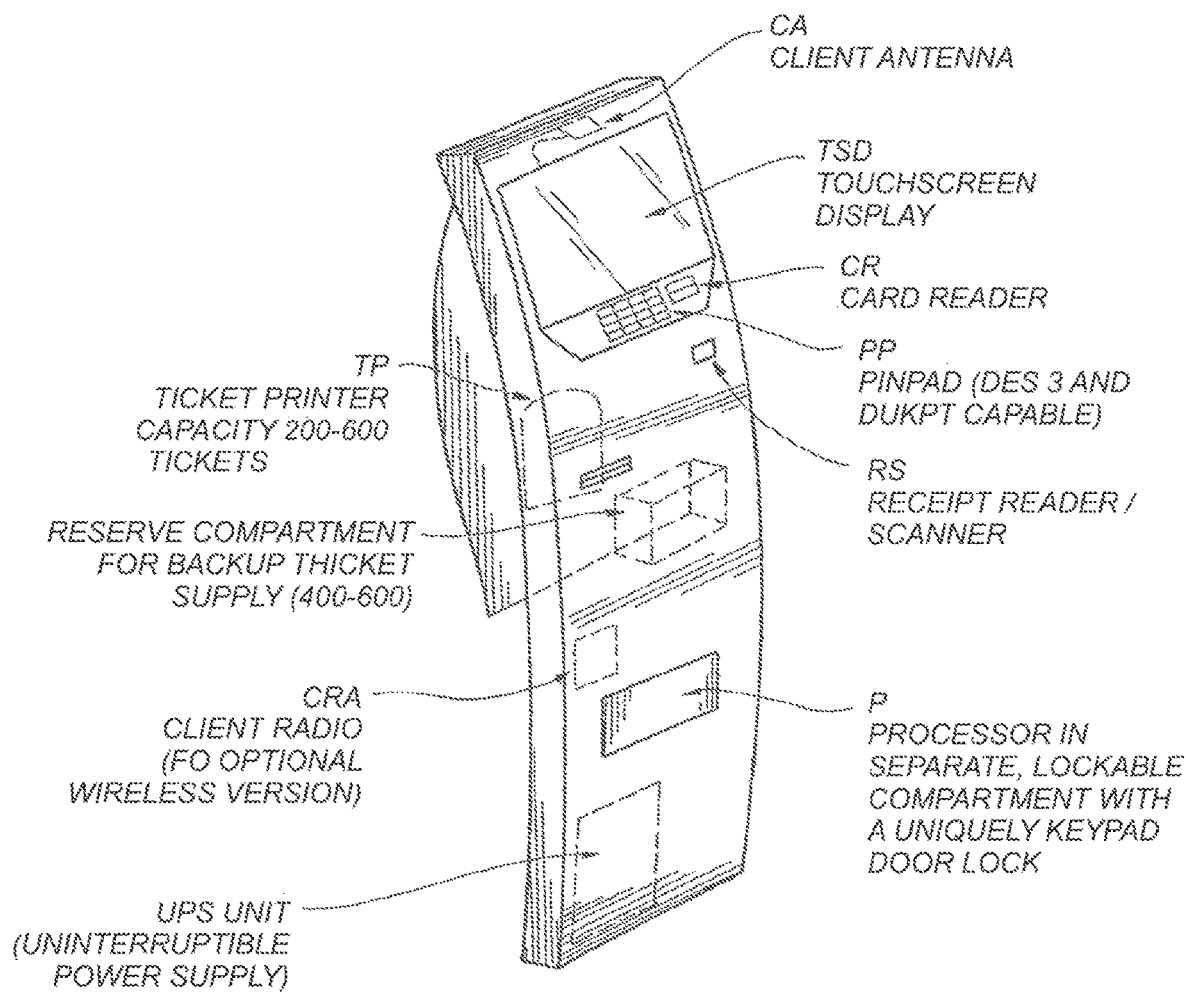

FIGS. 1A-3C illustrate physical embodiments of preferred apparatus for the purchase of slot vouchers with electronic funds. The apparatus is referred to as a stand-alone automated interactive kiosk, illustrated as kiosk K in FIGS. 1A-3C. It can be seen that kiosk K is illustrated as being locatable at the end of a bank (EOB) of slot machines S. A patron or a player P is illustrated operating the kiosk K in FIGS. 2 and 3A. Typically, as per FIG. 3B, a kiosk would include an EFT card reader CR, user interactive communication equipment, such as a PIN-pad KP and a display D, voucher issuing equipment TP and Reader Scanner RS. Typically, as per FIG. 3B, the voucher issuing equipment TP would print a voucher V in accordance with authorized printing instructions. FIG. 3B also illustrates kiosk hardware components, RF client radio CR and patch antenna PA, as well as display D, keypad KP, card reader CR, processor P and ticket printer TP. FIG. 3C illustrates alternate kiosk hardware components including client antenna CA, touch screen display TSD, card reader CR, PIN pad PP, receipt reader scanner RS, ticket printer TP, client radio CRA and processor P. Thus, FIGS. 1A to 3C illustrate preferred designs for a compact kiosk K that will dispense debit tickets V via PIN-based EFT transactions. The kiosk design is preferably small enough to be installed at the end of a bank of slot machines, maximizing convenience to casino patrons. A sleek, compact design and a secure, stable installation are preferred features of the kiosk design for this implementation.

Figure 4A:
FIGS. 4A-C illustrate two sides of a preferred embodiment of a voucher, as well as a receipt.
Figure 4B:
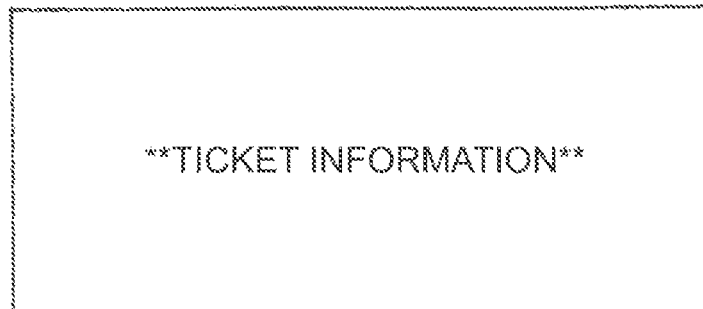
Figure 4C:

↓ The kiosk preferably generates bar-coded vouchers similar to a debit ticket, with front side VF and rearside VR, as shown in FIGS. 4A and 4B, which voucher can be inserted into a bill acceptor of a slot machine to fund gaming activity or can be redeemed for cash at a casino cage or cashier booth or redemption kiosk. The kiosk preferably offers patrons optional receipts similar to the receipt R shown in FIG. 4C.

The kiosk includes means for communicating with an electronic funds transfer system as well as means for communicating with an in-house voucher accounting system. Means for communicating with an electronic funds transfer system would preferably include communicating through an EFT financial processor. Means for communicating with a voucher accounting system would preferably include means for verifying a voucher that is to be issued. That is, the voucher issuing process preferably receives verification from a voucher accounting system.

Figure 4D:
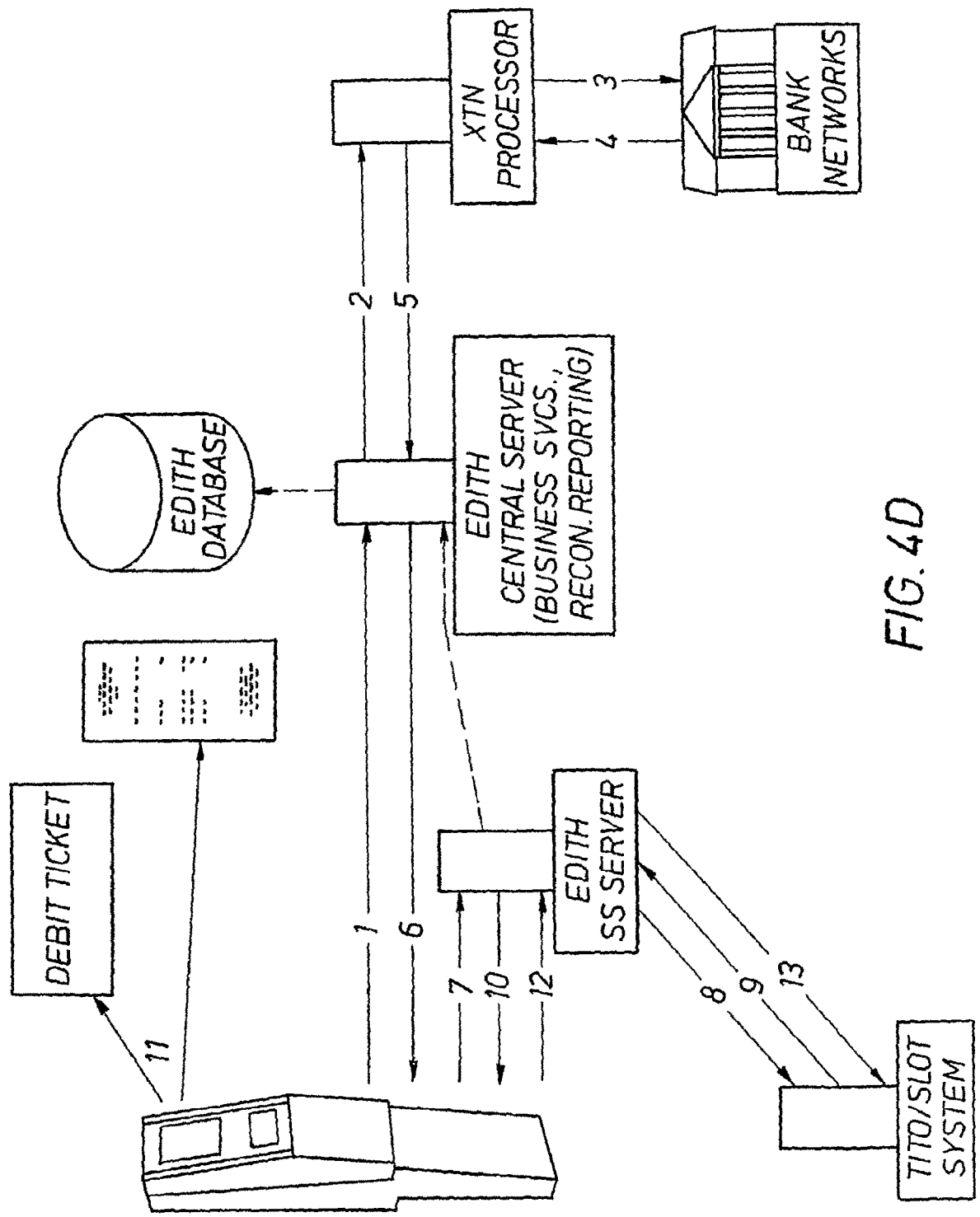
FIG. 4D illustrates a transaction flow deployed in a field trial of the system.

As illustrated in FIG. 4D, preferably a financial transaction merchant, represented by servers, will be involved, together with means for communicating with an existing casino credit account and/or a new credit card accounting system, not shown. Preferably also the kiosk includes a reader/scanner for receipts/voucher/temporary cards.

Receipt issuing equipment is preferably associated with the kiosk. Preferably a patron has an option of receiving or not receiving a receipt for a transaction. An option may be provided for a patron to self-select a personal daily limit for receiving funds from the card for gaming.

In preferred methodology, as illustrated in FIG. 4D, a patron swipes or inserts a debit or ATM card at a kiosk. The patron enters a PIN, such as by using a PIN-pad, and an amount. The patron confirms the surcharge that will be charged to the patron's account and requests or declines a receipt.

In a second step a message is preferably sent via if (wireless) or cable connection to a financial processor and its system. A financial processor sends or forwards the request, properly formatted, to an appropriate banking network for a debit withdrawal authorization. The banking network approves (or disapproves) the debit withdrawal transaction and communicates the message back to the financial processor system.

Presuming an approval of the debit withdrawal, the financial processor system sends a voucher request message ⁻CO a voucher accounting a system, referred to as a TITO system. The voucher accounting system responds to the financial processor with a voucher authorization message, preferably including appropriate validation data. The financial processor forwards the voucher authorization message to the kiosk. The kiosk prints a bar coded voucher in the amount of the debit withdrawal request. Subsequently, the patron can redeem the voucher for cash at a casino cage or a cashier booth, or insert it into a bill acceptor of a properly equipped gaining machine. In an alternate embodiment, the voucher accounting system communicates directly with the kiosk. This permits the voucher accounting system to verify printer status. Such communication means would likely include rf or cable connection. The voucher accounting system can than confirm to the financial processor that the printer is on line and ready. In such embodiments the voucher accounting system can send a message directly to a voucher printer at the kiosk to print a bar coded voucher in the amount of the debit withdrawal request.

To say that a kiosk is located on a gaming floor separate from a particular gaming machine means that the kiosk is not integrally connected with a particular gaming machine, by hardware and software. The kiosk is not integrated into that gaming machine A stand-alone kiosk could be set up adjacent to and/or touching and/or physically supported by a gaming machine, and is preferably located at the end of a bank of slot machines. The kiosk is separate, however, from any particular gaming machine in that it has no integration with that particular gaming machine and its electronics. Said otherwise, simultaneous use of the kiosk and any particular gaming machine by different patrons should be possible.

Key terms for understanding the embodiments of FIGS. 5 to 23 are as follows:

GE (gaming environment merchant)—the GE server is a front-end communications server that funnels all communications upstream with the Cashless Gateway and downstream to the TITO server. In addition to messaging switching functions, it has application logic for error handling and logging. There is no persistent or critical application data stored in this server.

CG (cashless gateway)—the CG serves as the communications nexus and provides the application intelligence to synchronize transactions across components and reliably record transactions and enforce security. This component interfaces to all Gaming Environment servers, the Database, and the banking networks via USAP. The CG performs the function of a financial transaction processor. A CG is a gateway for cashless access.

ESS and ECS—An alternate embodiment can represent the functionality of the communications server, the gaming environment merchant and the cashless gateway in terms of servers, a slot system server and a central server. ESS refers to the EDITH slot system server. ECS refers to the EDITH Central Server. Both the ESS server and ECS server can funnel communications with the slot system with the slot ticket system and/or the ticket in ticket out slot system. The TITO system or ticket in ticket out system could of course refer to and service other voucher or ticket systems than those related to slot machines.

Private Label Network—for the convenience of processing, private label networks might be distinguished from banking networks. Private label networks may have slightly different processing features. However, in general private label networks are usually considered part and parcel of the banking card networks.

TITO System—generic reference to ticket-in/ticket-out systems. The ticket database resides on the TITO system server and is maintained by casino personnel.

Thick Client—in a client/server architecture a thick client performs the bulk of the data processing operations. The data itself is stored on the server. For purposes of this document, thick client refers to a PC or POS terminal at the kiosk that contains the application software and has relatively strong processing capability.

Thin Client—in client/server applications a thin client is designed to be especially small so that the bulk of the data processing occurs on the server. For purposes of this document, thin client refers to a low cost processing solution at the kiosk whereby screen images and prompts are resident on the client and application software resides on the server.

Zero Client in client/server applications the zero client is the lowest cost approach at the client level whereby all data processing occurs at the server. For purposes of this document, this solution has been included in order to illustrate all design options. This is not the initially preferred option.

Visa PED Certification—device approval process mandated by Visa International. It deals with the physical security of POS terminals (i.e. tamper-proof) and security procedures for how encryption keys are stored, transported and injected.

EMV Certified—Acronym for Europay, Mastercard, Visa organization. This certification deals with worldwide standards at the firmware and circuit board level and how devices must function and inter-operate with one another.

"Delivery of Funds"—this expression is used in this document to conceptually describe the messaging that takes place between a server and the kiosk/printer. In some design options the TITO server tells the kiosk/printer to generate a ticket, in other design options the GE server tells the kiosk/printer to generate a ticket. In reality, this communication involves a message containing ticket data directing the kiosk/printer to generate a debit ticket.

In regard to the actual 'funds,' it should be understood that although a patron's bank account is debited in real time, a casino essentially "fronts" the funds to the player in the form of a cashable debit ticket because the casino is not reimbursed until two business days later by the banking networks.

The instant invention discloses original preferred apparatus and process to enable the printing of gaming device vouchers (bar-coded tickets referred to as debit tickets or slot vouchers) at stand-alone kiosks based upon electronic funds transfers (EFT). Although initially a kiosk will dispense slot vouchers through the use of debit cards, ATM cards, credit cards, and stored value cards, software "hooks" can be built into a unit for future support of promotional tickets and self-serve comp slip creation (bonus point redemption via interface to player tracking systems). No cash need be stored in the kiosk; therefore ATM (cash dispensing) transactions are not necessary.

Such compact kiosks can be located at the end of banks of slot machines, or nearby, to maximize convenience to casino patrons. Key aspects of the kiosk are a small, sleek design, low cost and high reliability. Design features include:

1. Compliance with gaming regs and bank network rules
2. Reliability
3. Ease of manufacturing
4. Low cost
5. Use of minimal resources from gaming machine manufacturers
6. Ease of installation and maintenance from casino perspective (i.e. slot moves, ticket stock replenishment)
7. Ease of installation.

Preferred kiosk design includes an extremely small footprint, the smaller the better. The less intrusive the unit, the greater the number of installation options there are across a slot floor.

An ideal installation method for a kiosk would be to embed it into or on the side of slot machine cabinets at the end of a bank, to the extent casino operators and gaming regulators will allow this. The second best design approach would be a flat kiosk that takes up as little space as possible situated in a walkway between banks. One goal is to minimize the depth of the kiosk to ensure that the kiosk creates no traffic flow issues for the casinos.

Preferred kiosk attributes include:

1. Aesthetics—an attractive, sleek, "cutting edge" design; one that blends in with the aesthetics of a slot floor.
2. Durability—a durable unit that can withstand the wear and tear of a 24×7 casino environment.
3. Quality—Transaction reliability is paramount. No more than 1 unexpected error per 5,000 transactions.
4. Cost—Component hardware cost able to be significantly reduced below ATM machine costs.
5. Size—Limit hardware depth due to the limited space between slot machines in the average casino.
6. Power cable—ideally should be 10 feet in length with an in-line power adaptor, not wall mount. Ideally modular at the device so cord can be fed through metal stalk mount and cable holes in slot base.
7. Expandability—designed at the software level with future expandability in mind (i.e. promo tickets, bonus point lookup and comp creation); without ATM functionality or bill breakage (cash dispensing) because of desire for a small footprint. (Test results show that demand for debit tickets on a slot floor is enough to make device successful.)
8. Processing Capability—Thin Client or Thick Client or Zero Client.
9. Connectivity—Should support both hard-wire and RF (wireless) communications (proprietary 2.4 GHZ or 802.11, for example). The preferable implementation is wireless since this will allow casino operators to reconfigure their slot floors without having to pull new cable or reroute existing cable (RS232 or TCP/IP to be determined).
10. PIN encryption—should meet ANSI standards for "TDES" (triple DES) and "DUKPT" (derived unique key per transaction).
11. VISA Certification—should be a VISA approved PED.
12. EMV Certification—should meet EMV (Europay, Mastercard, Visa) worldwide standards for firmware and circuitry and how POS type devices inter-operate with one another.
13. FCC Certification—if individual components are used to build kiosk rather than an off-the-shelf POS terminal, FCC certification may be necessary (Part 68 and/or 15).
14. OS—Linux operating system is preferred.
15. Card Reader—ATM/debit and Smart card capable; preferred is a vertical swipe, not horizontal.
16. PIN pad—no longer needs to be a separate hard key or membrane keypad. It can be embedded in the display screen as long as it complies with ANSI and VISA PIN security requirements and supports TDES and DUKPT.
17. Numeric Keypad not required if a PIN pad is embedded in the display. However, if one is included, it should be "water splash-resistant."
18. Printer—Thermal printer with auto-cut and partial pelf capability. Should support ample size paper roll or voucher stock.
19. Display—preferably no smaller than 2.75" wide× 1.75" high. Should be readable in casino ambient lighting. Color preferred.
20. User interface—should be simple and easy to use. Preferably only keys/buttons necessary to patron to perform a transaction should be available. On/off button should not be exposed outside secure area of kiosk enclosure
21. Software Interface—should provide English and Spanish prompting.
22. Serial ports—should have at least 2 available RS232 ports. One can be used to communicate with an RF client radio; the other can be used for a modem connection.

Table I lists design components to be considered for the most effective implementations. Regardless of the options chosen, the kiosk would preferably support both wired and wireless connectivity in case a particular casino or jurisdiction prohibits one or the other.

Likewise, because gaming regulatory requirements vary by jurisdiction, options 1, 2, 6, 7, 11, and 12 of Table I need to support two configurations relative to the Gaming Environment server:

1. GE located at processors data center.
2. GE located within the casino.

FIGS. 5 through 19 include diagrams of each of the design option of Table 1. The pros and cons of each design option as listed below. Pros are listed with a prefix of "+" and cons are listed with a prefix of "↓".

Figure 5A:
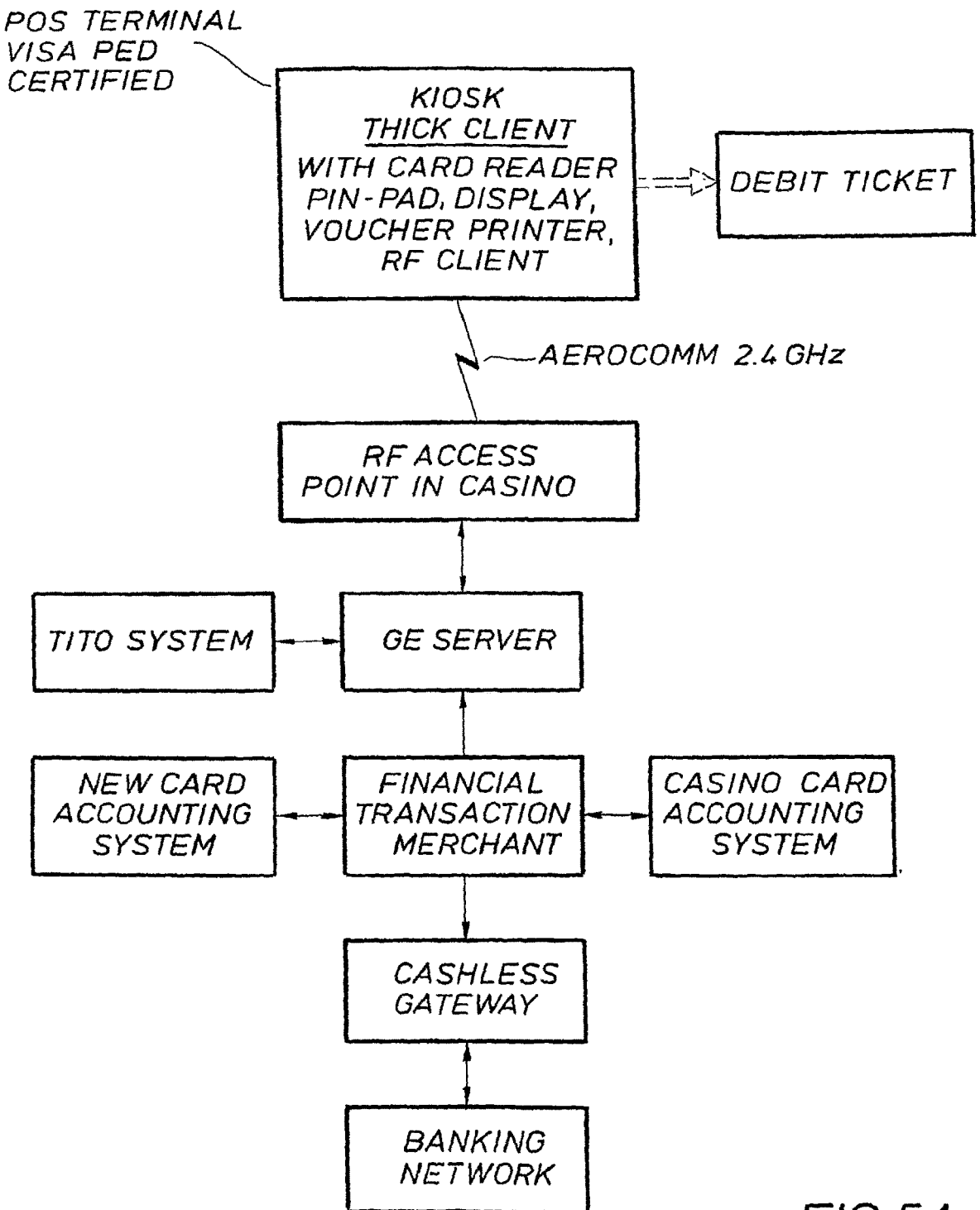
FIGS. 5A-B, 6A-B, 7A-B, 8A-B, 9A-B, 10A-B, 11A-B, 12A-B, 13A-B, 14A-B, 15A-B, 16A-B, 17A-B, 18A-B and 19A-B illustrate optional preferred embodiments for transaction flows for the inventive system.
Figure 5B:
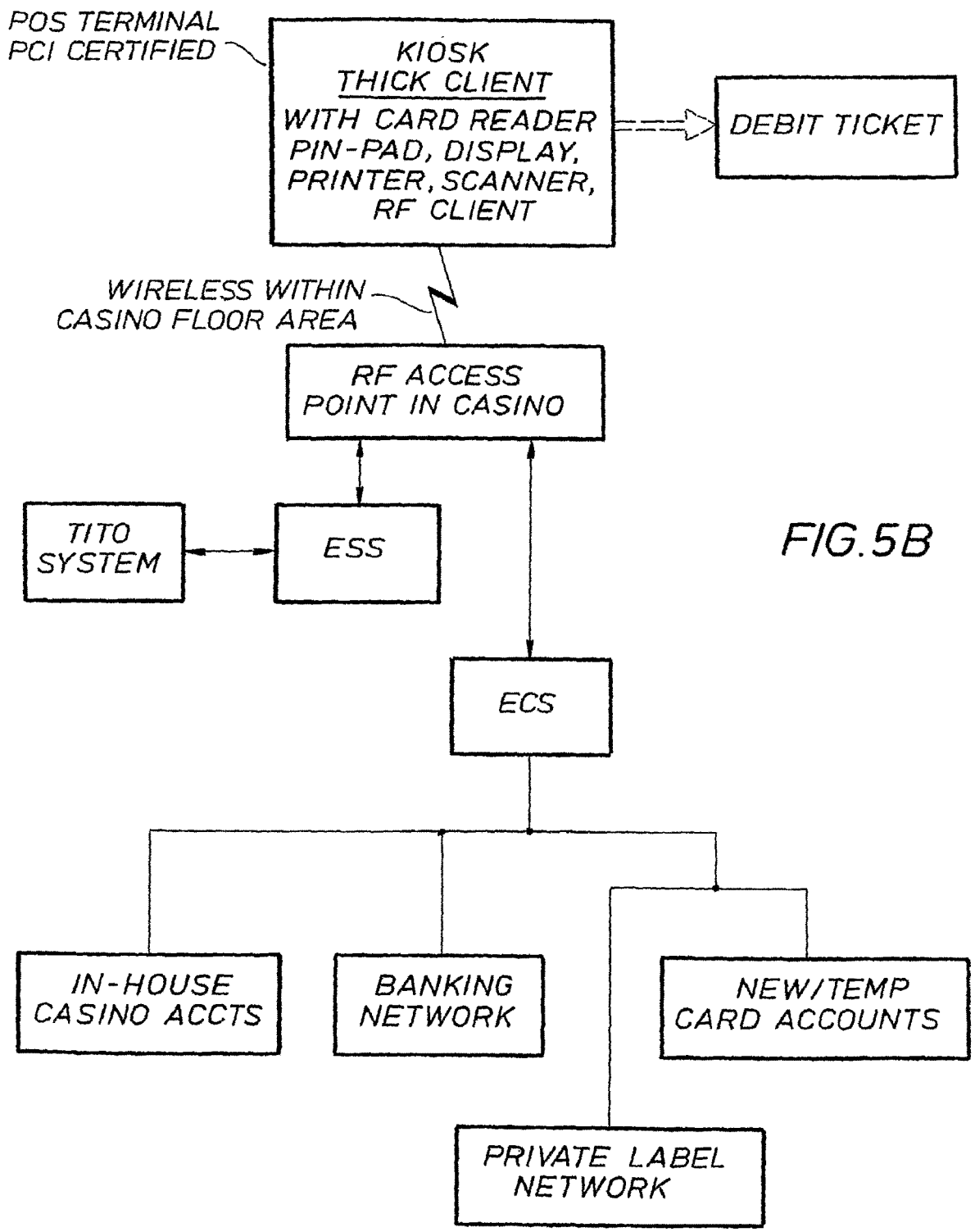

FIGS. 5A, B—Design #1: GE Server (or the Like) Delivers Funds

+ Completely wireless at slot floor level which eliminates the need to pull cables to slot banks. This mobility can minimize device downtime when slot floor reconfigurations occur.

+ Visa PED certified terminal can save developmental cost and time to market over a thin client that is not certified.

+ Because of the thick client, the proprietary wireless solution can be used.

+ The proprietary wireless product has already proven itself within a casino environment.

+ Server level software can be leveraged for the EOB kiosk system.

+ Should require less development resources from gaming machine manufacturer.

↓ GE server may need to reside at the casino because of funds delivery role.

↓ The kiosk system may come under more gaming regulatory scrutiny if GE delivers funds.

↓ Software changes/updates at the kiosk level require more resources to manage/implement on a thick client than on a thin client.

Figure 6A:
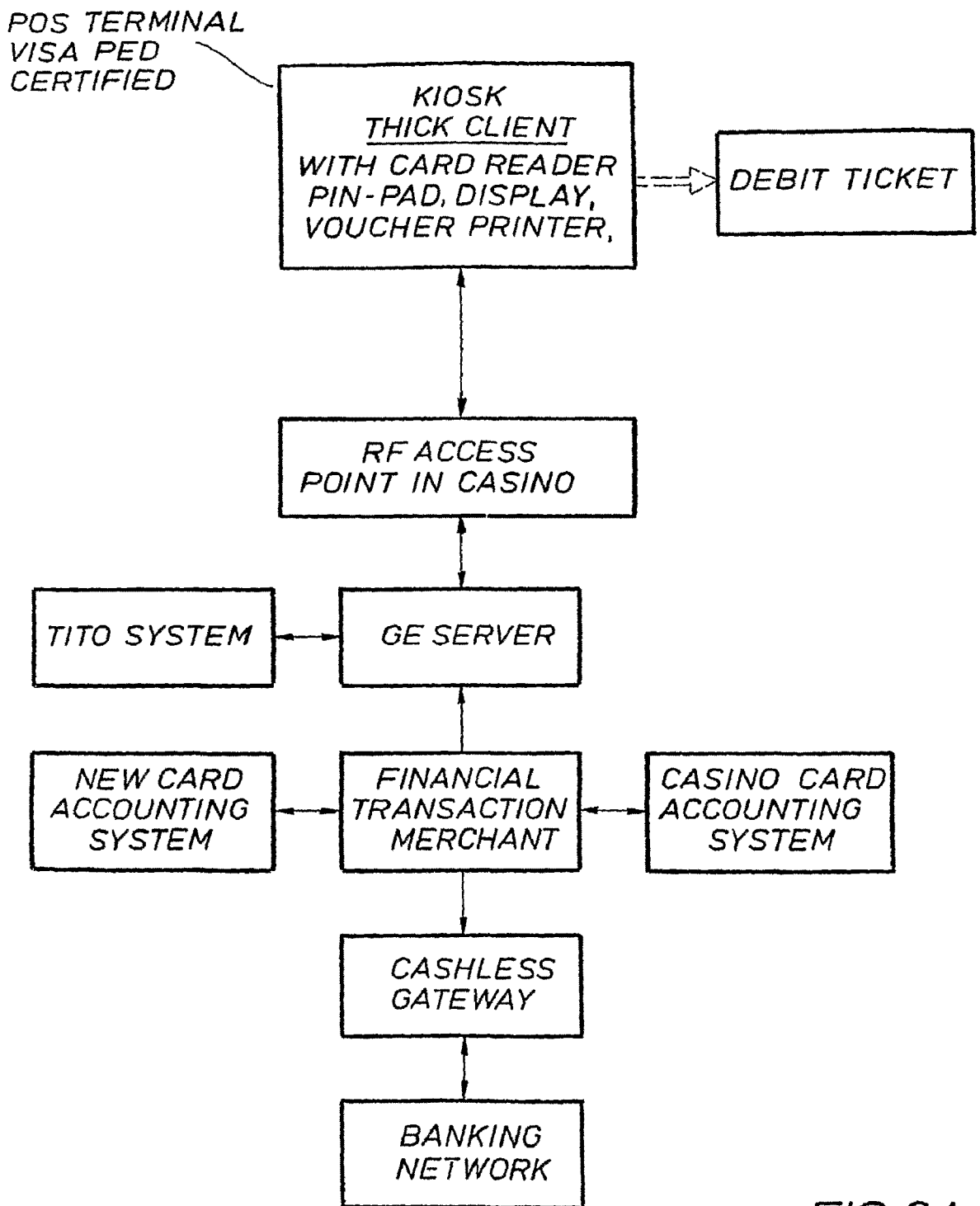
Figure 6B:
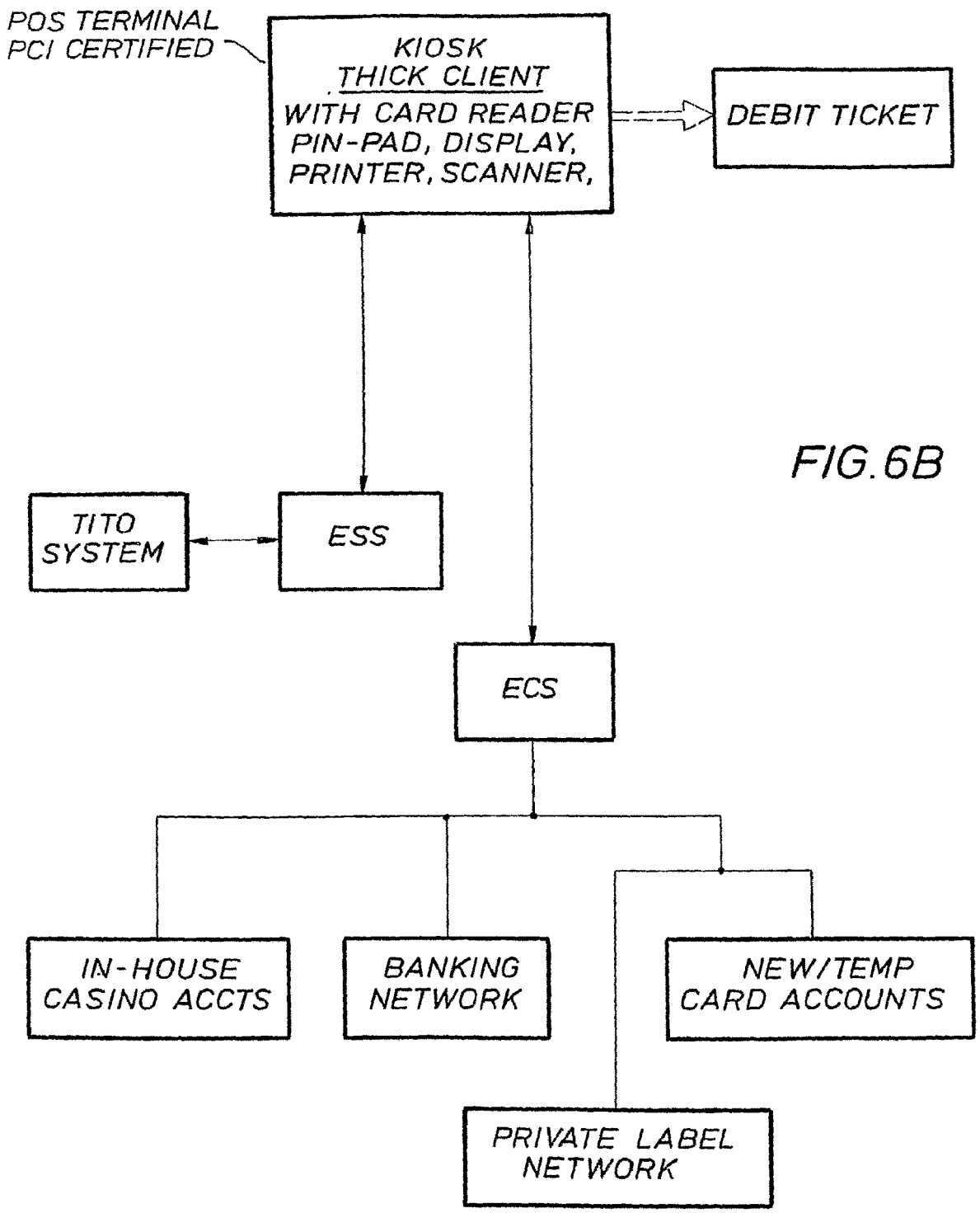

FIGS. 6A,B—Design #2: GE Server (or the Like) Delivers Funds

+ Visa PED certified terminal will save development cost and time to market over a thin client that is not certified.

+ Server level software can be leveraged for the EOB kiosk system.

+ Should require less development resources from gaming machine manufacturer compared to some other designs (i.e. #3).

+ No wireless segment will save cost.

↓ Cable pulls from kiosk to GE server result in less mobile unit. Slot floor reconfigurations will create more kiosk downtime than design option #1.

↓ GE server may need to reside at the casino because of funds delivery role.

↓ The kiosk system may come under more gaming regulatory scrutiny than if GE delivers funds.

↓ Software changes/updates at the kiosk level require more resources to manage/implement on a thick client than on a thin client.

Figure 7A:
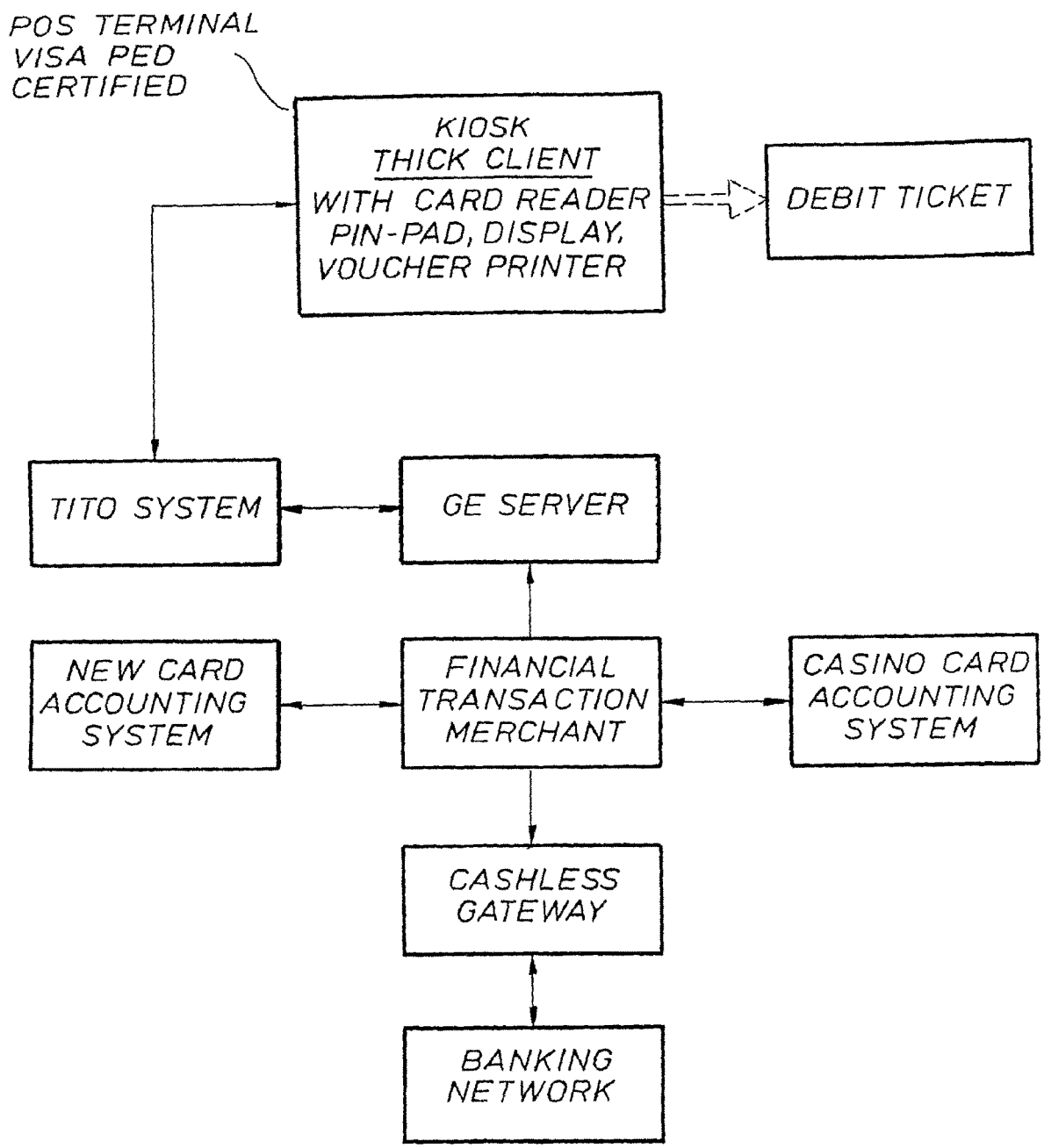
Figure 7B:
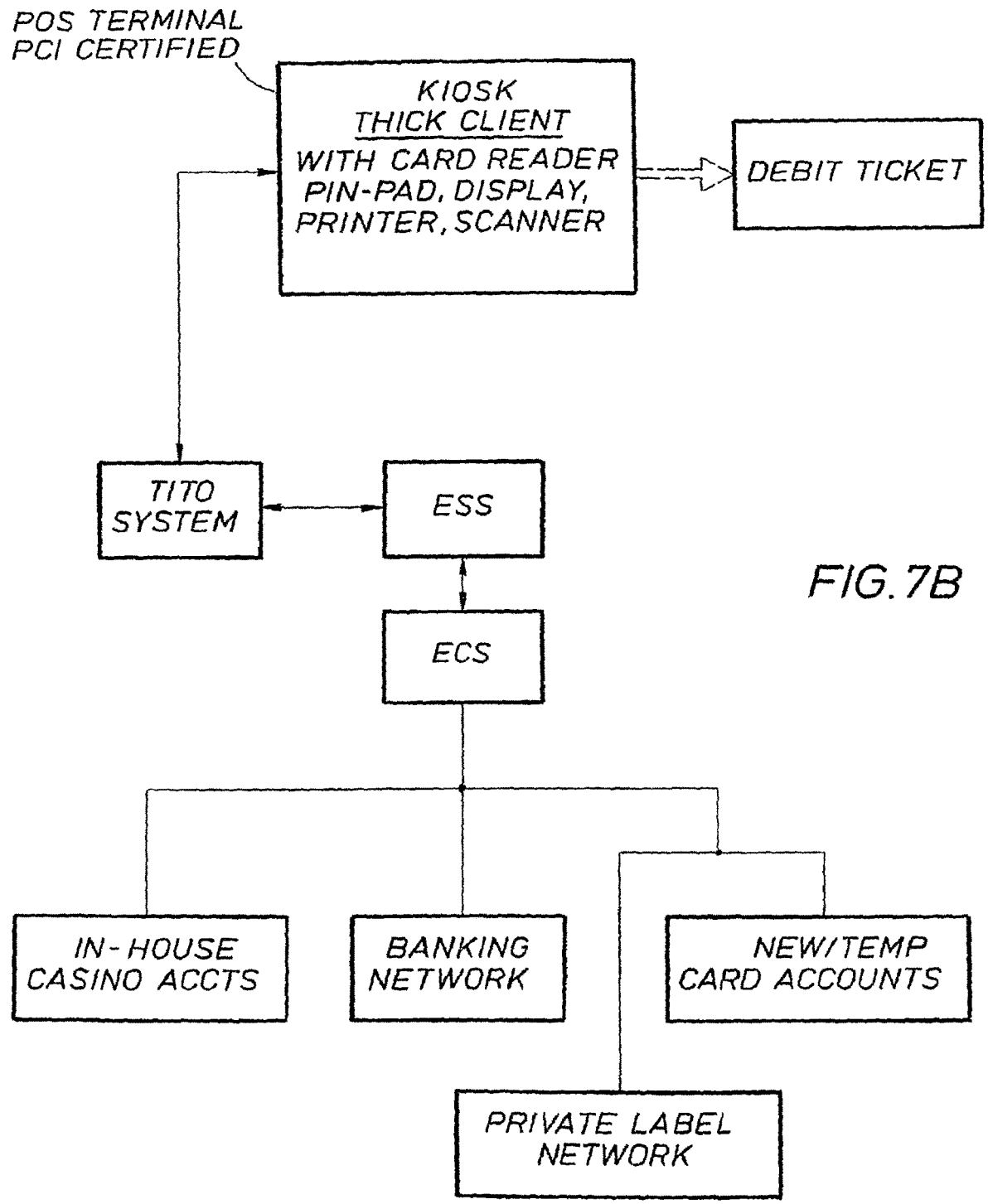

FIGS. 7A,B—Design #3: TITO Delivers Funds and Routes Auth Messaging

+ End-of-bank kiosk system should incur less scrutiny from gaming regulators because it does not deliver funds to kiosk.

+ Visa PED certified terminal will save developmental cost and time to market over a thin client that is not certified.

+ Server level software can be leveraged for the EOB kiosk system.

+ No wireless segment will save cost.

↓ Will require more development resources from gaming machine manufacturer TITO team for Auth message handling.

↓ Cable pulls from kiosk to TITO server result in less mobile unit. Slot floor reconfigurations will create more kiosk downtime than wireless solutions.

↓ Software changes/updates at the kiosk level require more resources to manage/implement on a thick client than on a thin client.

Figure 8A:
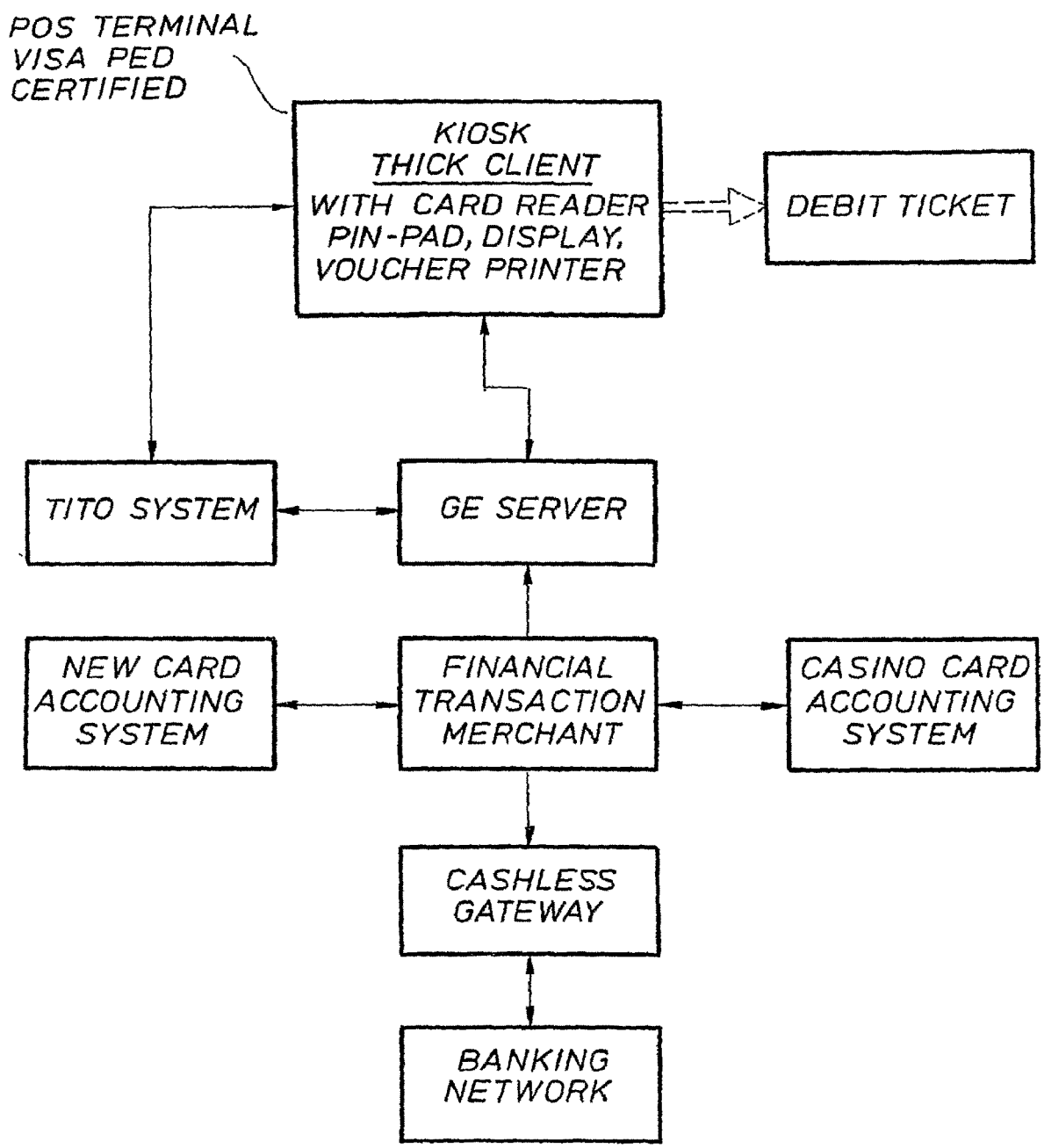
Figure 8B:
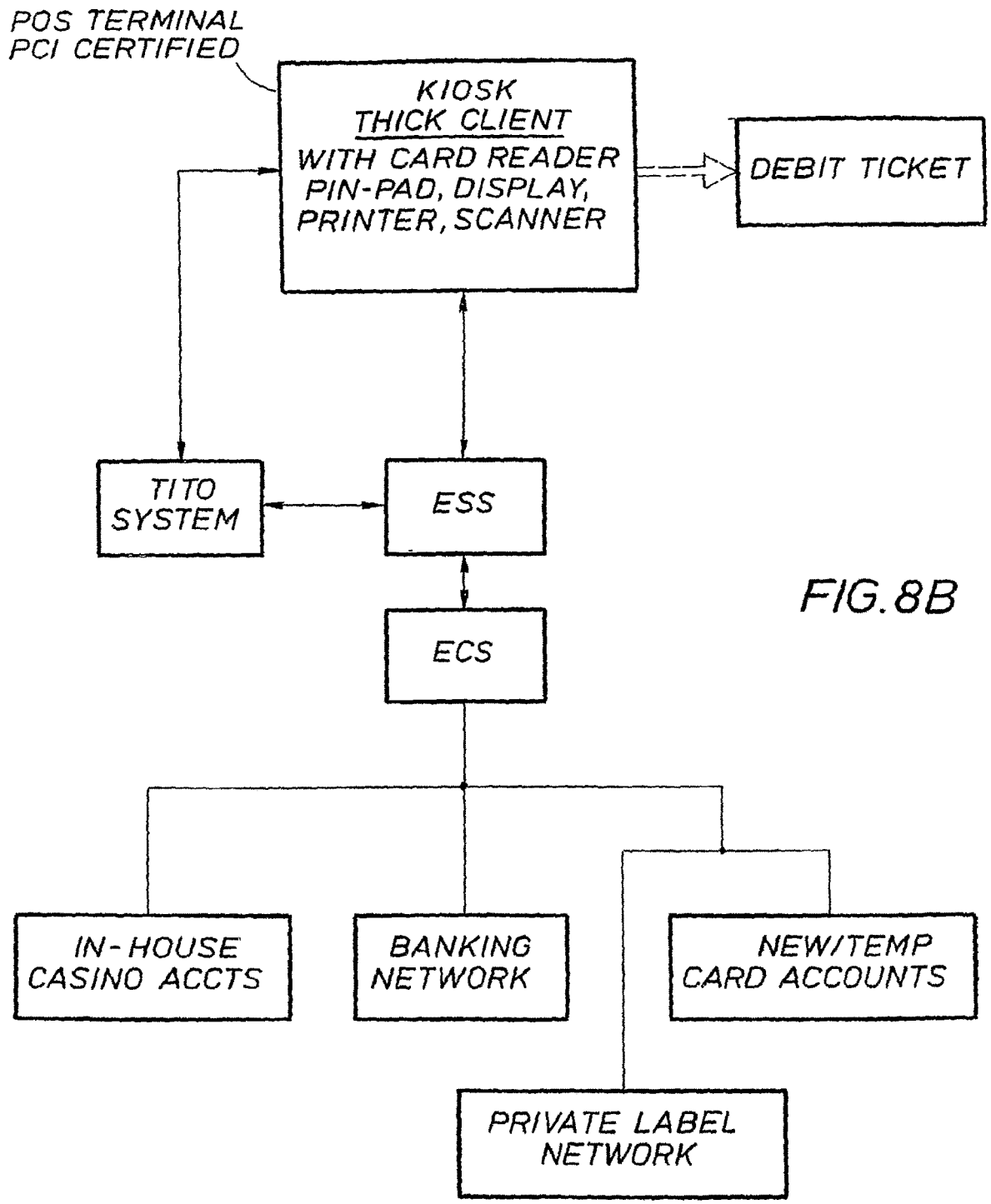

FIGS. 8A,B—Design #4: TITO System Delivers Funds

+ Should require less development resources from gaming machine manufacturer compared to other designs (i.e. #3).

+ Visa PED certified terminal will save development cost and time to market over a thin client that is not certified.

+ Server level software can be leveraged for the EOB kiosk system.

+ No wireless segment will save cost.

↓ Cable pulls from kiosk to TITO server and to GE server result in less mobile unit. Slot floor reconfigurations will create more kiosk downtime than wireless solutions.

↓ Cable pulls to both TITO system and GE server will add time and cost to implementation.

↓ GE server may need to reside at the casino because of funds delivery role.

↓ The kiosk system may come under more gaming regulatory scrutiny if GE delivers funds.

↓ Software changes/updates at the kiosk level require more resources to manage/implement on a thick client than on a thin client.

Figure 9A:
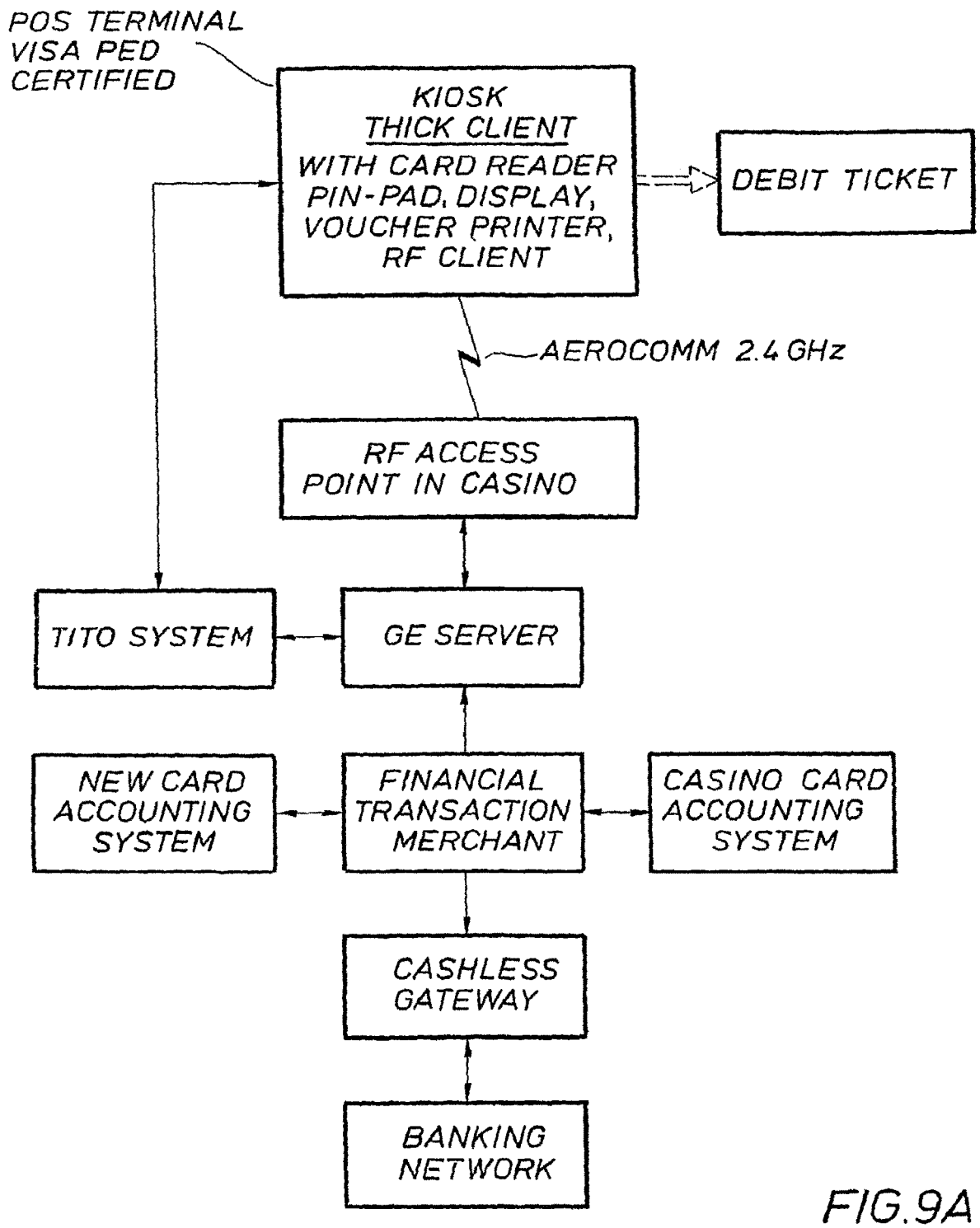
Figure 9B:
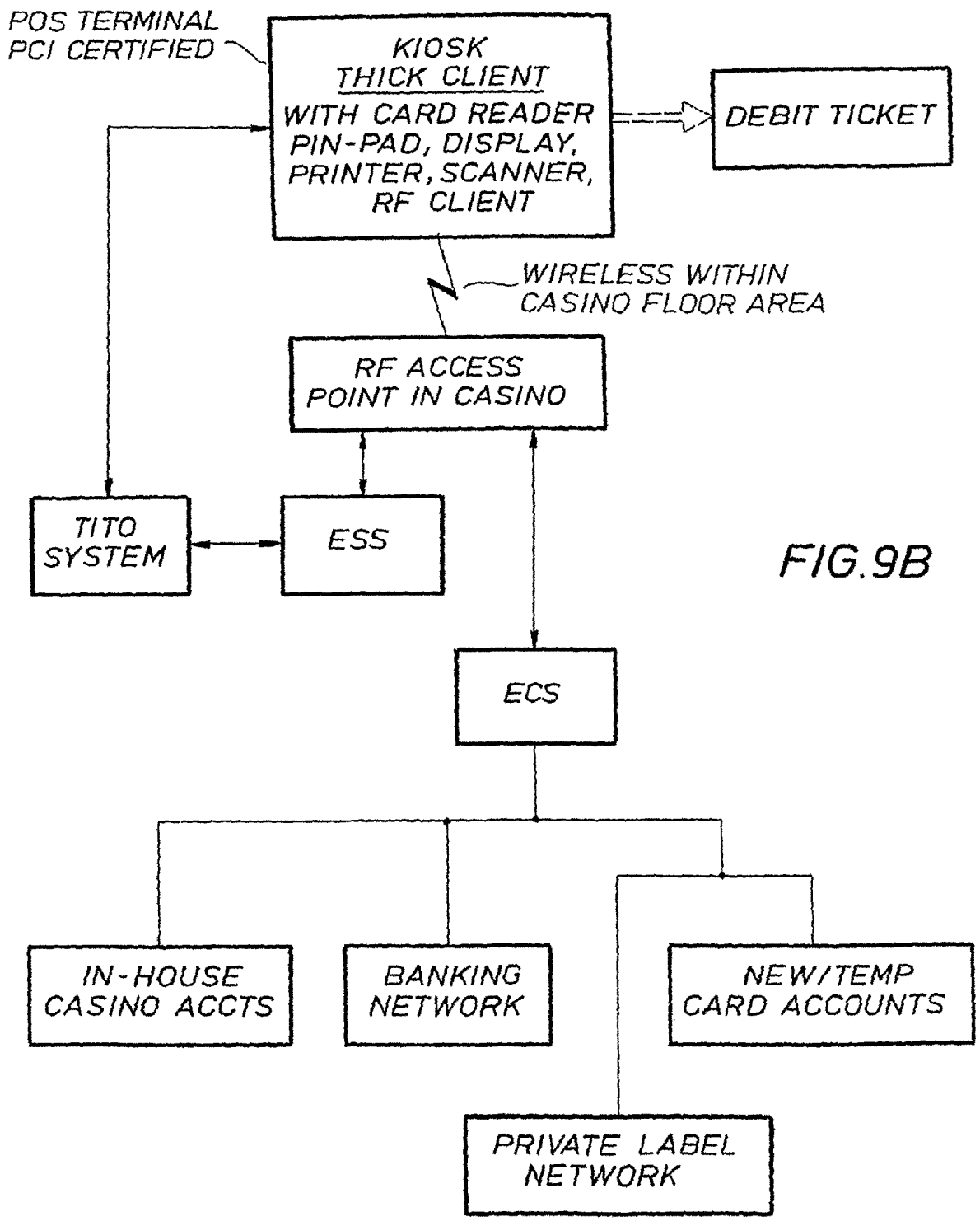

FIGS. 9A,B—Design #5: TITO System Delivers Funds

+ Visa PED certified terminal will save development cost and time to market over a thin client that is not certified.

+ Because of the thick client, the proprietary wireless solution can be used.

+ The proprietary wireless product has already proven itself within a casino environment.

+ Server level software can be leveraged for the EOB kiosk system.

↓ GE server may need to reside at the casino because of funds delivery role.

↓ The kiosk system may come under more gaming regulatory scrutiny if GE delivers funds.

↓ Software changes/updates at the kiosk level require more resources to manage/implement on a thick client than on a thin client.

↓ Will require cable pulls to both TITO system and RF access points in the ceiling which will add time and cost to implementation.

Figure 10A:
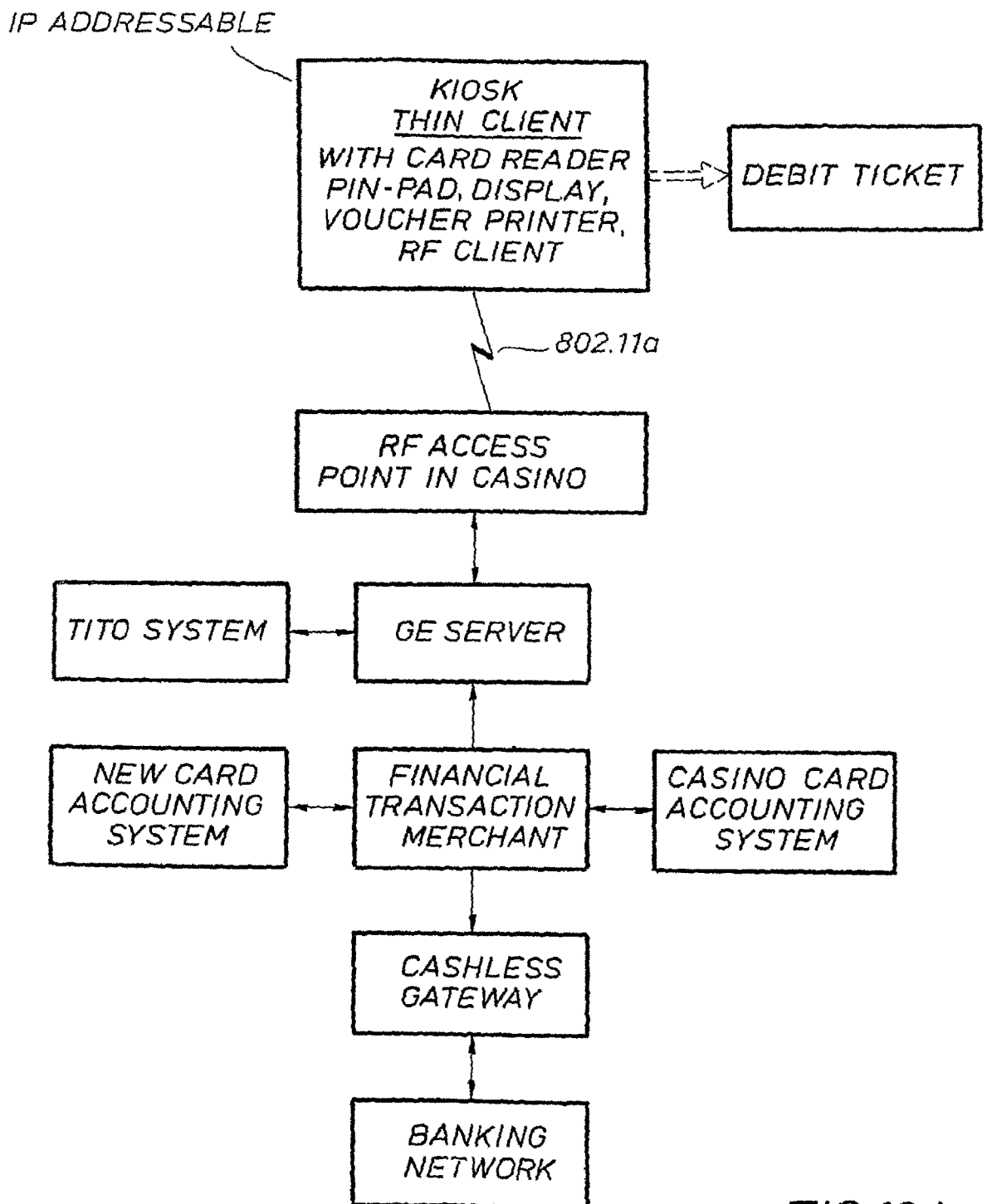
Figure 10B:
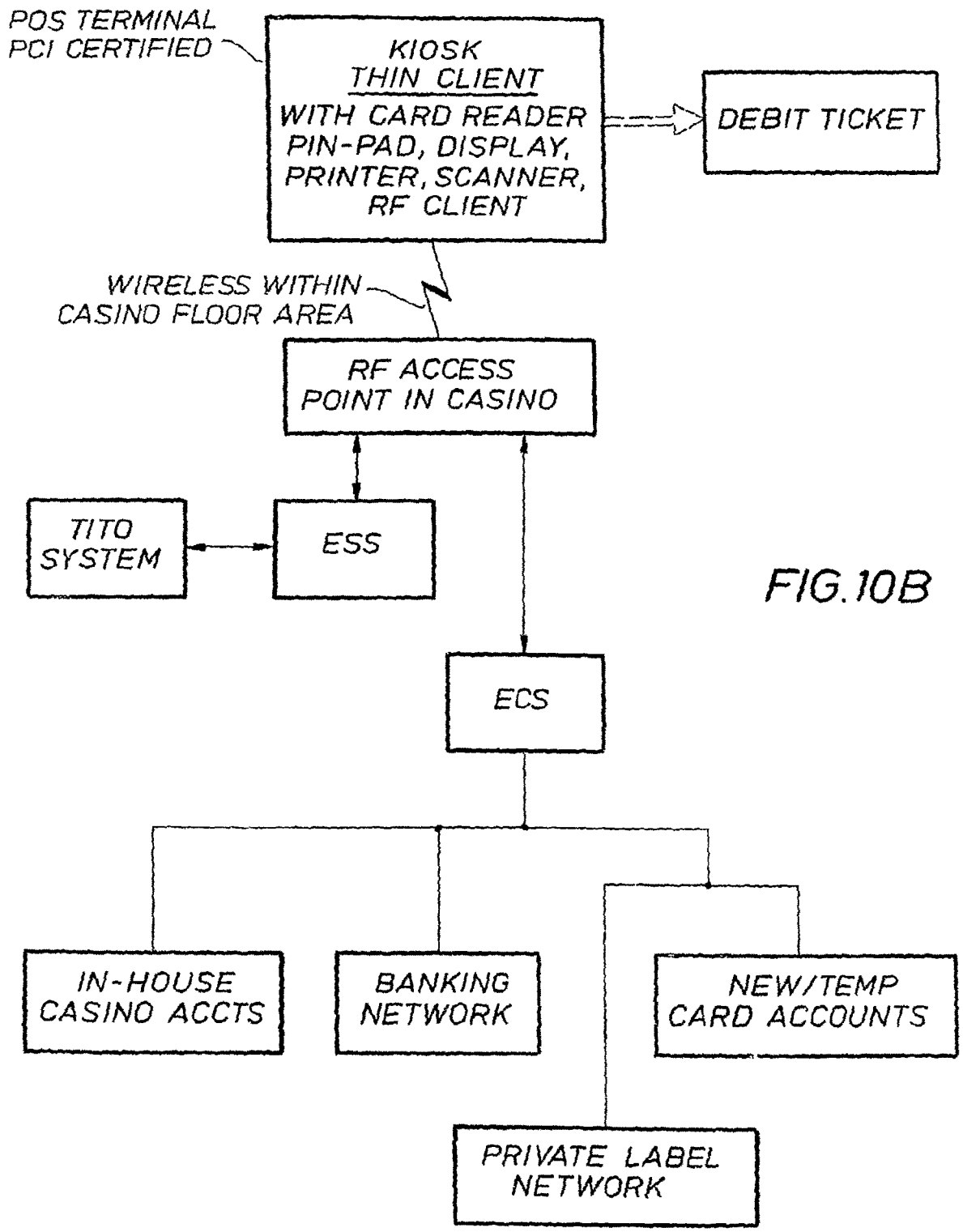

FIGS. 10A,B—Design #6: GE Server (or the Like) Delivers Funds

+ Completely wireless at slot floor level which eliminates the need to pull cables to slot banks. This mobility will minimize device downtime when slot floor reconfigurations occur.

+ Software changes/updates at the kiosk level require fewer resources to manage/implement on a thin client than on a thick client.

+ Should require less development resources from gaming machine manufacturer compared to other designs.

↓ 802.11 wireless has not been proven as a reliable RF solution within a casino environment for this type of application.

↓ GE server may need to reside at the casino because of funds delivery role.

↓ The kiosk system may come under more gaming regulatory scrutiny if GE delivers funds.

Figure 11A:
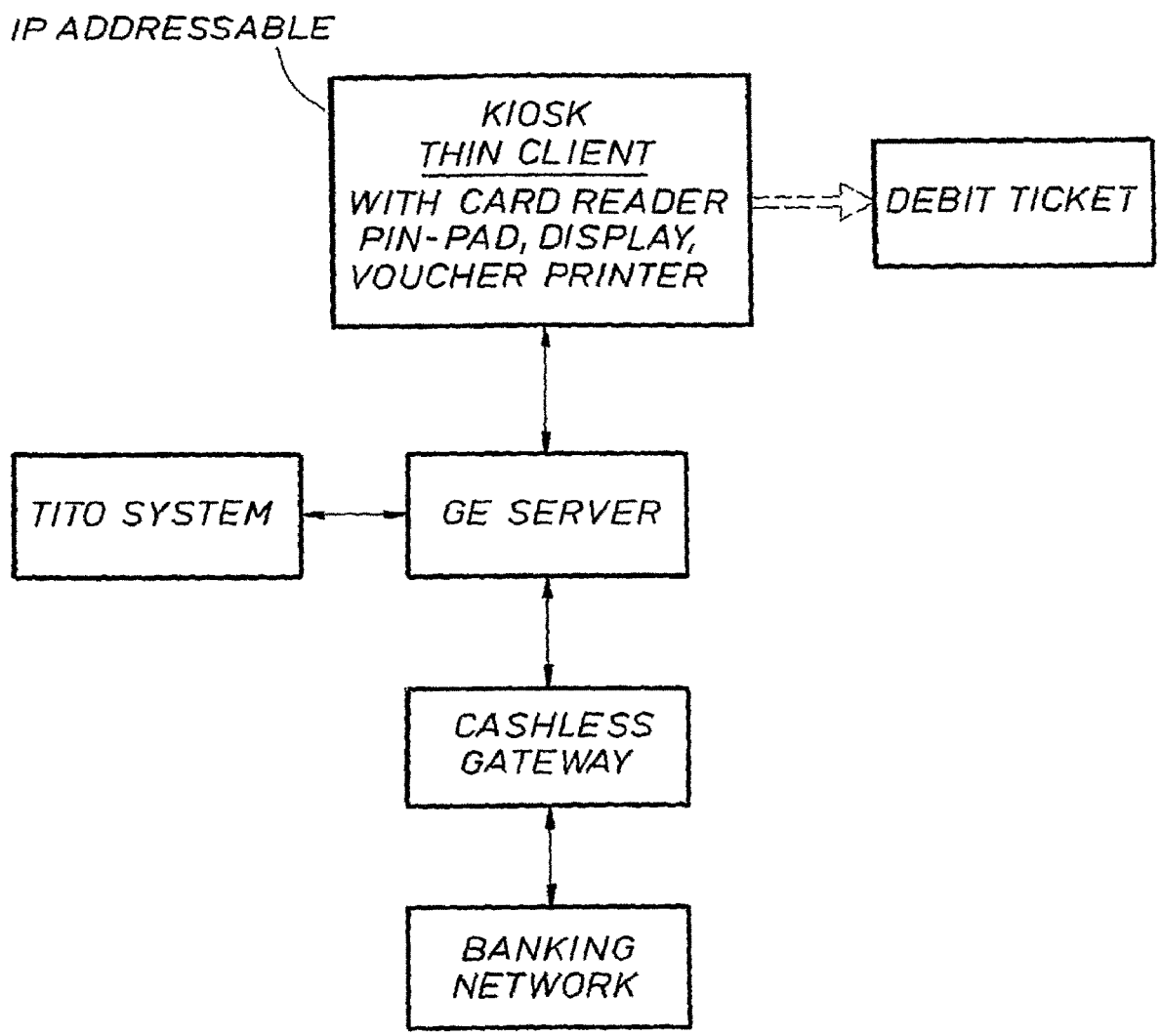
Figure 11B:
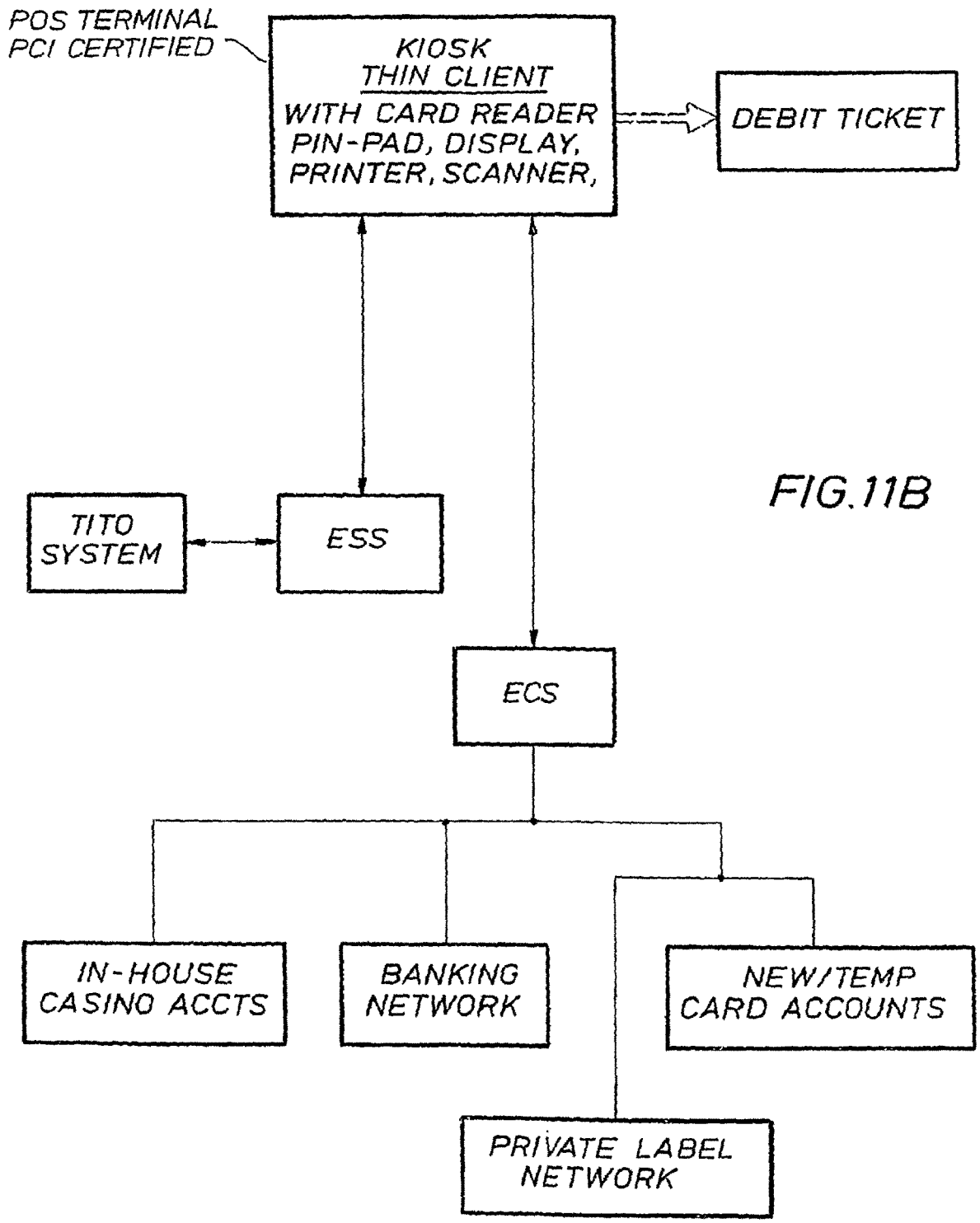

FIGS. 11A,B—Design #7: GE Server (or the Like) Delivers Funds

+ Software changes/updates at the kiosk level require fewer resources to manage/implement on a thin client than on a thick client.

+ Should require less development resources from gaming machine manufacturer compared to other designs (i.e. #3).

+ No wireless segment will save cost.

↓ Cable pulls from kiosk to GE server result in less mobile unit. Slot floor reconfigurations will create more kiosk downtime than wireless solutions.

↓ GE server may need to reside at the casino because of funds delivery role.

↓ The kiosk system may come under more gaming regulatory scrutiny if GE delivers funds.

Figure 12A:
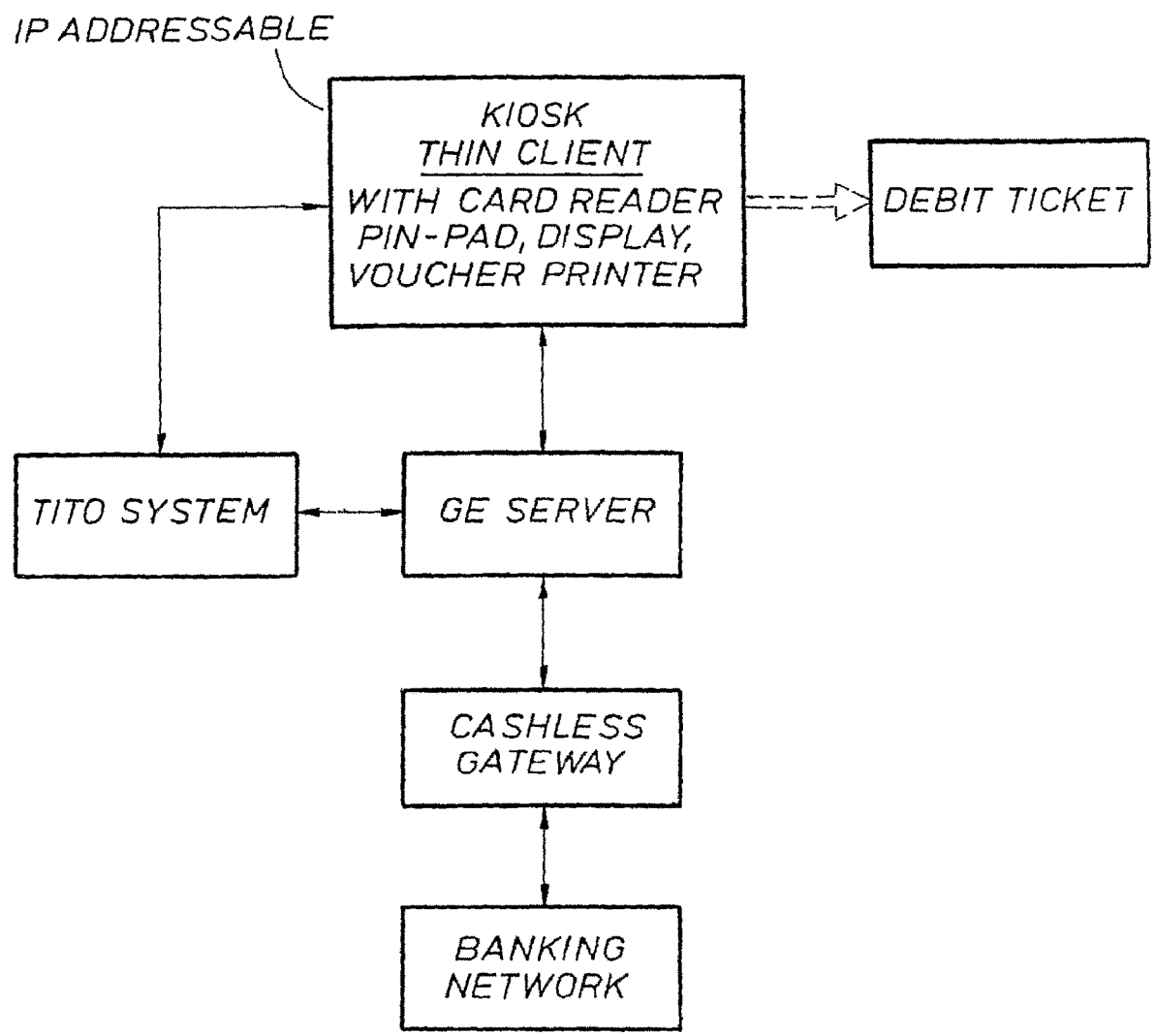
Figure 12B:
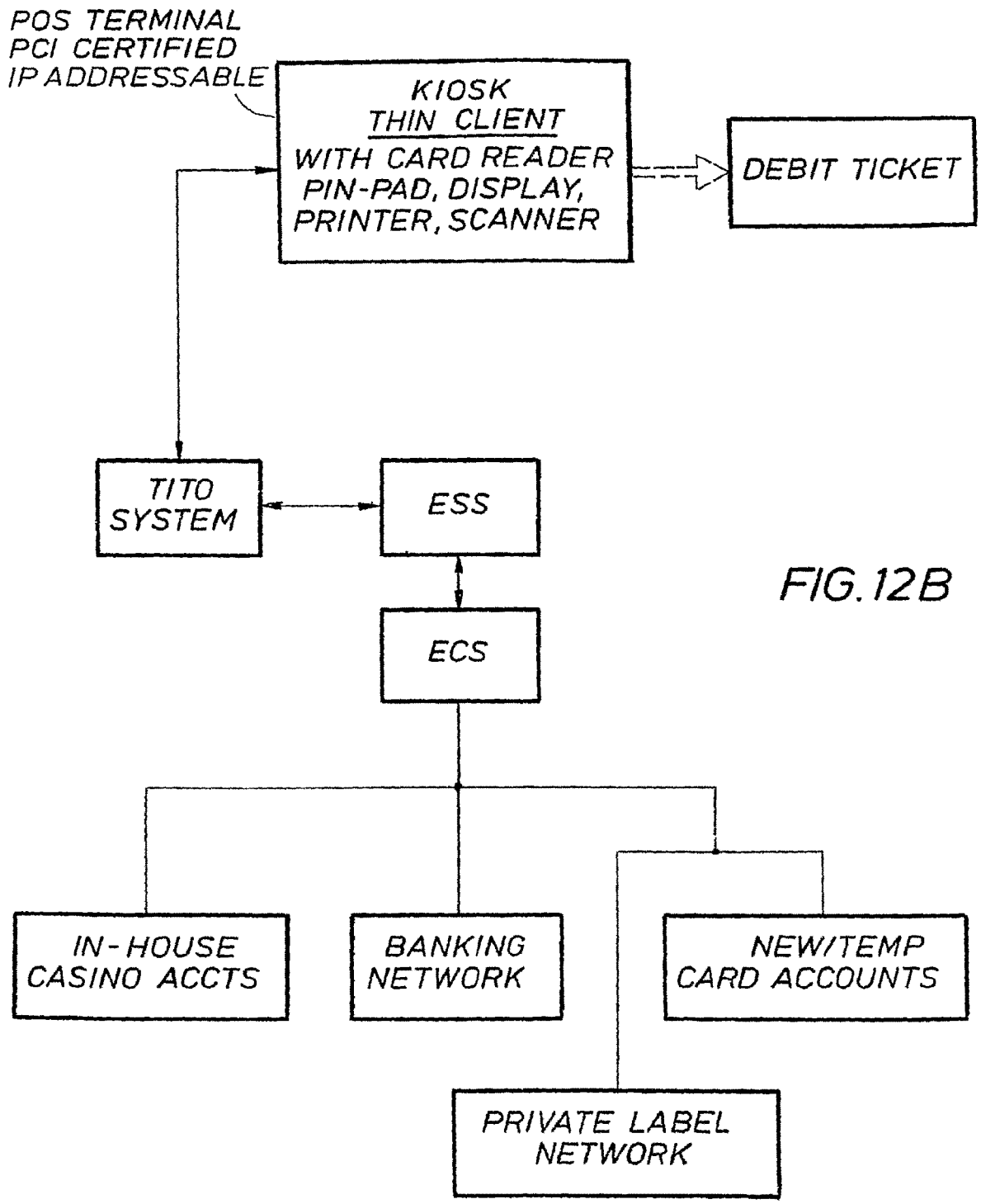

FIGS. 12A,B—Design #8: TITO Delivers Funds and Routes Auth Messaging

+ Software changes/updates at the kiosk level require fewer resources to manage/implement on a thin client than on a thick client.

+ Kiosk system should encounter less scrutiny from gaming regulators since GE server is not delivering funds.

+ No wireless segment will save cost.

↓ Will require more development resources from gaming machine manufacturer TITO team for Auth message handling.

↓ Cable pulls from kiosk to 1110 server result in less mobile unit. Slot floor reconfigurations will create more kiosk downtime than a wireless solution at the kiosk level.

↓ Will require cable pulls to both TITO system and RF access points in the ceiling which will add time and cost to implementation.

Figure 13A:
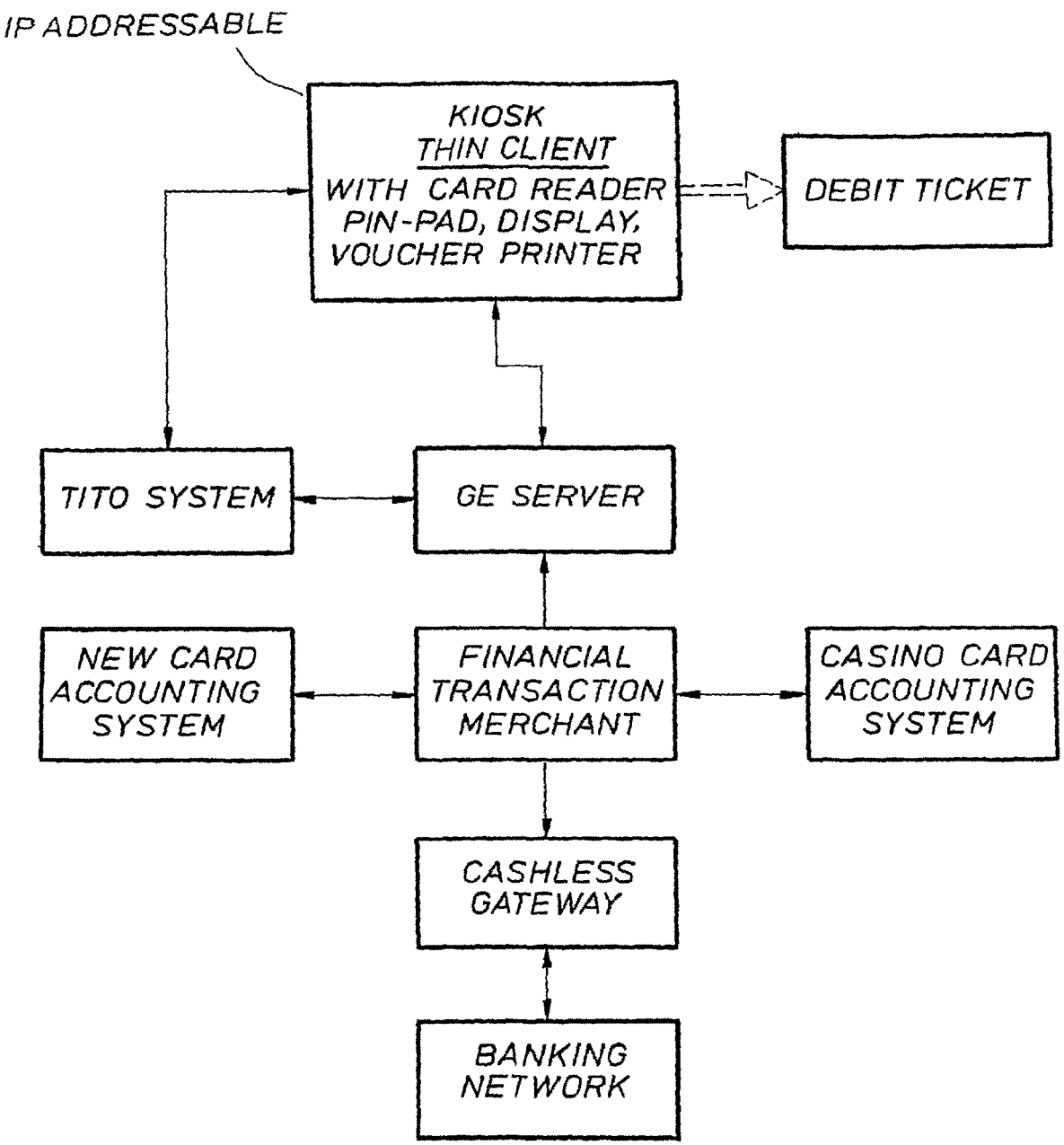
Figure 13B:
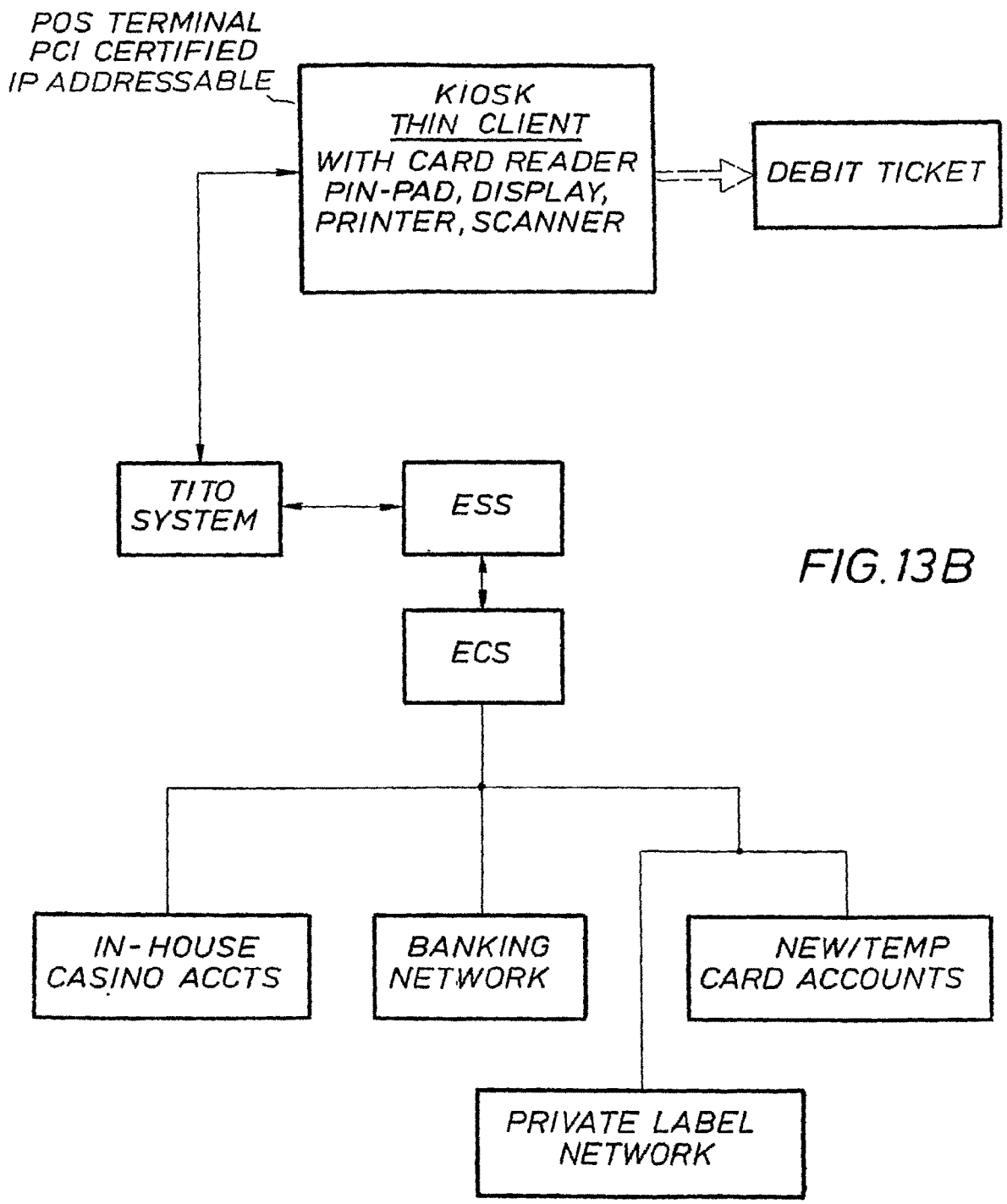

FIGS. 13A,B—Design #9: TM) System Delivers Funds

+ Software changes/updates at the kiosk level require fewer resources to manage/implement on a thin client than on a thick client.

+ Should require less development resources from Gaming Machine Manufacturer compared to designs that require TITO to deliver funds and/or route auth messaging.

+ No wireless segment will save cost.

↓ Cable pulls from kiosk to TITO server and to GE server result in less mobile unit. Slot floor reconfigurations will create more kiosk downtime than wireless solution.

↓ Will require more development resources from gaming machine manufacturer TITO team for ticket printing.

Figure 14A:
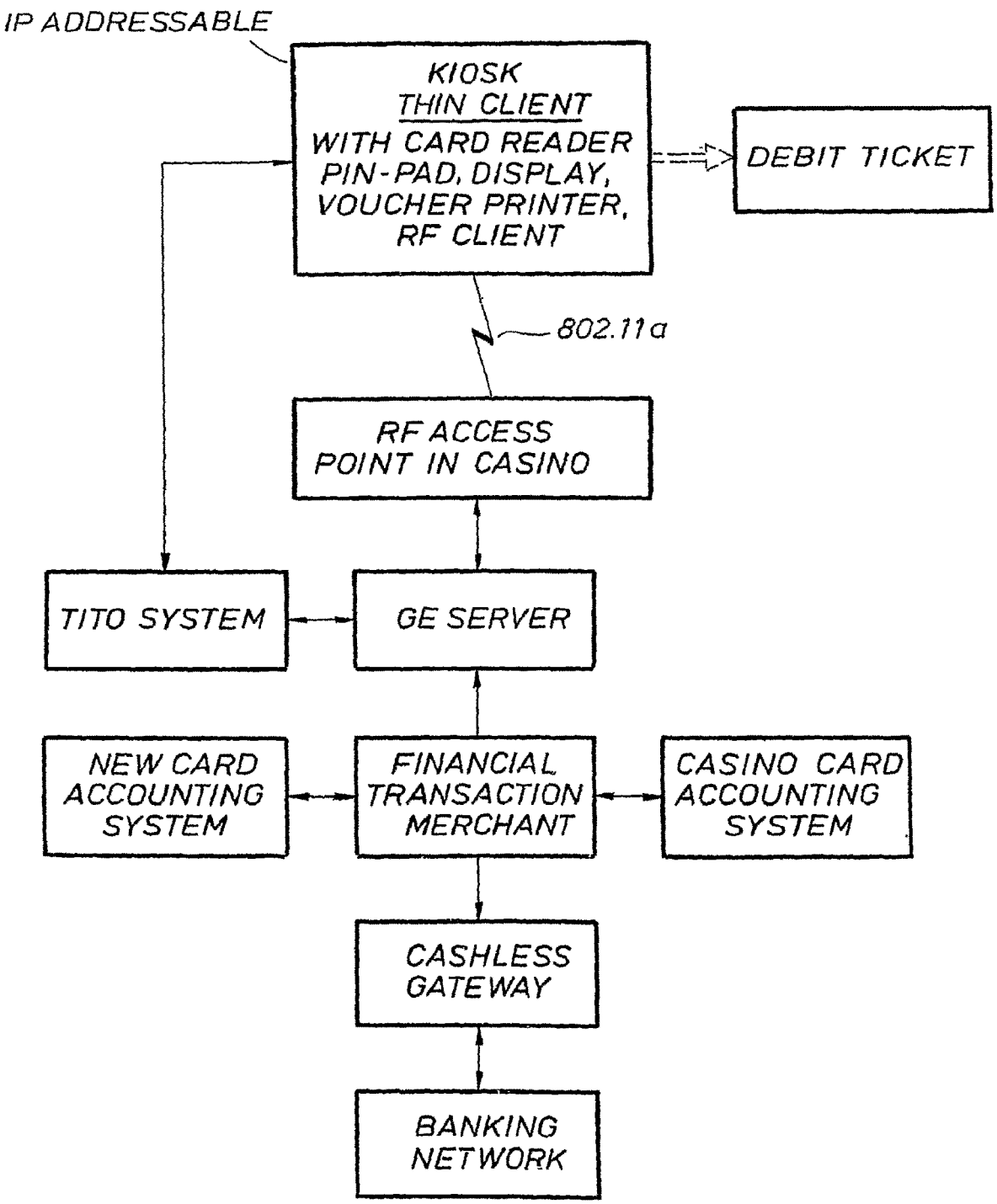
Figure 14B:
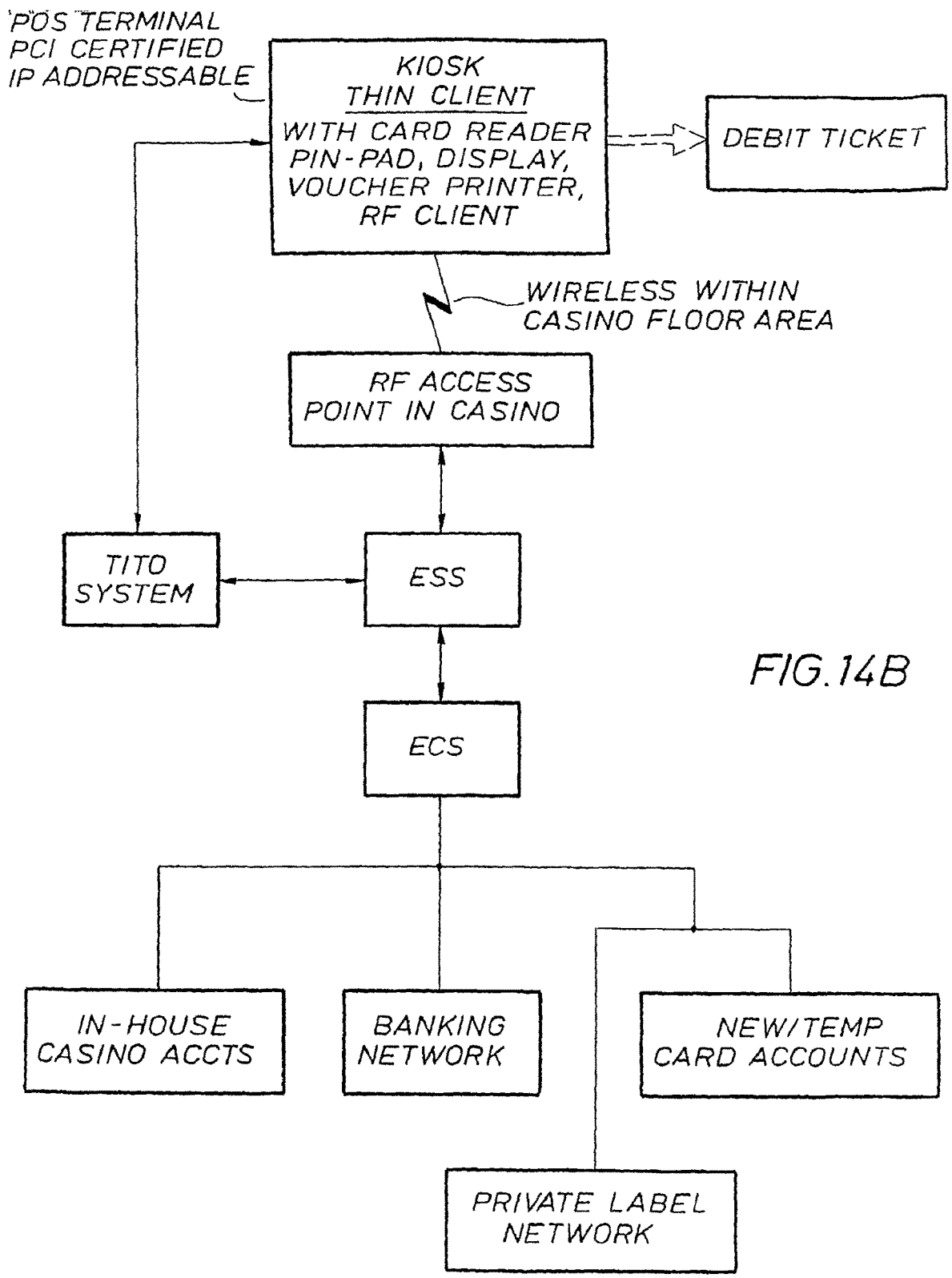

FIGS. 14A,B—Design #10: TITO System Delivers Funds

+ Kiosk system should encounter less scrutiny from gaming regulators since GE server is not delivering funds.

↓ 802.11 wireless has not been proven as a reliable RF solution within a casino environment for this type of application.

↓ Will require more development resources from gaming machine manufacturer and TITO team for Auth message handling.

↓ Will require cable pulls to both TITO system and RF access points in the ceiling which will add time and cost to implementation.

Figure 15A:
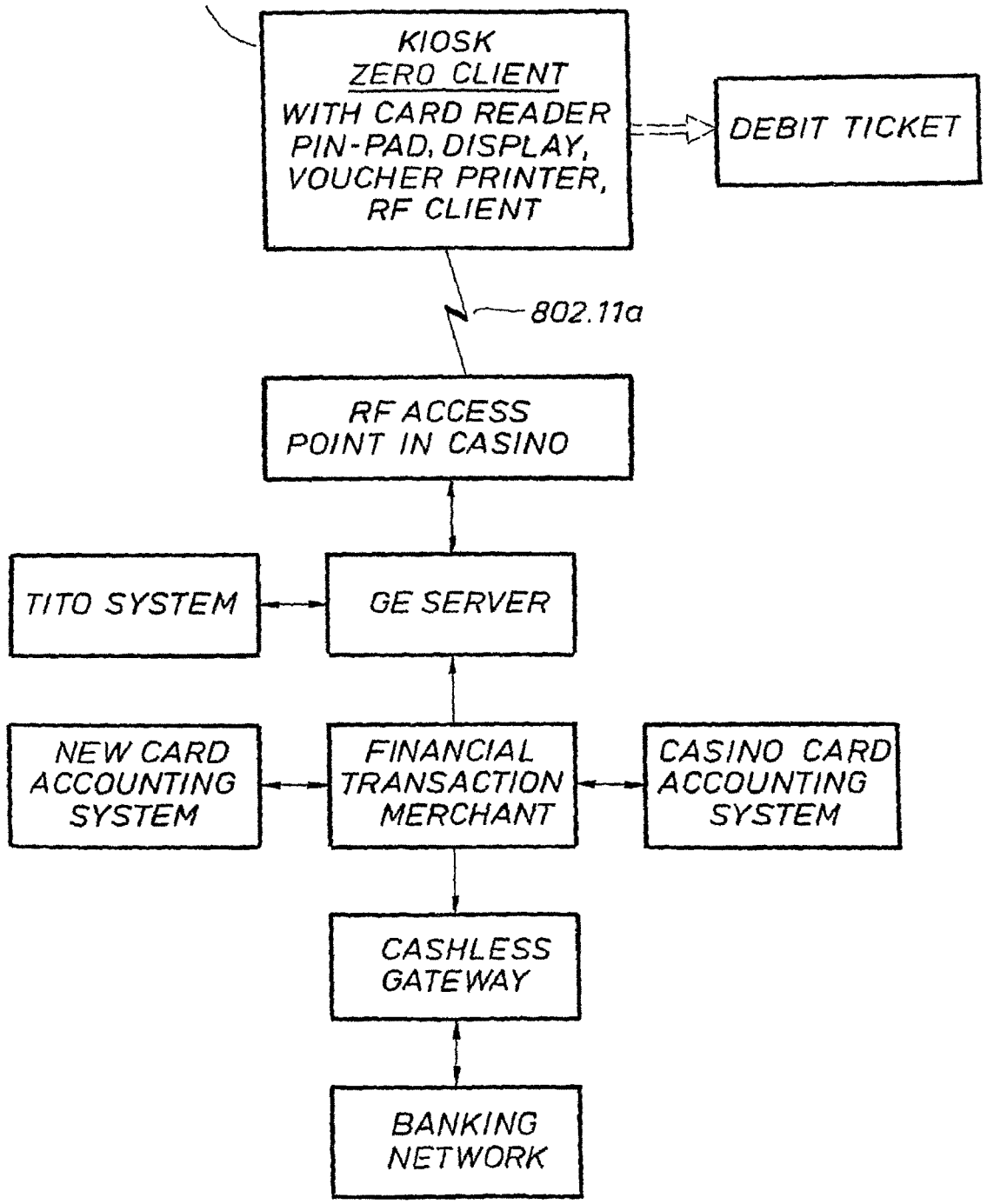
Figure 15B:
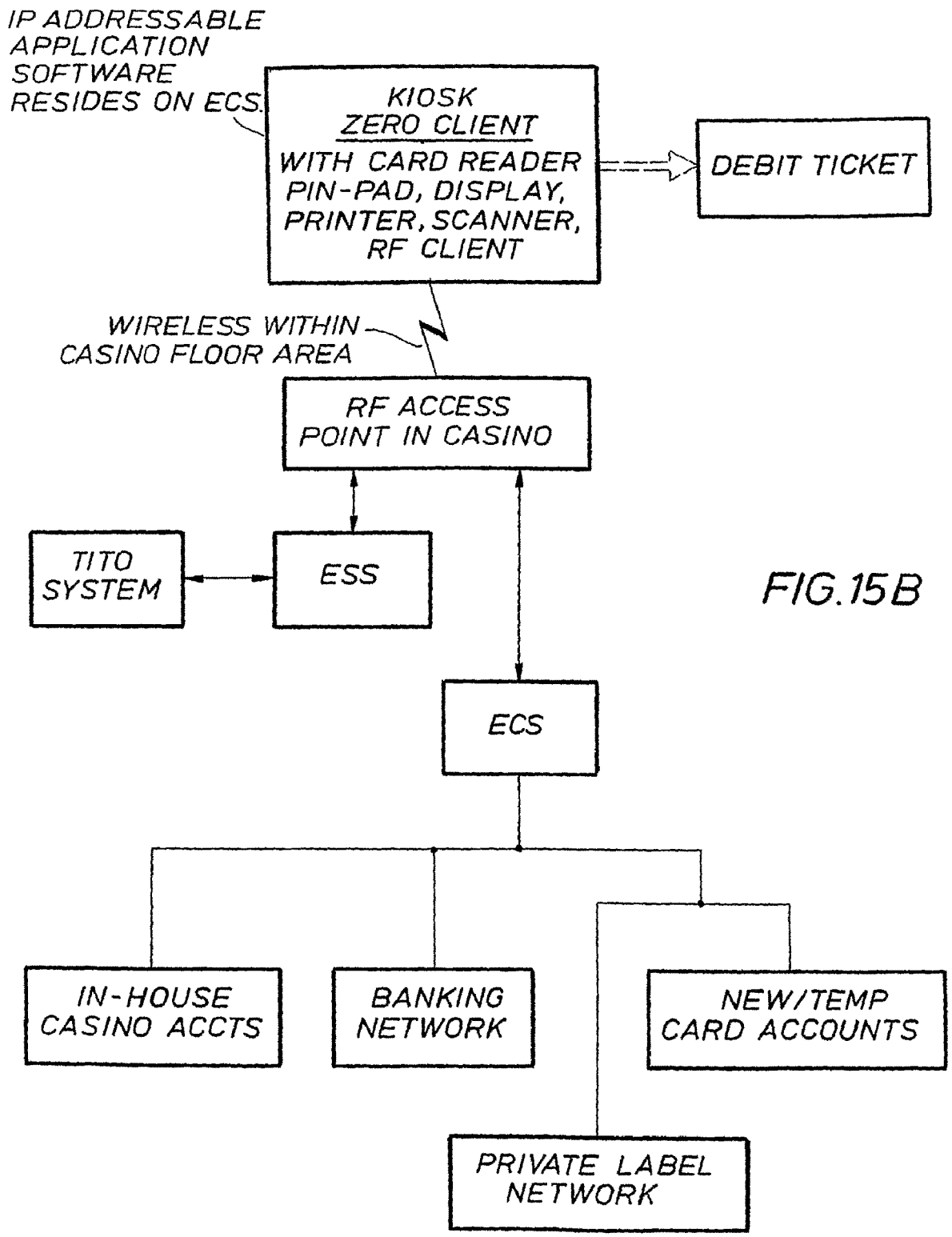

FIGS. 15A,B—Design #11: GE Server (or the Like) Delivers Funds

+ Zero client may save significant cost at the kiosk level.

+ Zero client is the most effective approach for accomplishing quick software updates/enhancements at kiosk.

+ Should require fewer resources from gaming machine manufacturer since GE Server is delivering funds.

↓ Response time is a concern.

↓ GE server may need to reside at the casino because of funds delivery role.

↓ The kiosk system may come under more gaming regulatory scrutiny if GE delivers funds.

↓ 802.11 wireless has not been proven as a reliable RF solution within a casino environment for this type of application.

Figure 16A:
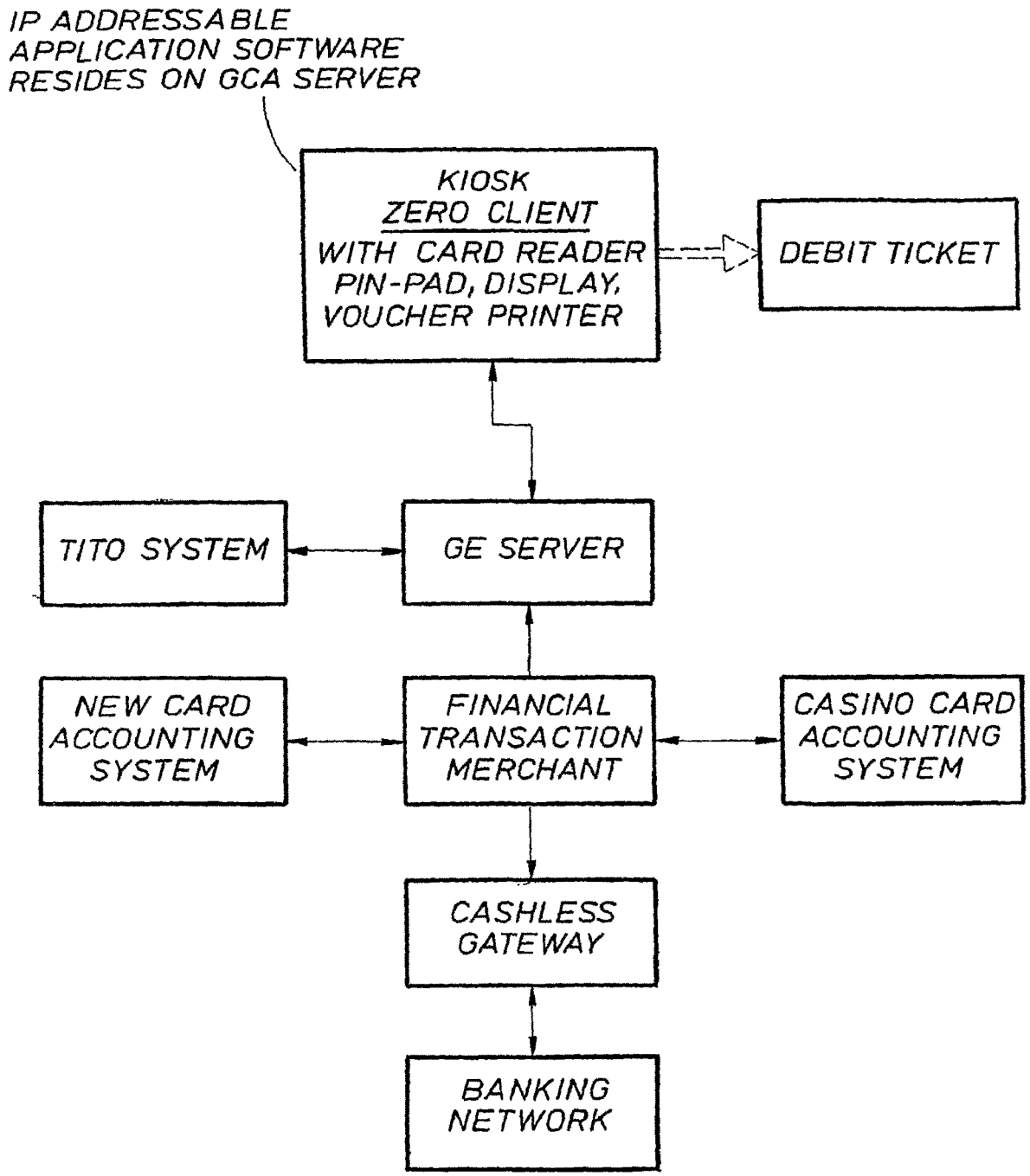
Figure 16B:
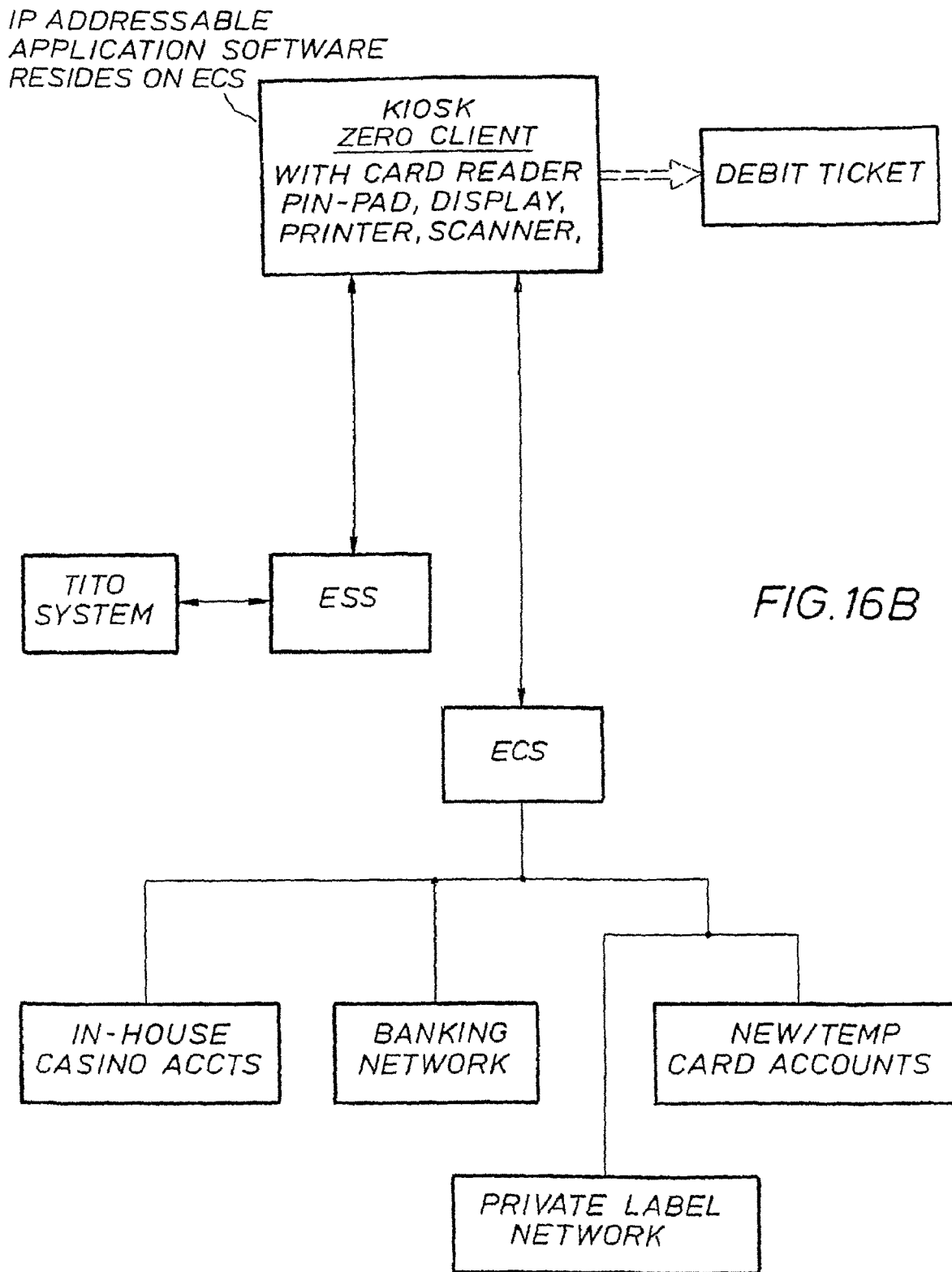

FIGS. 16A,B—Design #12: GE Server (or the Like) Delivers Funds

+ Zero client may save significant cost at the kiosk level.

+ Zero client is the most effective approach for accomplishing quick software updates/enhancements at kiosk.

+ No wireless segment will lower cost.

↓ Response time is a concern.

↓ GE server may need to reside at the casino because of funds delivery role.

↓ The kiosk system may come under more gaming regulatory scrutiny if GE delivers funds.

Figure 17A:
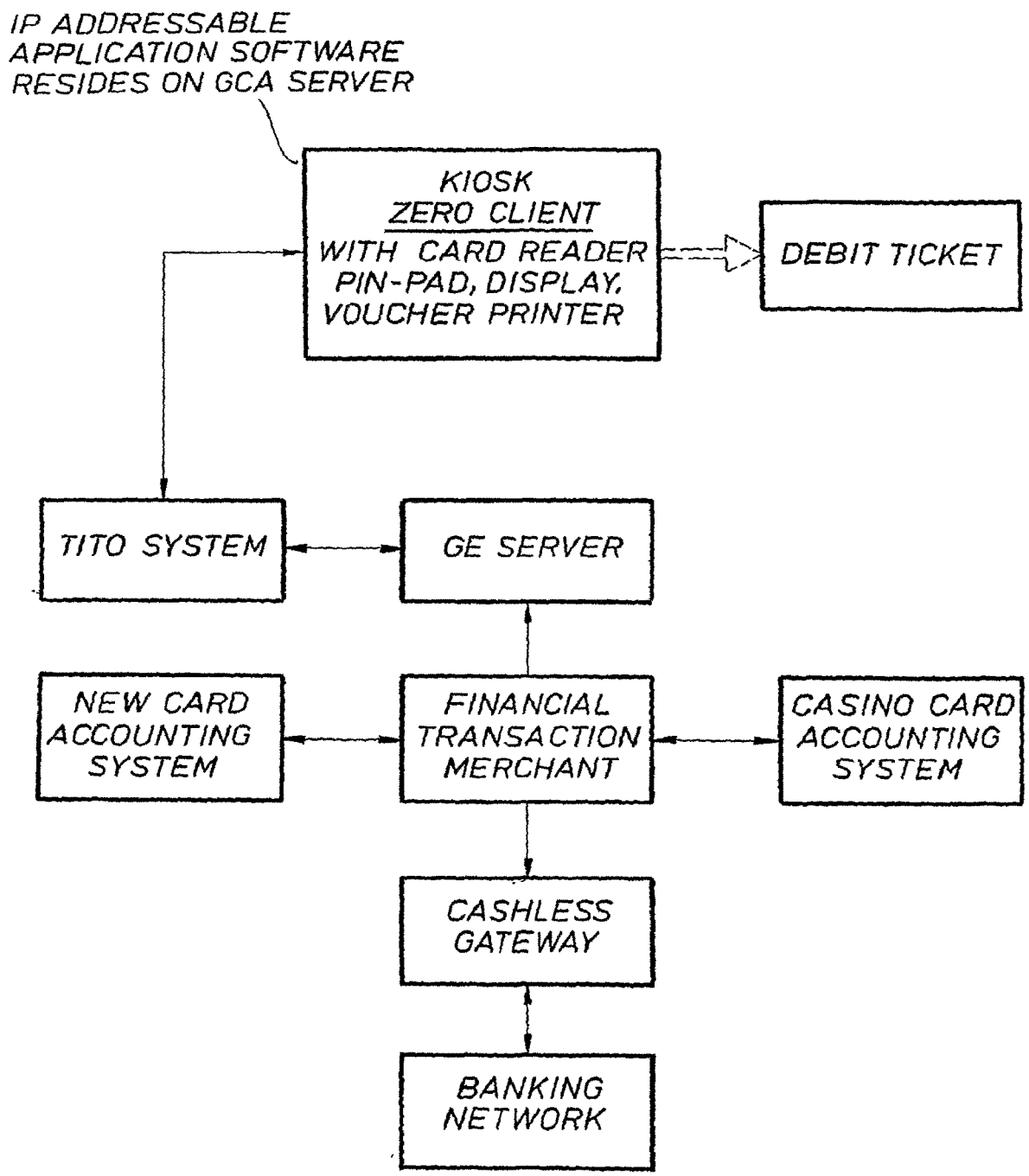
Figure 17B:
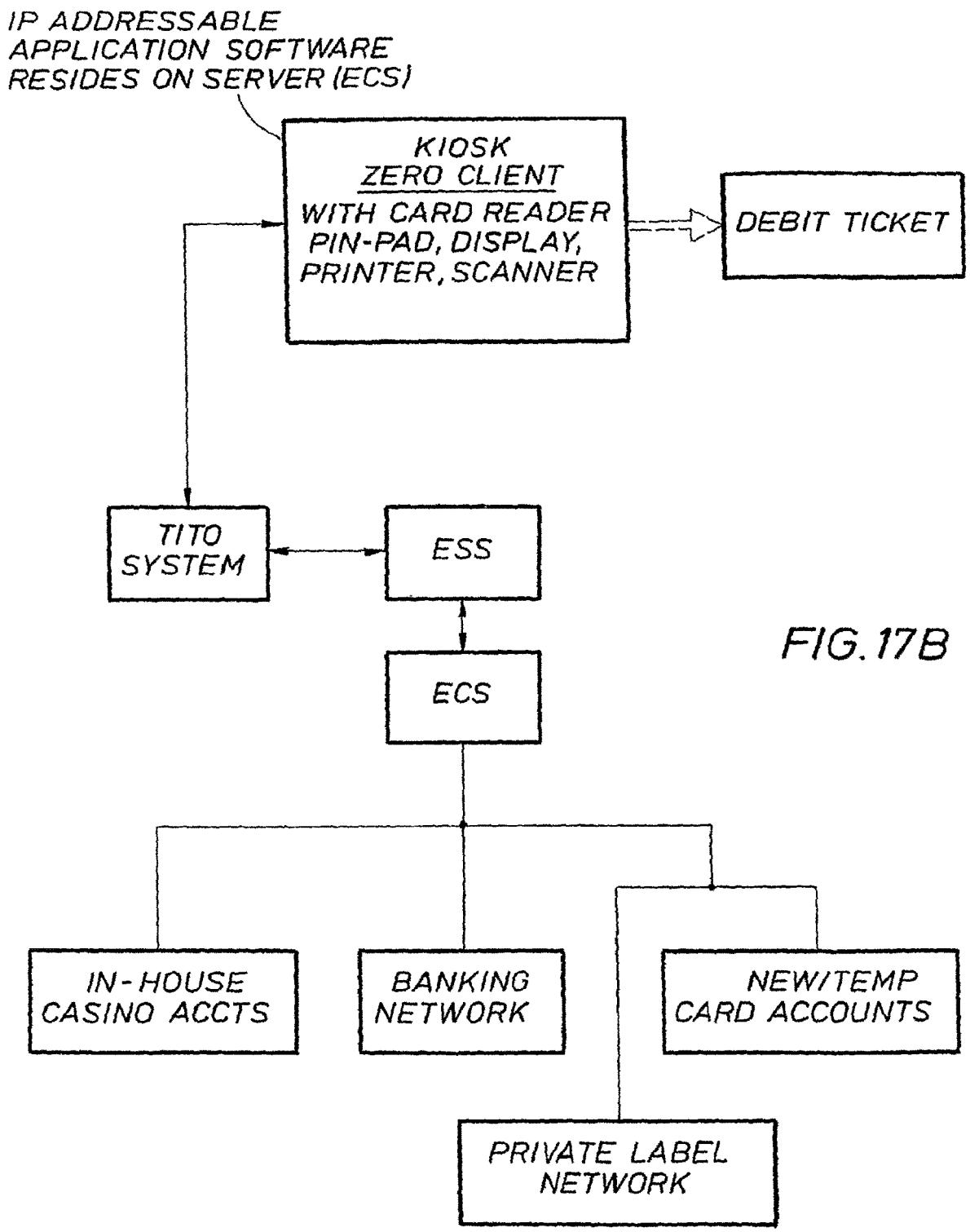

FIGS. 17A,B—Design #13: TITO Delivers Funds and Routes Auth Messaging

+ Zero client may save significant cost at the kiosk level.

+ Zero client is the most effective approach for accomplishing quick software updates/enhancements at kiosk.

+ No wireless segment will lower cost.

+ End-of-bank kiosk system should incur less scrutiny from gaming regulators because it does not deliver funds to kiosk.

↓ Response time is a concern.

↓ Will require more development resources from gaming machine manufacturer and 1110 team for Auth message handling.

Figure 18A:
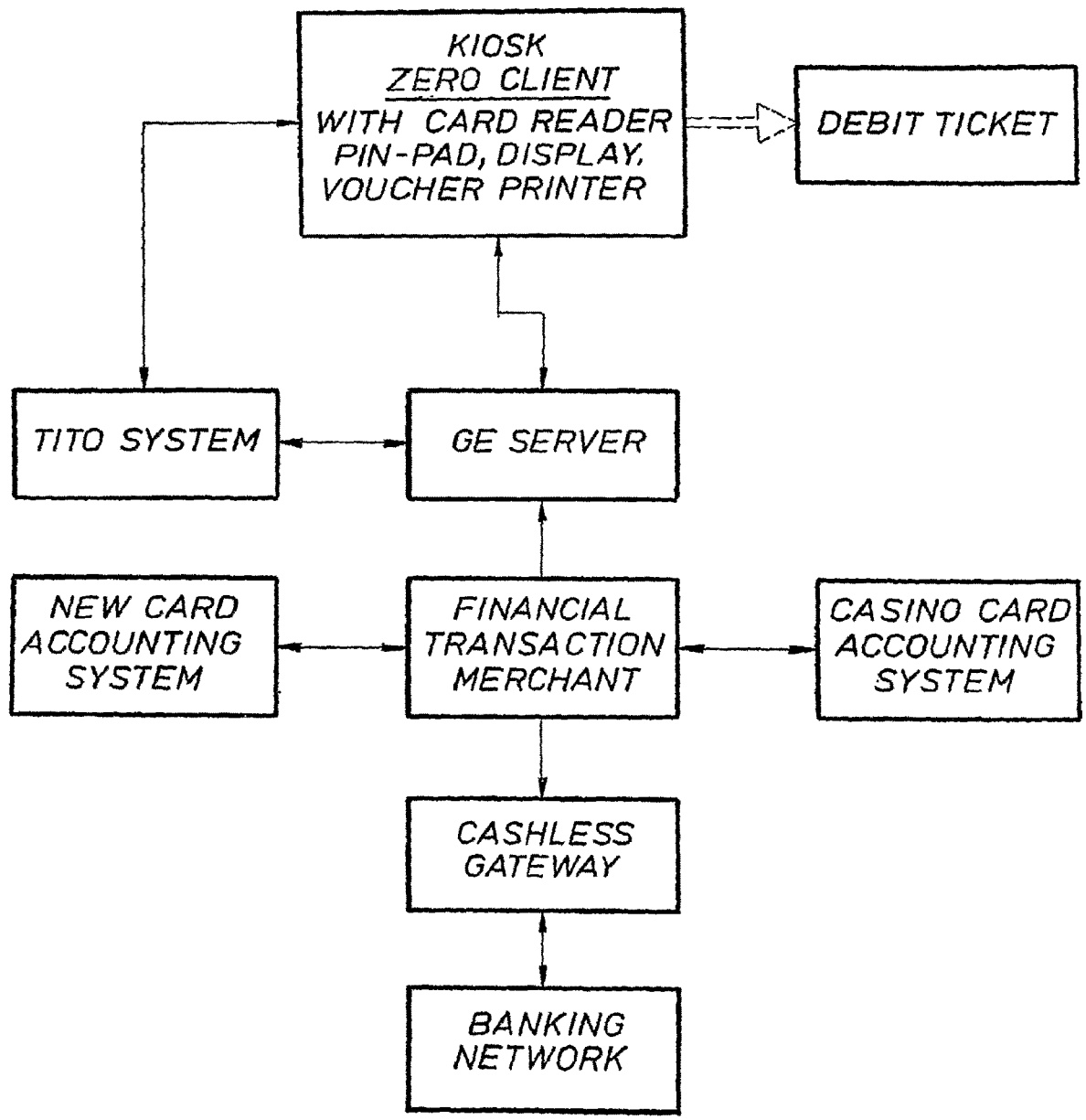
Figure 18B:
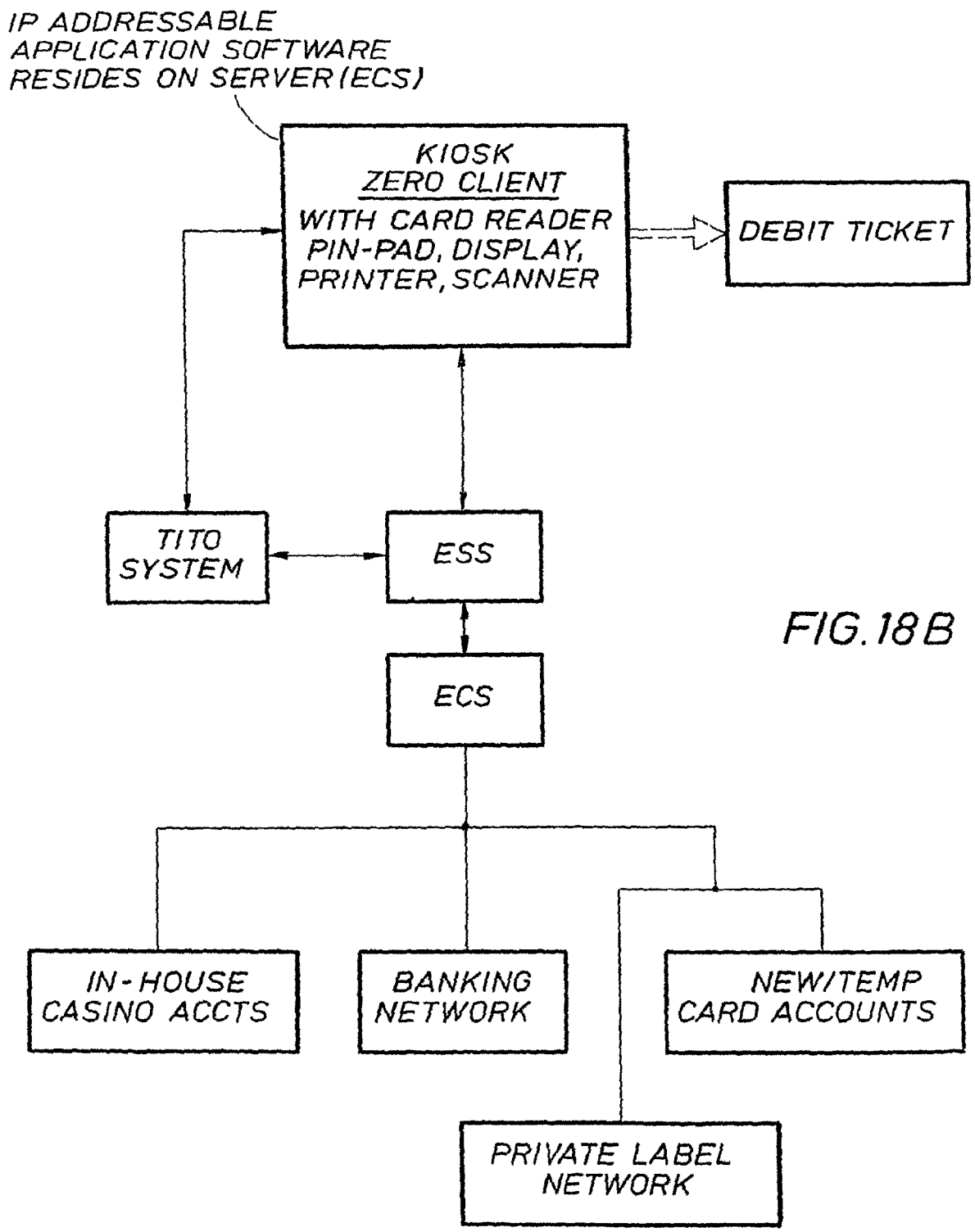

FIGS. 18A,B—Design #14: TITO System Delivers Funds

+ Zero client may save significant cost at the kiosk level.

+ Zero client is the most effective approach for accomplishing quick software updates/enhancements at kiosk.

+ No wireless segment will lower cost.

↓ Response time is a concern.

↓ Will require more development resources from gaming machine manufacturer and TITO team for funds delivery.

↓ Cable pulls to both TITO system and GE server will add time and cost to implementation.

Figure 19A:
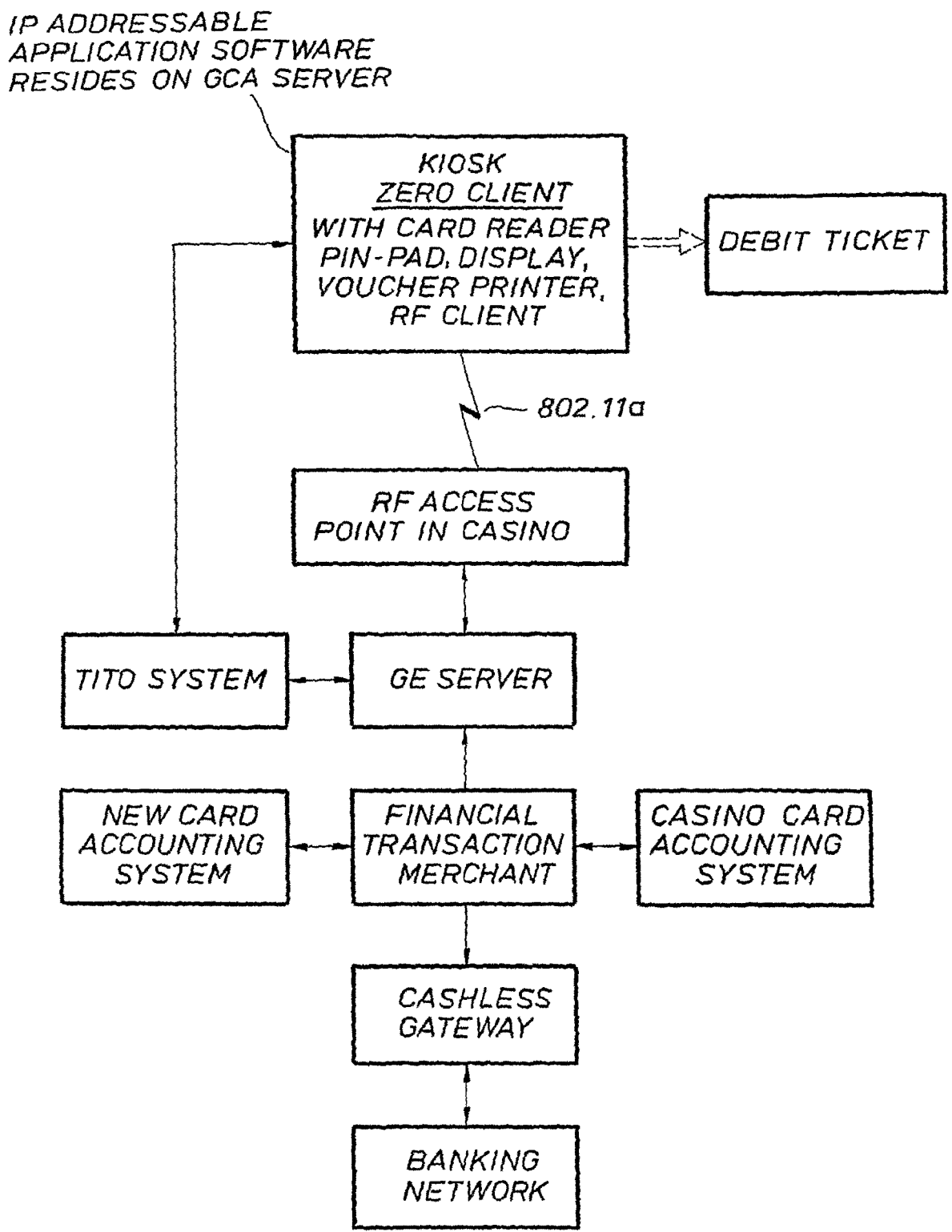
Figure 19B:
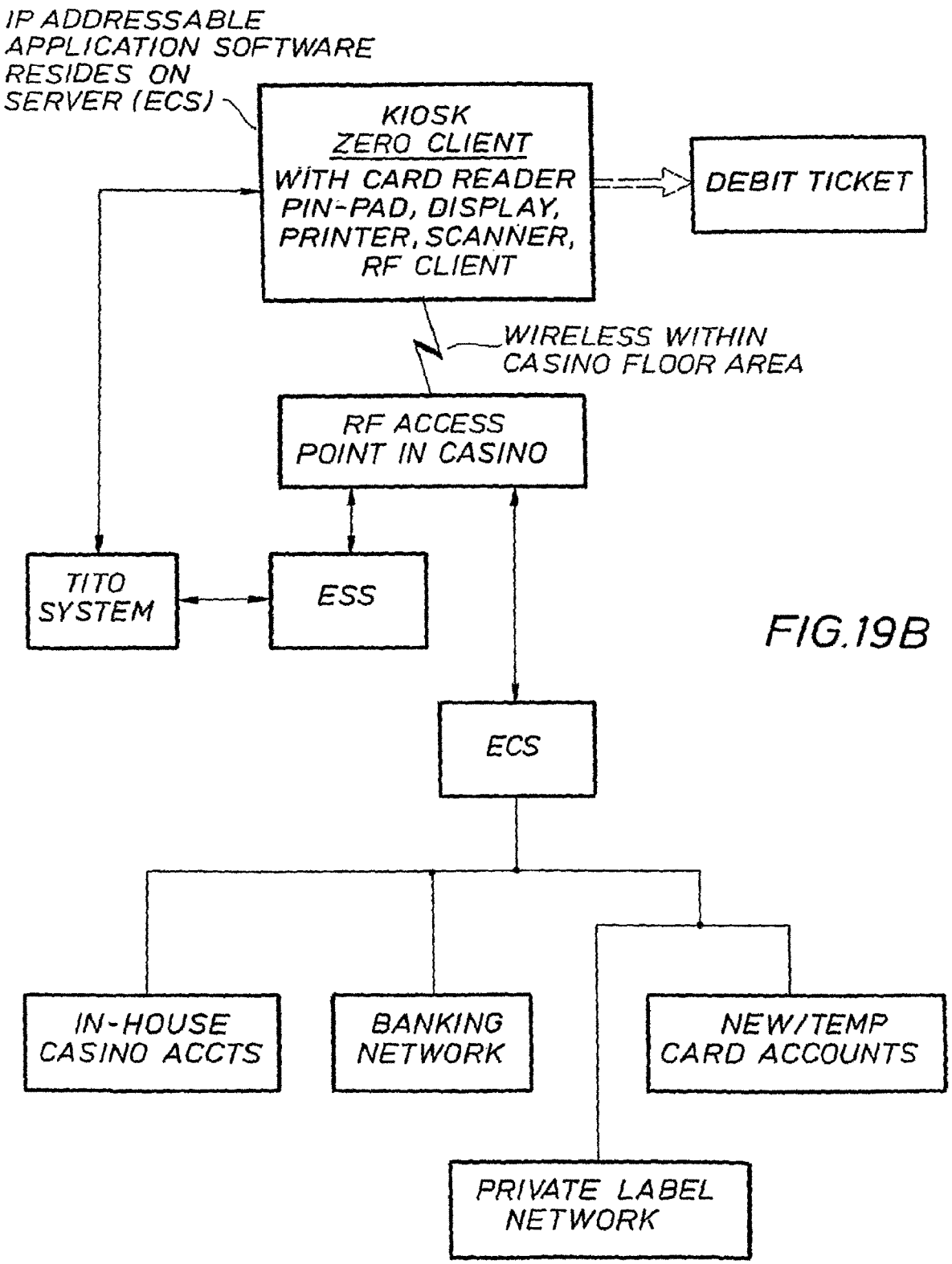

FIGS. 19A, B—Design #15: TITO System Delivers Funds

+ Zero client may save significant cost at the kiosk level.

+ Zero client is the most effective approach for accomplishing quick software updates/enhancements at kiosk.

↓ Response time is a concern.

↓ Will require more development resources from gaming machine manufacturer and TITO team of funds delivery.

↓ 802.11 wireless has not been proven as a reliable RF solution within a casino environment for this type of application.

↓ Will require cable pulls to both TITO system and RF access points in the ceiling which will add time and cost to implementation.

Design functionability for the server level includes back-office software that can be used for reconciliation, reporting, diagnostics and troubleshooting, and interface to banking network. Because gaming regulation requirements vary by jurisdiction, the server topology should support two configurations relative to the GE:

(1) GE located at the financial processor data center; and
(2) GE located within the casino.

Figure 20A:
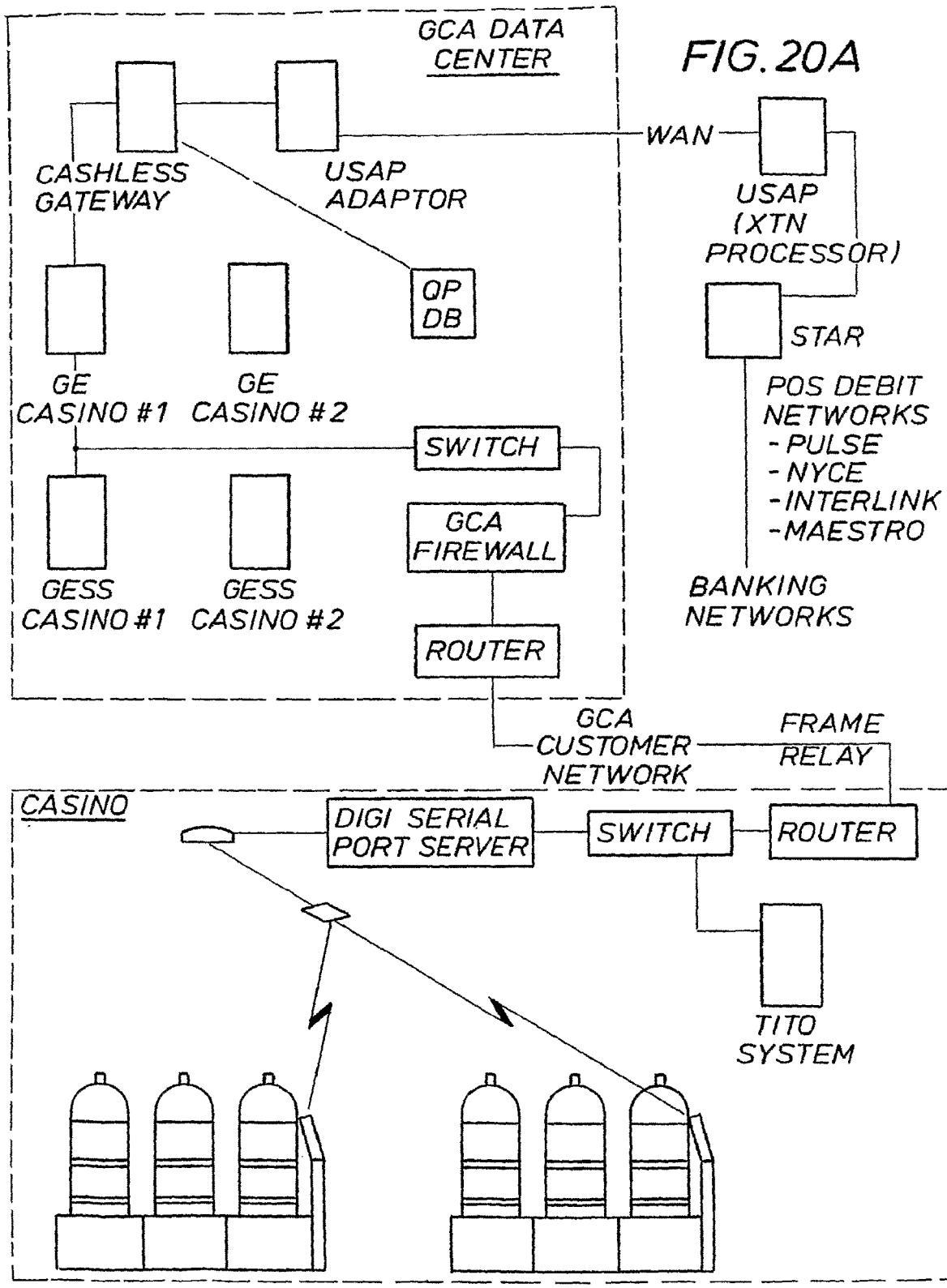
FIG. 20A-C illustrate topologies for an end of bank kiosk and supporting systems.
Figure 20B:
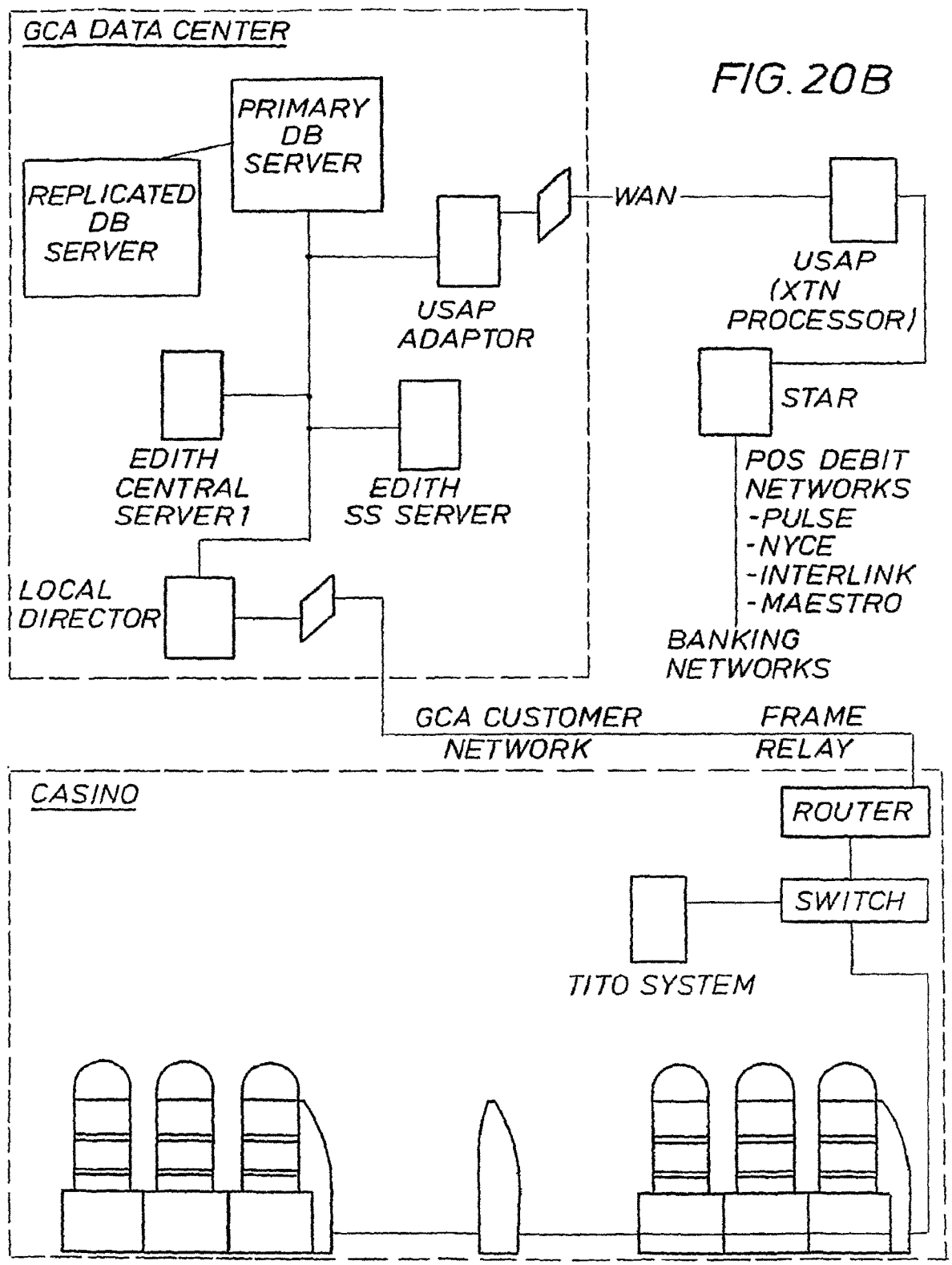
Figure 20C:
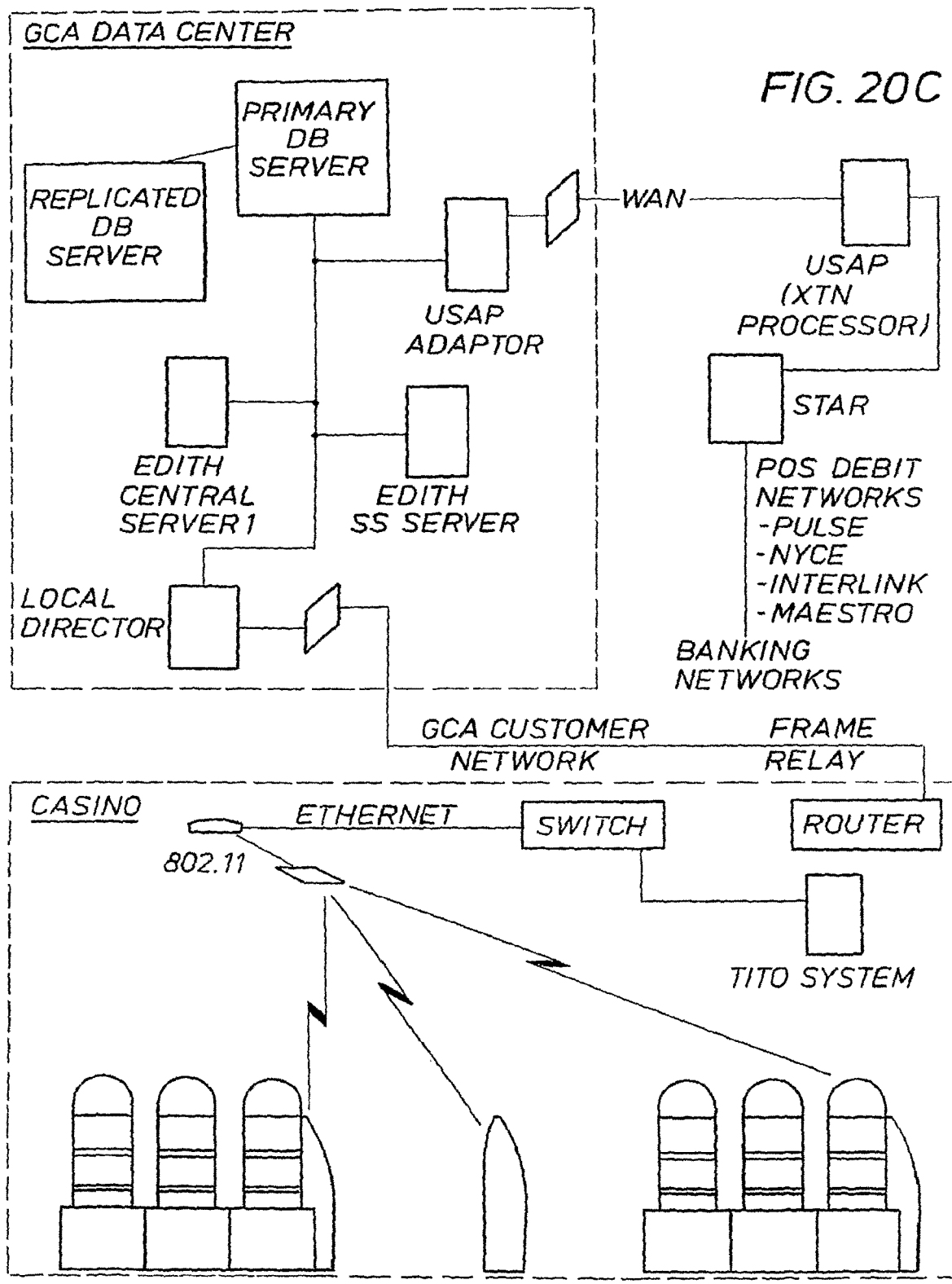

FIGS. 20A-C illustrate topologies for an EOB kiosk and support system. In FIGS. 20A-C the GCA data center functions as a financial transaction merchant.

Figure 20D:
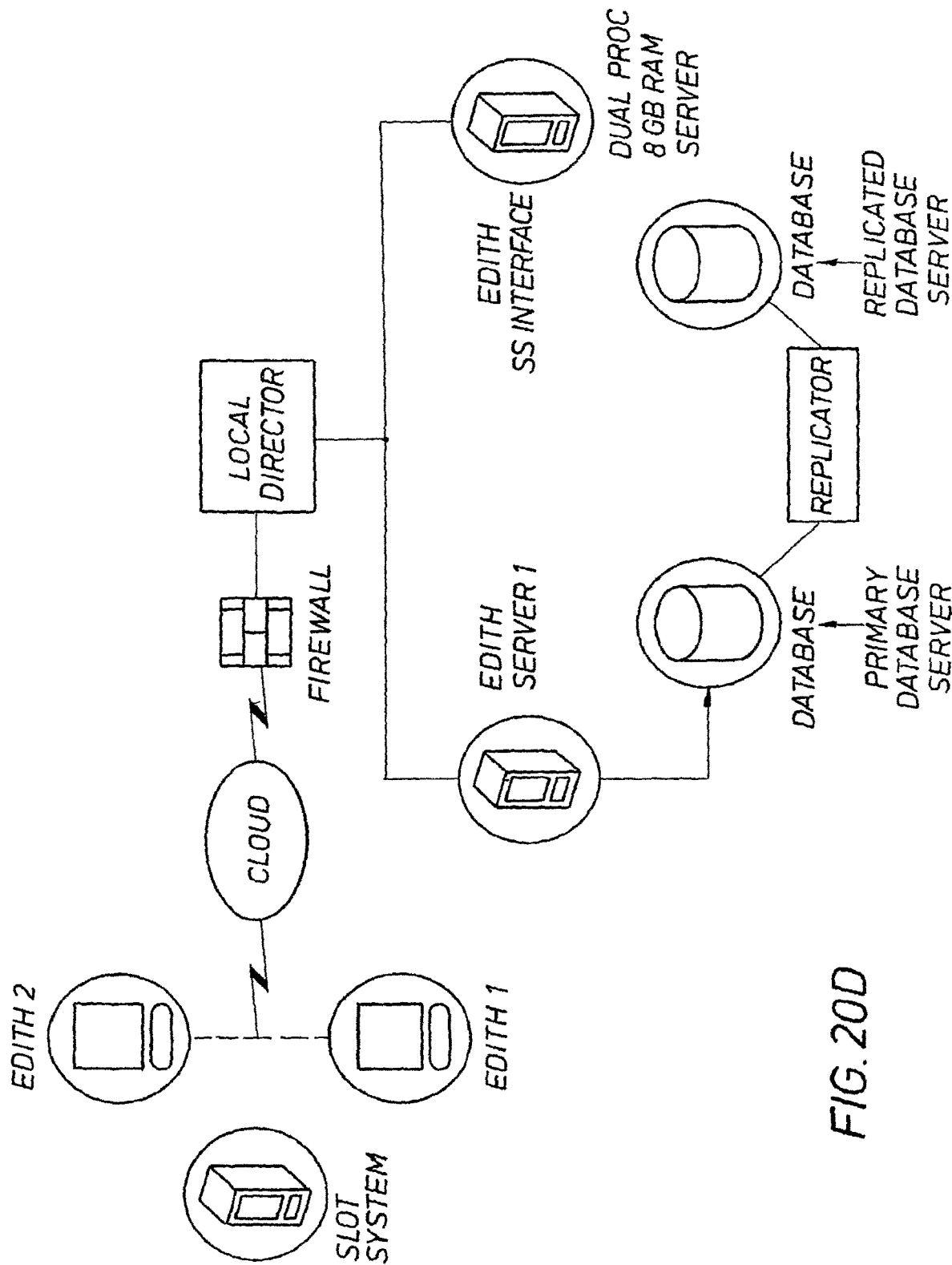
FIG. 20D illustrates one option for a merchant level implementation.

FIG. 20D illustrates a server level implementation.

Figure 21:
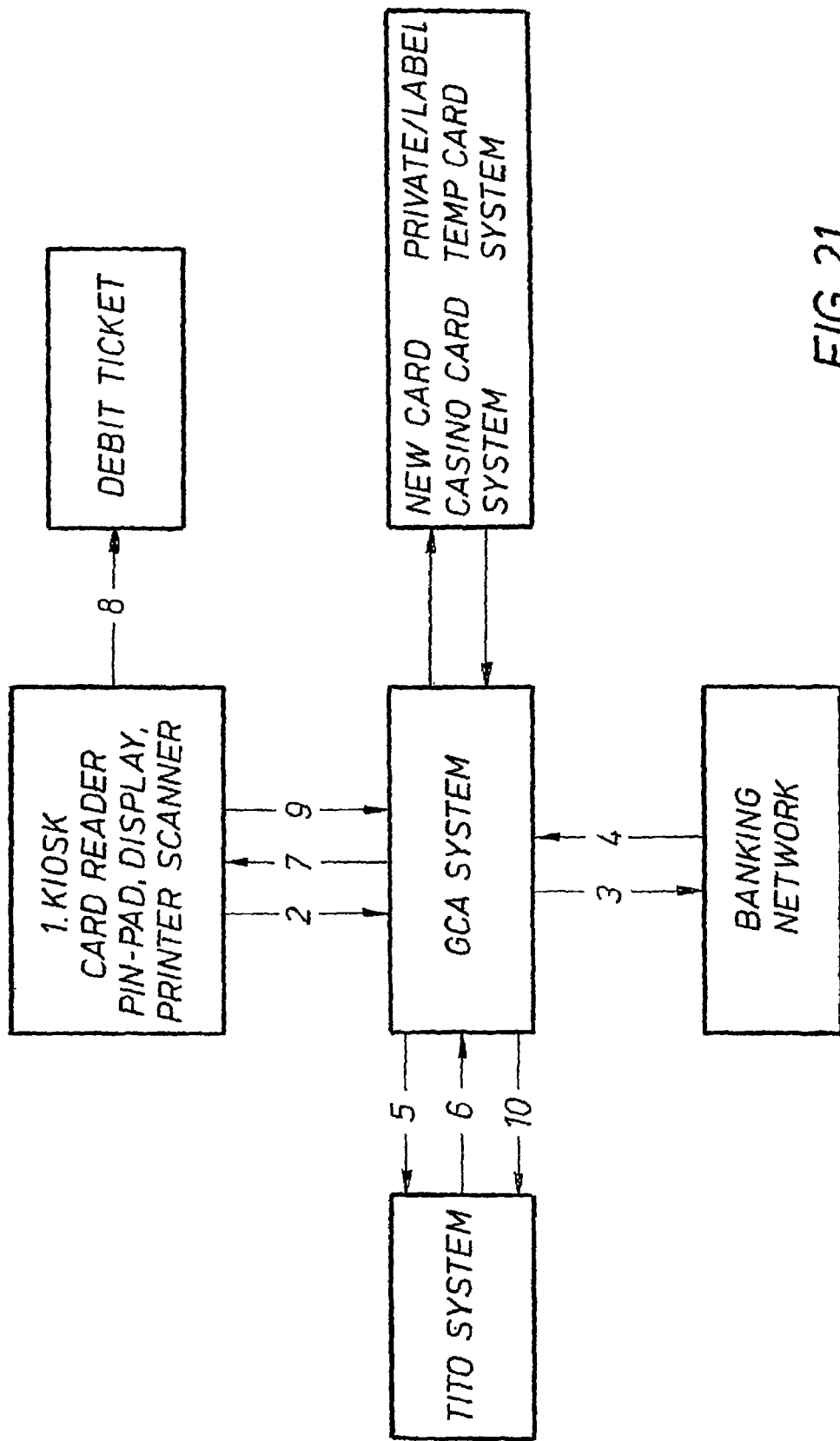
FIGS. 21-23 illustrate three transaction flow options for preferred embodiments of the system, including GCA System that communicates with a new card/casino card system. The GCA system may well encompass a financial transaction merchant and a cashless gateway.
Figure 22:
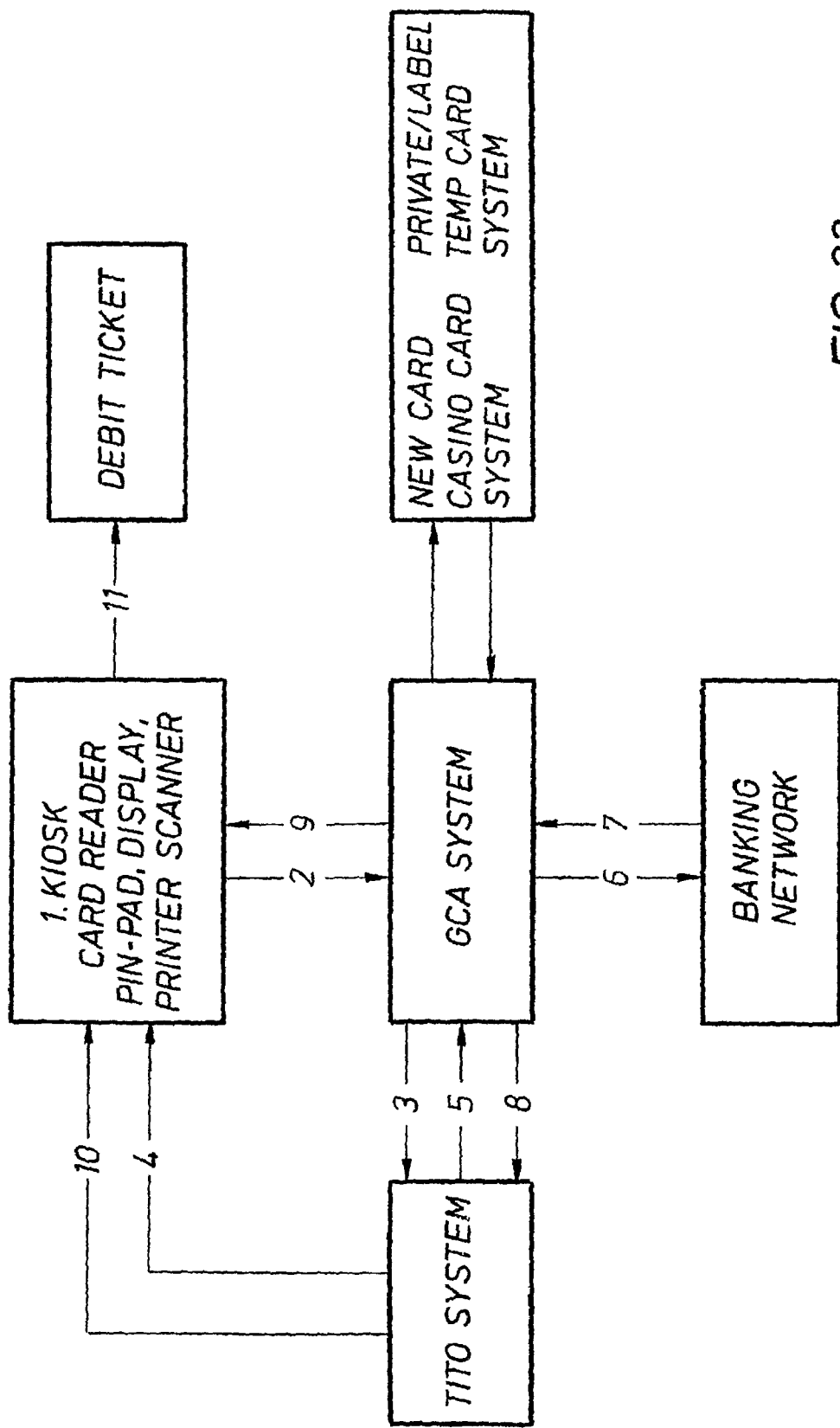
Figure 23:
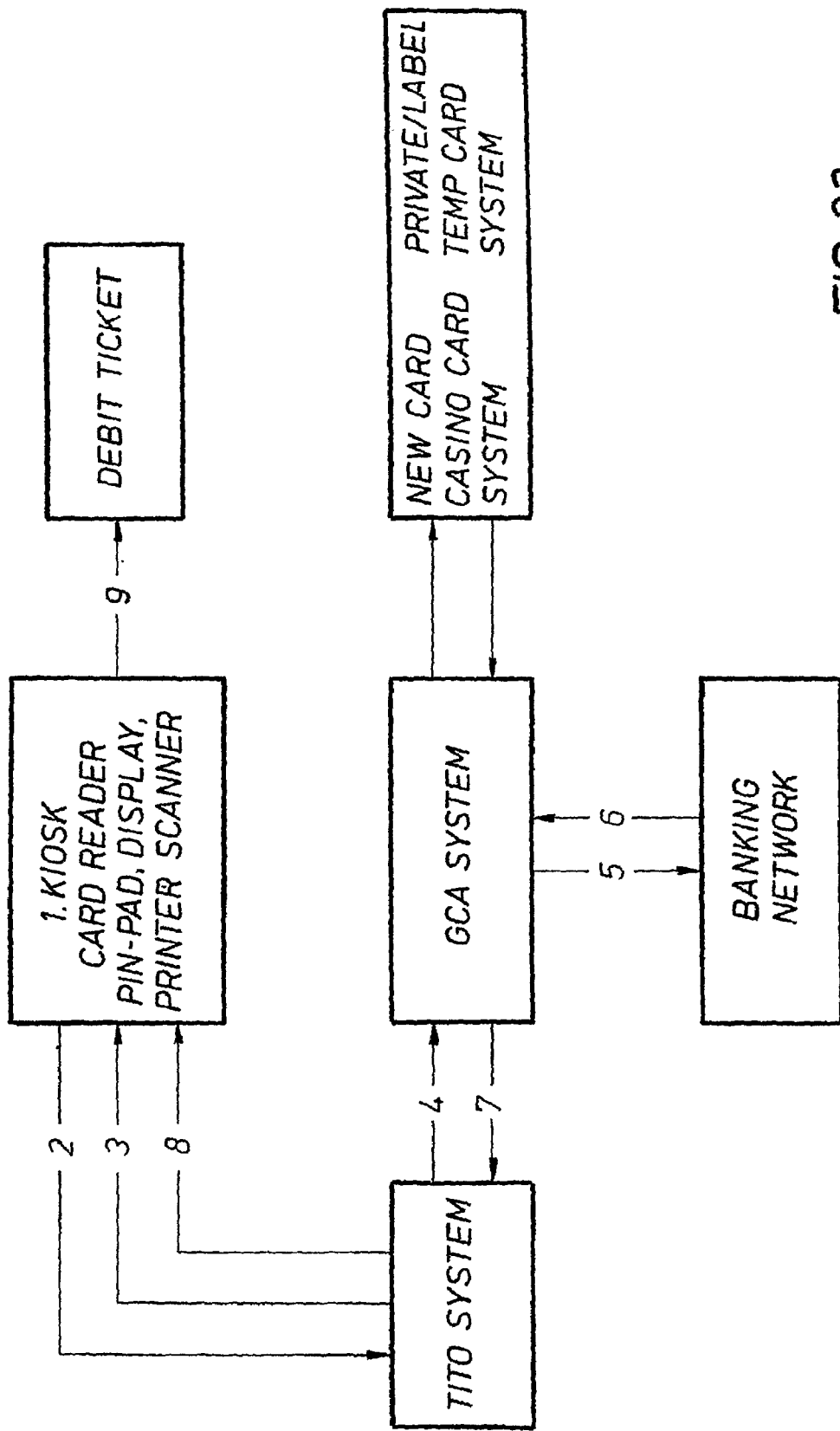
Figure 26A:
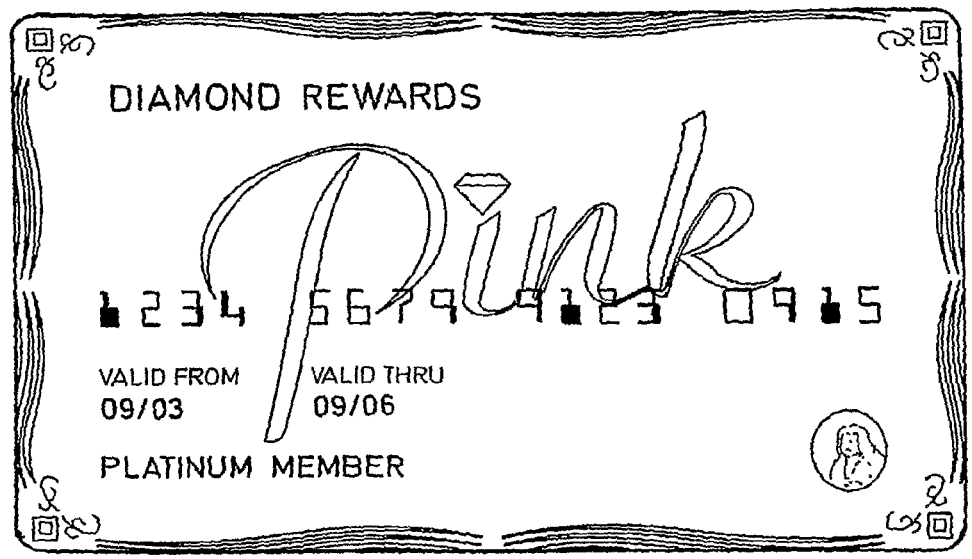
FIGS. 26A-D illustrate embodiments of coded credit cards for patron selection.
Figure 26B:
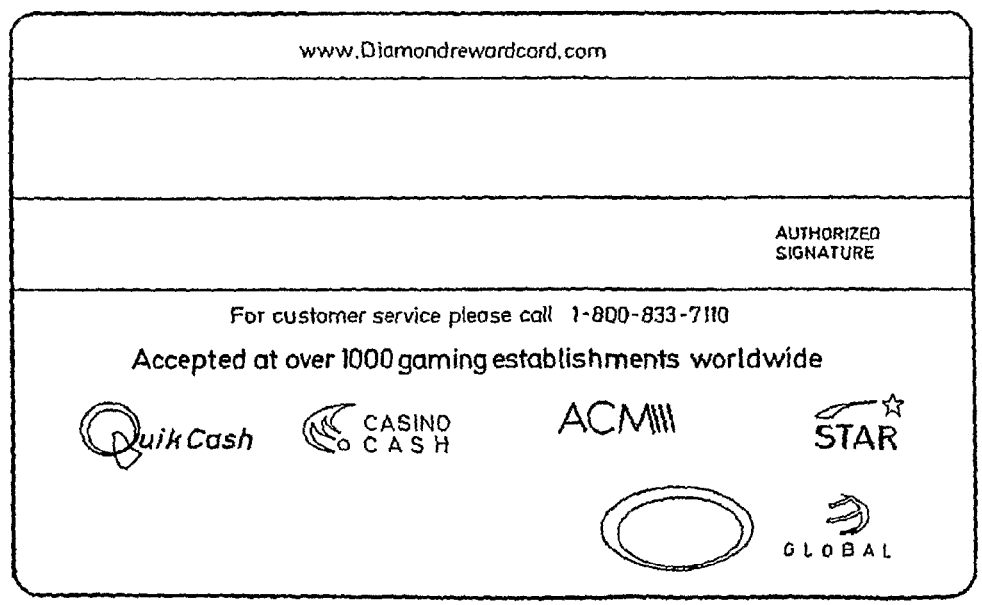
Figure 26C:
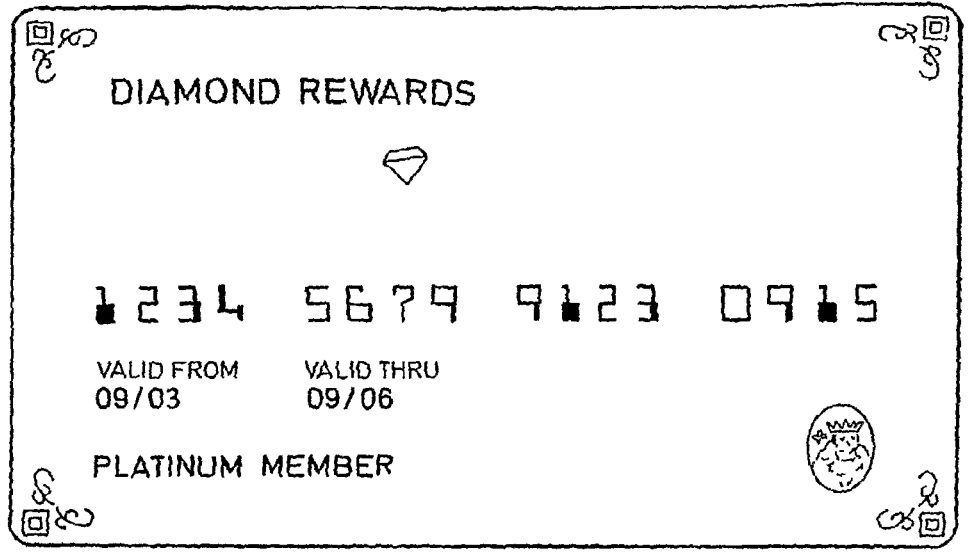
Figure 26D:
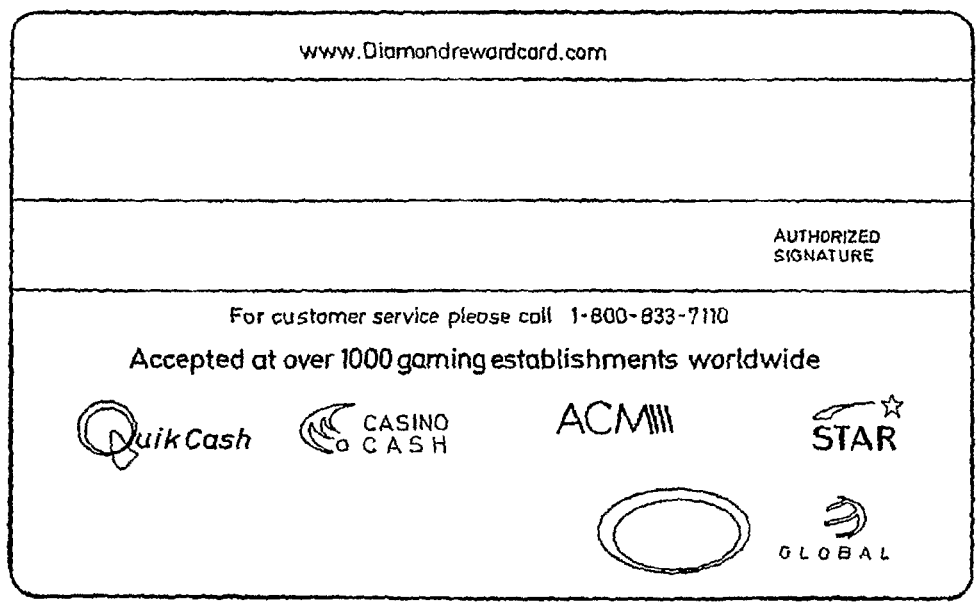

FIGS. 21-23 illustrate three preferred transaction flow options. These figures are discussed in more detail below.

FIG. 21—Transaction Flow Option A

1. Patron swipes or inserts debit/ATM card at kiosk, enters PIN and amount, confirms surcharge, and requests or declines a receipt.

2. Debit purchase request message is sent via RF (wireless) or cable connection to financial processor system.

3. Financial processor system sends request to banking network (or new card, casino, private label or temp card system) for debit withdrawal authorization.

4. Banking network (or the like) approves debit withdrawal transaction and responds to financial processor system.

5. Financial processor system sends debit ticket request message to TITO (ticket-in/ticket-out) system.

6. TITO system responds to financial processor system with debit ticket authorization message including appropriate validation data.

7. Financial processor system forwards debit ticket authorization message to kiosk printer.

8. Kiosk prints a debit ticket (bar coded slot voucher) in the amount of the debit withdrawal request. It also prints a receipt if one was requested by the patron.

9. Kiosk sends a confirmation message to the financial processor system acknowledging that the debit ticket (and receipt if one was requested) was successfully printed.

10. The financial processor system sends a confirmation message to the TITO system acknowledging that the debit ticket was successfully printed.

11. The patron can redeem the voucher for cash at the casino cage, cashier booth, or ticket redemption kiosk or insert it into the bill acceptor of any properly equipped gaming machine.

FIG. 22—Transaction Flow Option B

1. Patron swipes or inserts debit/ATM card at kiosk, enters PIN and amount, confirms surcharge, and requests or declines a receipt.

2. Debit purchase request message is sent via RF (wireless) or cable connection to financial processor system.

3. Financial processor system sends a request to TITO system (ticket-in/ticket-out system) to verify that slot voucher printer is on-line and in a 'ready state' to print voucher.

4. TITO system verifies printer status via RF or cable connection.

5. TITO system sends message back to financial processor system confirming that the printer is on-line and ready.

6. Financial processor system sends request to banking network (or new card, casino, private label or temp card system) for debit withdrawal authorization.

7. Banking network (or the like) approves debit withdrawal transaction and responds to financial processor system.

8. Financial processor system sends authorization message to TITO system to generate a debit ticket (bar coded slot voucher).

9. Financial processor system sends a message to kiosk to display the text: "Transferring Your Funds."

10. TITO system sends a message to the voucher printer to print a debit ticket in the amount of the debit withdrawal request.

11. The voucher printer generates a debit ticket in the amount of the debit withdrawal request. It also prints a receipt if one was requested by the patron.

12. The patron can redeem the debit ticket for cash at the casino cage or cashier booth or insert it into the bill acceptor of any properly equipped gaming machine.

FIG. 23—Transaction Flow Option C

1. Patron swipes or inserts debit/ATM card at kiosk, enters PIN and amount, confirms surcharge, and requests or declines a receipt.

2. Debit purchase request message is sent via RF (wireless) or cable connection to TITO system.

3. TITO system verifies printer status.

4. TITO system forwards debit withdrawal request to financial processor system.

5. Financial processor system sends request to banking network (or new card, casino, private label or temp card system) for debit withdrawal authorization.

6. Banking network (or the like) approves debit withdrawal transaction and responds to financial processor system. Financial processor system sends authorization message to TITO system to generate a debit ticket (bar coded slot voucher).

7. TITO system sends a message to the voucher printer to print a debit ticket in the amount of the debit withdrawal request.

8. The voucher printer generates a debit ticket in the amount of the debit withdrawal request. It also prints a receipt if one was requested by the patron.

9. The patron can redeem the debit ticket for cash at the casino cage or cashier booth or insert it into the bill acceptor of any properly equipped gaming machine.

FIGS. 5A,B-19A,B illustrate the role of a financial transaction merchant, including a cashless gateway and/or the requisite servers, in communication with a new card accounting system and a casino card accounting system, in one embodiment. The financial transaction merchant of course may encompass the cashless gateway. The financial transaction merchant and the cashless gateway may be illustrated separately in the figures for the purposes of clarity, or represented by relevant servers.

FIGS. 21-23 as well as FIG. 3B also illustrate a receipt reader/scanner. The receipt reader/scanner is intended to indicate an automated method for reading a receipt or ticket or temporary card, or even permanent card, which would facilitate identification and communication with either or both of a new card accounting system and or a casino card accounting system.

In order to expressly exhibit a sense of social responsibility, the instant invention includes a further feature. This feature can be incorporated into the stand-alone kiosk of the instant invention, although it can be incorporated as well into electronic funds transfer equipment of a casino-based ATM or into POS/EFT equipment integrated into and/or with a gaming or a slot machine. The invention involves providing a player or patron an option for selecting a "personal daily limit" for electronic funds transfer for gaming. The patron or player may also be provided with an option to select a time limit for the "personal daily limit" Such time limit would be a time period, such as six months, for which the player wishes the personal daily limit to apply to that card. Having selected a "personal daily limit," the electronic funds transfer system will not grant an electronic funds transfer with regard to that card in a gaming establishment, or for gaming activity, to the extent that the funds for that day exceed the "personal daily limit" then in effect.

The personal daily limit could have a casino wide maximum that applied to everyone, as well. A player-selected personal daily limit safeguards against compulsive gambling in the heat of the moment with a greater amount than originally planned.

Background EFT—Cards and Accounts and House Accounts

An EFT card and account system generally involves a consumer or patron, an issuing bank or account issuer, a merchant, a transaction processor network and a card system architect/governor providing regulations. A consumer establishes an account with an issuer in a particular account provider's system using a particular transaction processor network. (A merchant has an account with a merchant bank relating to that system and receives EFT credit therein for transactions.). Cards from different provider systems are run through the same EFT terminals, transaction information is typically added, and transactions are electronically forwarded for approval and processing using commercial transaction processors and system specific EFT networks. Transactions are governed by rules in accordance with the system established by the system provider of architect/governor regulations. A transaction is (or at least can be) first approved/disapproved and then subsequently electronically cleared. The consumer account is debited and the merchant account is credited via an electronic funds transfer (EFT,) either immediately or periodically. Upon opening an account there is typically a week to ten days wait for the card to arrive by mail. Usually an account cannot be used until the card has arrived and been activated.

In the gaming industry a casino agent frequently assumes the role of "merchant" for a plurality of casino and/or gaming establishments. This agent is frequently referred to as a merchant. This merchant is well positioned to collect important historical data in regard to EFT gaming transactions. In the case of a "house" credit account, with or without a card, a merchant (which can be a casino) typically assumes many of the roles mentioned above. The merchant issues the account and card, if any, maintains the consumer account, offers the line of credit, bills and collects. The merchant deposits in its own account when the consumer pays, typically clearing consumer checks in normal fashion. The house card is good only at that particular merchant's locations. The merchant is well positioned to obtain important data on the buying habits and creditworthiness of its customers. The merchant sets the account credit limit and can affect account transactions essentially immediately upon opening an account Co-sponsored accounts and cards can be somewhat of a hybrid between a credit card account and a house card account. The "merchant" role and co-account issuer's role can be assumed by a merchant or an EFT agent merchant, which agent merchant may service many different establishment merchants. This merchant may also assume some of the roles of the provider of system architect/governor regulations. A commercial system provider may be utilized as a co-account issuer so that an EFT card provided would be useable on terminals for general purpose EFT cards and would be processable by commercial transaction processors such as MasterCard. A merchant might also provide at least in part an electronic network for use for transactions, particularly transactions immediately upon opening an account.

A gaming oriented credit card and account could be utilized for any "credit card" purchase. However, the system will likely be structured with a gaming transaction as the paradigmatic transaction. In this case "cash advance for gaming" may be the paradigmatic transaction. The "transaction costs" of the instant system may be structured to be borne in specific gaming oriented ways. In at least some embodiments the system might limit non-cash advance purchases, or non-gaming oriented transactions, in particular by the transaction cost system, or by the use of multiple credit limits and/or multiple cash advance limits, depending on the type of transaction.

The preferred gaming oriented credit card account is tailored to be used in, and to be efficient for, the gaming environment. Such gaming accounts preferably have a cash advance limit commensurate with their credit limit. The cash advance limit and/or credit limit would typically be based on EFT gaming transaction history, preferably including the EFT gaming transaction history of the particular patron.

In such a system the risk of loss through granting credit for gaming should be minimized while the capacity to reasonably access funds on credit should be maximized. Limiting the capacity to use the account for non-gaming oriented goods and services would reflect a realistic limitation, given the transaction cost structure set in place.

Typically, a gaming oriented account card would be associated with a PIN or the like. A PIN or the like is some system, now known or adopted in the future, by which the account owner identifies himself or herself in addition to, or other than, simply possessing and presenting a card.

To summarize, the preferred gaming oriented credit card account is created particularly for use in gaming, although not solely. The account is associated with a credit card. The credit card is processable through a general purpose credit/debit card terminals. The account is usable in variably owned gaming establishments. It is not limited to one particular gaming house, even if that house has a plurality of locations. The cash advance limit is commensurate with the credit limit of the account, at least for gaming oriented transaction, and is preferably based on a prior history of EFT gaming transaction. Preferably, this prior history would be a prior history of the account opener and/or owner. Importantly, as in a house card, or other co-sponsored cards, credit is preferably available essentially immediately upon opening a new gaming account in appropriate circumstances. The information upon which an immediate transaction secures an approval/disapproval and upon which a subsequent electronic clearing of an immediate use of the account can be based can come from a temporary card or voucher or receipt or the like, or can be hand entered, as by numbers or a PIN or words.

Especially playing the role of gaming oriented account issuer and merchant, the account issuer is well positioned to issue a patron selection card and to reward a selection coded card account user. The account issuer is in position to offer selection code oriented rewards (spa time, golf time) upon presentation of the card, including even cash at cash dispensing terminals and casino cages.

FIGS. 26A-D illustrate the front and backsides of one embodiment of a female-type and male-type coded patron selection card.

FIG. 25 illustrates a preferred embodiment of an auto-roll system to establish a credit line, preferably after receiving a decline from a card issuing bank. In the first step a patron makes a request for a cash advance or quasi cash transaction using a general purpose credit card. Typically this would be 30 at an automated station that is customer activated, the station having a POS device or PC interface. Step two indicates that a bank card issuer declines the transaction. Typically, this is because an arbitrary cash advance limit has been exceeded, the cash advance limit not having been targeted to the gaming environment. The third step comprises an auto-roll prompt to give a customer an option to establish a new gaming-oriented credit line. Preferably the account issuer or co-issuer will be the merchant, an entity standing in the shoes of the casino as merchant. The auto-roll query or prompt is preferably stimulated at the automated station when a customer receives a transaction decline, but it could come first.

In the fourth step, if the customer chooses to apply for a new credit line, a user interface prompts the customer to enter credit related data such as social security number, date of birth, address, etc. Preferably an account issuer or co-issuer, standing in the shoes of the casino as merchant, has access to detailed EFT gaming transaction history, including information on the customer. This detailed EFT gaming transaction history becomes an indicator as to the appropriateness and responsibleness of issuing a new credit card with a cash advance limit commensurate with its credit limit, and what that limit should be. The new credit line, of course, could also be a casino in-house line of credit. The casino credit line will be approved by the casino since it is the casino that bears the risk.

In step five, based on this information, a new credit line is established. Means will be put in place such that the customer can now draw on the line to get money, at least at the casino or where the account issuer or co co-issuer is also merchant or master merchant of the transaction, preferably almost immediately. The customer might use a temporary card together with a PIN and/or an extra password or number and/or a paper receipt or scannable voucher or the like in order to begin to immediately utilize the credit line.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not necessarily been produced to scale.

What is claimed is:

1. A method for providing funds for gaming, comprising:
   receiving a request for a first cash advance or quasi cash transaction from a user at an EFT enabled kiosk via at least a card reader and/or an input device of said kiosk;
   sending said request to a third-party authorization server;
   receiving at said kiosk a communication from the third-party authorization server that the request is denied;
   presenting to said user, via a display of the kiosk, an offer to establish an new source of credit;
   transmitting information regarding said user to a server of a credit source provider for use by said credit source provider in generating said new source of credit for said user;
   receiving input via the input device of the kiosk of an acceptance of said offer;
   accessing said new source of credit;
   allowing a second cash advance transaction from said new source of credit; and
   dispensing an amount of funds from said kiosk based upon said second cash advance transaction.

2. The method in accordance with claim 1, wherein said amount of funds is dispensed in the form of a redeemable monetary value ticket.

3. The method in accordance with claim 1, wherein said third-party authorization server comprises a financial transaction processor.

4. The method in accordance with claim 3, wherein said financial transaction processor is associated with a financial card or banking network.

5. The method in accordance with claim 1, comprising receiving a card associated with a bank account at said card reader of said kiosk.

6. The method in accordance with claim 1, wherein said second cash advance transaction is allowed within one hour of activating said account.

7. The method in accordance with claim 1, further comprising issuing said user a card, said card having information associated therewith which identifies an account associated with said new source of credit.

8. The method in accordance with claim 7, further comprising issuing said user a temporary PIN and allowing said second cash advance transaction based upon said presentation of said temporary PIN.

9. The method in accordance with claim 1, wherein said new source of credit is a funded via a gaming credit line.

10. The method in accordance with claim 1, wherein said new source of credit comprises a pre-paid card account.

11. The method in accordance with claim 1, further comprising setting a credit limit of said new source of credit based on a history of EFT gaming oriented transactions of said user.

12. The method in accordance with claim 1, wherein said kiosk is located in a casino adjacent to one or more gaming machines.

13. The method in accordance with claim 1, wherein said new source of credit has a credit line and allowing said second cash advance transaction in an amount of at least 50% of said credit line.

14. A system for providing funds for gaming, comprising:
    an EFT enabled kiosk comprising a display, a card reader and a user input device; and
    a financial processor server in communication with said EFT enabled kiosk and an external financial network;
    wherein said EFT enabled kiosk is configured to receive a request for a first cash advance or quasi cash transaction from a user and transmit said request to said financial processor server and said financial processor server is configured to transmit said request to said external financial network for processing;
    wherein, when said request is denied, said kiosk is configured to display via the display thereof, an offer to establish a new source of credit, to transmit information regarding said user to a server of a credit source provider for use by said credit source provider in generating said new source of credit for said user, to receive input via the input device of the kiosk of an acceptance of said offer, and to permit access to said new source of credit.

15. The system in accordance with claim 14, wherein said kiosk is configured to permit access to said new source of credit via a second cash advance transaction from said new source of credit.

16. The system in accordance with claim 15, wherein said kiosk further comprise a currency dispenser and said kiosk is configured to dispense an amount of funds using said currency dispenser based upon said second cash advance transaction.

17. The system in accordance with claim 15, wherein said kiosk further comprise a ticket printer and said kiosk is configured to dispense an amount of funds using said ticket printer based upon said second cash advance transaction.

18. The system in accordance with claim 14, wherein said kiosk further comprises a printer and said kiosk is configured to print a card representative of said new source of credit.

19. The system in accordance with claim 15, wherein said external financial network comprises a banking or financial card network.

20. The system in accordance with claim 14, wherein said new source of credit has a cash advance limit and said access to said new source of credit comprises dispensing funds from said kiosk to said user up to said amount of said cash advance limit.

\* \* \* \* \*